US008509805B2

(12) United States Patent
Anderson et al.

(10) Patent No.: US 8,509,805 B2
(45) Date of Patent: *Aug. 13, 2013

(54) ADVANCED TRIGGERS FOR LOCATION-BASED SERVICE APPLICATIONS IN A WIRELESS LOCATION SYSTEM

(75) Inventors: Robert J. Anderson, Phoenixville, PA (US); Jeffrey F. Bull, Chalfont, PA (US); Paul Matthew Czarnecki, Cape Coral, FL (US); Thomas Stephen Ginter, Bellevue, WA (US); Matthew L. Ward, Collegeville, PA (US)

(73) Assignee: TruePosition, Inc., Berwyn, PA (US)

( * ) Notice: Subject to any disclaimer, the term of this patent is extended or adjusted under 35 U.S.C. 154(b) by 494 days.

This patent is subject to a terminal disclaimer.

(21) Appl. No.: 12/782,477

(22) Filed: May 18, 2010

(65) Prior Publication Data
US 2010/0227628 A1    Sep. 9, 2010

Related U.S. Application Data

(60) Division of application No. 11/150,414, filed on Jun. 10, 2005, now Pat. No. 7,783,299, which is a continuation-in-part of application No. 10/768,587, filed on Jan. 29, 2004, now Pat. No. 7,167,713, which is a continuation of application No. 09/909,221, filed on Jul. 18, 2001, now Pat. No. 6,782,264, which is a continuation-in-part of application No. 09/539,352, filed on Mar. 31, 2000, now Pat. No. 6,317,604, which is a continuation of application No. 09/227,764, filed on Jan. 8, 1999, now Pat. No. 6,184,829.

(51) Int. Cl.
*H04W 24/00* (2009.01)
*H04B 1/38* (2006.01)

(52) U.S. Cl.
USPC .................................. 455/456.1; 455/560

(58) Field of Classification Search
USPC ............... 455/456.1, 456.5, 456.6, 560, 561, 455/422; 342/450, 458, 463
See application file for complete search history.

(56) References Cited

U.S. PATENT DOCUMENTS 3,876,980 A   4/1975  Haemmig et al.
3,921,076 A   11/1975 Currie
4,053,890 A   10/1977 Woodson, III et al.
(Continued)

FOREIGN PATENT DOCUMENTS
EP   0 473 373 A2   3/1992
EP   0 598 484 A2   5/1994
(Continued)

OTHER PUBLICATIONS

EPO Application No. EP 10 15 3860: European Search Report dated Jun. 15, 2010.
(Continued)

*Primary Examiner* — Quochien B Vuong
(74) *Attorney, Agent, or Firm* — Woodcock Washburn LLP

(57) ABSTRACT

Methods and systems are employed by a wireless location system (WLS) for locating a wireless device operating in a geographic area served by a wireless communications system. An exemplary method includes monitoring a set of signaling links of the wireless communications system, and detecting at least one predefined signaling transaction occurring on at least one of the predefined signaling links. Then, in response to the detection of the at least one predefined network transaction, at least one predefined location service is triggered.

21 Claims, 34 Drawing Sheets

(56) References Cited

U.S. PATENT DOCUMENTS

| | | |
|---|---|---|
| 4,083,003 A | 4/1978 | Haemmig |
| 4,169,245 A | 9/1979 | Crom et al. |
| RE31,254 E | 5/1983 | Brodeur |
| 4,404,655 A | 9/1983 | Naiff |
| 4,667,203 A | 5/1987 | Counselman, III |
| 4,728,958 A | 3/1988 | Choate |
| 4,728,959 A | 3/1988 | Maloney et al. |
| 4,734,702 A | 3/1988 | Kaplan |
| 4,740,792 A | 4/1988 | Sagey et al. |
| 4,894,662 A | 1/1990 | Counselman, III |
| 4,899,117 A | 2/1990 | Vig |
| 4,912,475 A | 3/1990 | Counselman, III |
| 5,046,066 A | 9/1991 | Messenger |
| 5,058,200 A | 10/1991 | Huang et al. |
| 5,119,104 A | 6/1992 | Heller |
| 5,155,590 A | 10/1992 | Beyers, II et al. |
| 5,191,342 A | 3/1993 | Alsup et al. |
| 5,208,756 A | 5/1993 | Song |
| 5,216,429 A | 6/1993 | Nakagawa et al. |
| 5,235,341 A | 8/1993 | Effland et al. |
| 5,248,982 A | 9/1993 | Reinhardt et al. |
| 5,251,232 A | 10/1993 | Nonami |
| 5,265,121 A | 11/1993 | Stewart |
| 5,293,170 A | 3/1994 | Lorenz et al. |
| 5,311,173 A | 5/1994 | Komura et al. |
| 5,317,323 A | 5/1994 | Kennedy et al. |
| 5,327,144 A | 7/1994 | Stilp et al. |
| 5,335,250 A | 8/1994 | Dent et al. |
| 5,343,431 A | 8/1994 | Ohtsuka |
| 5,351,214 A | 9/1994 | Rouy |
| 5,384,574 A | 1/1995 | Counselman |
| 5,400,344 A | 3/1995 | Mori |
| 5,402,347 A | 3/1995 | McBurney et al. |
| 5,428,621 A | 6/1995 | Mehrotra et al. |
| 5,428,666 A | 6/1995 | Fyfe et al. |
| 5,428,667 A | 6/1995 | Easterling et al. |
| 5,442,806 A | 8/1995 | Barber et al. |
| 5,463,400 A | 10/1995 | Tayloe |
| 5,469,409 A | 11/1995 | Anderson et al. |
| 5,477,229 A | 12/1995 | Caille et al. |
| 5,487,185 A | 1/1996 | Halonen |
| 5,490,073 A | 2/1996 | Kyrtsos |
| 5,499,031 A | 3/1996 | Bodonyi |
| 5,500,648 A | 3/1996 | Maine et al. |
| 5,512,908 A | 4/1996 | Herrick |
| 5,515,062 A | 5/1996 | Maine et al. |
| 5,515,419 A | 5/1996 | Sheffer |
| 5,521,902 A | 5/1996 | Ferguson |
| 5,526,357 A | 6/1996 | Jandrell |
| 5,539,694 A | 7/1996 | Rouy |
| 5,553,101 A | 9/1996 | Lim et al. |
| 5,557,547 A | 9/1996 | Phaal |
| 5,570,099 A | 10/1996 | DesJardins |
| 5,577,087 A | 11/1996 | Furuya |
| 5,588,027 A | 12/1996 | Lim |
| 5,592,480 A | 1/1997 | Carney et al. |
| 5,602,903 A | 2/1997 | LeBlanc |
| 5,606,527 A | 2/1997 | Kwack et al. |
| 5,606,548 A | 2/1997 | Vayrynen et al. |
| 5,606,575 A | 2/1997 | Williams |
| 5,608,410 A | 3/1997 | Stilp et al. |
| 5,612,949 A | 3/1997 | Bennett |
| 5,614,862 A | 3/1997 | Sun |
| 5,619,212 A | 4/1997 | Counselman, III |
| 5,621,664 A | 4/1997 | Phaal |
| 5,623,414 A | 4/1997 | Misra |
| 5,629,707 A | 5/1997 | Heuvel et al. |
| 5,655,217 A | 8/1997 | Lemson |
| 5,668,837 A | 9/1997 | Dent |
| 5,726,972 A | 3/1998 | Ferguson |
| 5,729,235 A | 3/1998 | Guthrie et al. |
| 5,732,387 A | 3/1998 | Armbruster et al. |
| 5,734,487 A | 3/1998 | Rossi |
| 5,748,545 A | 5/1998 | Lee et al. |
| 5,757,767 A | 5/1998 | Zehavi |
| 5,774,802 A | 6/1998 | Tell |
| 5,786,790 A | 7/1998 | Abbott |
| 5,805,200 A | 9/1998 | Counselman, III |
| 5,812,522 A | 9/1998 | Lee et al. |
| 5,812,609 A | 9/1998 | McLochlin |
| 5,832,044 A | 11/1998 | Sousa et al. |
| 5,844,522 A | 12/1998 | Sheffer et al. |
| 5,859,612 A | 1/1999 | Gilhousen |
| 5,861,842 A | 1/1999 | Hitch et al. |
| 5,874,916 A | 2/1999 | DesJardins |
| 5,884,175 A | 3/1999 | Schiefer et al. |
| 5,887,259 A | 3/1999 | Zicker et al. |
| 5,890,068 A | 3/1999 | Fattouche et al. |
| 5,917,315 A | 6/1999 | Weckstrom |
| 5,918,172 A | 6/1999 | Saunders et al. |
| 5,918,180 A | 6/1999 | Dimino |
| 5,920,278 A | 7/1999 | Tyler et al. |
| 5,924,026 A | 7/1999 | Krishnan |
| 5,926,133 A | 7/1999 | Green |
| 5,926,763 A | 7/1999 | Greene et al. |
| 5,930,729 A | 7/1999 | Khamis et al. |
| 5,936,571 A | 8/1999 | DesJardins |
| 5,943,014 A | 8/1999 | Gilhousen |
| 5,946,618 A | 8/1999 | Agre et al. |
| 5,949,871 A | 9/1999 | Kabay et al. |
| 5,973,643 A | 10/1999 | Hawkes et al. |
| 5,999,808 A | 12/1999 | LaDue |
| 6,006,068 A | 12/1999 | Elkin et al. |
| 6,014,102 A | 1/2000 | Mitzlaff et al. |
| 6,031,418 A | 2/2000 | Fowler |
| 6,034,635 A | 3/2000 | Gilhousen |
| 6,035,202 A | 3/2000 | Camp |
| 6,047,192 A | 4/2000 | Maloney et al. |
| 6,061,565 A | 5/2000 | Innes et al. |
| 6,061,631 A | 5/2000 | Zhang |
| 6,088,586 A | 7/2000 | Haverty |
| 6,088,587 A | 7/2000 | Abbadessa |
| 6,091,362 A | 7/2000 | Stilp et al. |
| 6,097,336 A | 8/2000 | Stilp |
| 6,107,959 A | 8/2000 | Levanon |
| 6,115,596 A | 9/2000 | Raith et al. |
| 6,115,599 A | 9/2000 | Stilp |
| 6,115,834 A | 9/2000 | Jen et al. |
| 6,119,000 A | 9/2000 | Stephenson et al. |
| 6,119,013 A | 9/2000 | Maloney et al. |
| 6,133,868 A | 10/2000 | Butler et al. |
| 6,148,211 A | 11/2000 | Reed et al. |
| 6,157,343 A | 12/2000 | Andersson et al. |
| 6,172,644 B1 | 1/2001 | Stilp |
| 6,184,829 B1 | 2/2001 | Stilp |
| 6,236,365 B1 | 5/2001 | LeBlanc et al. |
| 6,236,856 B1 | 5/2001 | Abbadessa |
| 6,249,252 B1 | 6/2001 | Dupray |
| 6,266,013 B1 | 7/2001 | Stilp et al. |
| 6,266,014 B1 | 7/2001 | Fattouche et al. |
| 6,281,834 B1 | 8/2001 | Stilp |
| 6,285,321 B1 | 9/2001 | Stilp et al. |
| 6,298,050 B1 | 10/2001 | Van Heeswyk et al. |
| 6,317,081 B1 | 11/2001 | Stilp |
| 6,317,604 B1 | 11/2001 | Kovach, Jr. et al. |
| 6,321,090 B1 | 11/2001 | Soliman |
| 6,334,059 B1 | 12/2001 | Stilp et al. |
| 6,351,235 B1 | 2/2002 | Stilp |
| 6,385,185 B1 | 5/2002 | Huang |
| 6,388,618 B1 | 5/2002 | Stilp et al. |
| 6,400,320 B1 | 6/2002 | Stilp et al. |
| 6,430,397 B1 | 8/2002 | Willrett |
| 6,433,740 B1 | 8/2002 | Gilhousen |
| 6,463,290 B1 | 10/2002 | Stilp et al. |
| 6,483,460 B2 | 11/2002 | Stilp et al. |
| 6,487,179 B1 | 11/2002 | Leung |
| 6,492,944 B1 | 12/2002 | Stilp |
| 6,519,465 B2 | 2/2003 | Stilp et al. |
| 6,526,267 B1 | 2/2003 | Jokimies et al. |
| 6,539,229 B1 | 3/2003 | Ali |
| 6,563,460 B2 | 5/2003 | Stilp et al. |
| 6,603,428 B2 | 8/2003 | Stilp |
| 6,646,604 B2 | 11/2003 | Anderson |
| 6,661,379 B2 | 12/2003 | Stilp et al. |

| | | | |
|---|---|---|---|
| 6,765,531 | B2 | 7/2004 | Anderson |
| 6,782,264 | B2 | 8/2004 | Anderson |
| 6,873,290 | B2 | 3/2005 | Anderson et al. |
| 7,013,147 | B1 | 3/2006 | Kuwahara et al. |
| 7,023,383 | B2 | 4/2006 | Stilp |
| 7,072,656 | B2 | 7/2006 | Willars et al. |
| 7,167,713 | B2 | 1/2007 | Anderson |
| 7,187,905 | B2 | 3/2007 | Immonen et al. |
| 7,271,765 | B2 | 9/2007 | Stilp et al. |
| 7,315,567 | B2 | 1/2008 | Sequeira |
| 2001/0034235 | A1 | 10/2001 | Froula |
| 2002/0034171 | A1 | 3/2002 | Smith et al. |
| 2002/0039904 | A1 | 4/2002 | Anderson |
| 2002/0172223 | A1 | 11/2002 | Stilp |
| 2003/0064734 | A1 | 4/2003 | Stilp et al. |
| 2004/0203429 | A1 | 10/2004 | Anderson et al. |
| 2006/0003775 | A1 | 1/2006 | Anderson |
| 2006/0030333 | A1 | 2/2006 | Ward et al. |
| 2006/0135174 | A1 | 6/2006 | Kraufvelin et al. |
| 2006/0262011 | A1 | 11/2006 | Bull et al. |
| 2007/0042784 | A1 | 2/2007 | Anderson et al. |
| 2008/0056223 | A1 | 3/2008 | Manser et al. |
| 2008/0139244 | A1 | 6/2008 | Vau et al. |
| 2008/0158059 | A1 | 7/2008 | Bull et al. |

FOREIGN PATENT DOCUMENTS

| | | |
|---|---|---|
| EP | 0 621 734 A2 | 10/1994 |
| EP | 0 658 032 A1 | 6/1995 |
| EP | 0 669 771 A1 | 8/1995 |
| EP | 0 688 122 A1 | 12/1995 |
| EP | 0 792 074 A2 | 8/1997 |
| EP | 0 805 608 A1 | 11/1997 |
| EP | 0 805 609 A2 | 11/1997 |
| EP | 0 836 312 A2 | 4/1998 |
| EP | 0 848 567 A1 | 6/1998 |
| EP | 0 920 228 A1 | 6/1999 |
| EP | 1 093 312 A2 | 4/2001 |
| EP | 1 195 916 A2 | 4/2002 |
| EP | 2207392 A1 | 7/2010 |
| FR | 2 772 927 A1 | 6/1999 |
| GB | 2354129 A | 9/1997 |
| JP | 61-209382 | 9/1986 |
| JP | S61-294382 | 12/1986 |
| JP | S62-265584 | 11/1987 |
| JP | H6-124375 | 5/1994 |
| JP | H6-186316 | 7/1994 |
| JP | H06-265623 | 9/1994 |
| JP | H08-508381 | 9/1994 |
| JP | H08-88878 | 4/1996 |
| JP | H8-122425 | 5/1996 |
| JP | H08-313278 | 11/1996 |
| JP | H10-500771 | 1/1998 |
| JP | H10-185600 | 7/1998 |
| JP | H10-512671 | 12/1998 |
| JP | 2001-166026 | 6/2001 |
| JP | 2001-218250 | 8/2001 |
| JP | 2002-534689 | 10/2002 |
| JP | 2002-534695 | 10/2002 |
| JP | 2003-052074 | 2/2003 |
| JP | 2003-153321 | 5/2003 |
| JP | 2005-117694 | 4/2005 |
| JP | 4460171 | 5/2010 |
| WO | WO 94/27160 | 11/1994 |
| WO | WO 96/25673 | 8/1996 |
| WO | WO 97/00543 | 1/1997 |
| WO | WO 97/04530 | 2/1997 |
| WO | WO 97/44920 | 11/1997 |
| WO | WO 97/47148 | 12/1997 |
| WO | WO 98/10306 | 3/1998 |
| WO | WO 98/47019 | 10/1998 |
| WO | WO 99/31925 | 6/1999 |
| WO | WO 00/40991 | 7/2000 |
| WO | WO 00/40991 A1 | 7/2000 |
| WO | WO 00/40992 | 7/2000 |
| WO | WO 00/40993 | 7/2000 |
| WO | WO 00/40993 A1 | 7/2000 |
| WO | WO 00/41319 | 7/2000 |
| WO | WO 00/41402 | 7/2000 |
| WO | WO 00/41403 | 7/2000 |
| WO | WO 00/41404 | 7/2000 |
| WO | WO 00/41417 | 7/2000 |
| WO | WO 01/56308 | 8/2001 |
| WO | WO 01/71927 | 9/2001 |
| WO | WO 01/76093 | 10/2001 |
| WO | WO 01/91399 | 11/2001 |
| WO | WO 02/30089 | 4/2002 |
| WO | WO 03/071303 | 8/2003 |
| WO | WO 03/084079 | 10/2003 |
| WO | WO 2004/015878 | 2/2004 |
| WO | WO 2004/034721 | 4/2004 |
| WO | WO 2004/092762 | 10/2004 |
| WO | WO 2005/011317 | 2/2005 |
| WO | WO 2006/135542 | 12/2006 |

OTHER PUBLICATIONS

PCT Application No. PCT/US2010/028951: International Search Report dated Jun. 2, 2010.
English Translation of Japanese Patent Application No. 2008-515732: Rejection dated Jul. 22, 2011, 2 pages.
Saitoh et al., "Handbook of Mobile Communications", Nov. 25, 2000, pp. 129-131 and 378-383.
U.S. Appl. No. 09/228,215, filed Jan. 11, 1999, Stilp, et al.
U.S. Appl. No. 09/228,673, filed Jan. 12, 1999, Stilp, et al.
U.S. Appl. No. 09/539,363, filed Mar. 31, 2000, Stilp, et al.
U.S. Appl. No. 09/595,687, filed Jun. 16, 2000, Stilp, et al.
Al Midfa, et al., "Performance Evaluation of Direction-of-Arrival (DOA) Estimation Algorithms for Mobile Communication Systems," IEEE: VTC, 2000, 1055-1059.
Chester, et al., "VLSI Implementation of a Wide Band, High Dynamic Range Digital Drop Receiver," IEEE, 1991, 1605-1608.
Choi, "Alternating Projection for Maximum-Likelihood Source Localization Using Eigendecomposition," IEEE Signal Processing Letter, Apr. 1999, 6(4), 73-75.
Clark, et al., "Precision Geodesy Using the Mark-III Very-Long-Baseline Interferometer System," IEEE Trans. on Geoscience and Remote Sensing, 1985, GE-23(4), 438-449.
Clark, et al., "Synchronization of Clocks by Very-Long-Baseline Interferometry," IEEE Trans. on Instrumentation and Measurement, 1979, IM-28(3), 184-187.
Counselman III, "Array Antennas," IEEE AES Systems Mag., 1998, 23(12), 15-19.
Friedlander, "Sensitivity Analysis of the Maximum Likelihood Direction-Finding Algorithm," IEEE Trans. on Aerospace and Electronic Systems, Nov. 1990, 26(6), 953-968.
Fudge, et al., "Derivative Constraints for High Resolution Direction Finding with Correlated Interfaces," SPIE, 1996, 2750, 76-87.
Greater Harris County 9-1-1 Emergency Network, "A Sneak Preview of Future Emergency Services & Cellular Phone Usage," Dec. 11, 1996.
GSM Association, "Mobile Terms & Acronyms," http://www.gsmworld.com/technology/glossary.shtml, accessed Dec. 6, 2006.
Hahn, et al., "Optimum Processing for Delay-Vector Estimation in Passive Signal Arrays," IEEE Trans. on Information Theory, Sep. 1973, IT-19(5), 608-614.
Interferometrics, Inc., "Cellular Radiolocation System, Abbreviated Report—Phase 3," May 10, 1993.
Kaveh, et al., "The Statistical Performance of the Music and the Minimum-Norm Algorithms in Resolving PlaneWaves in Noise," Trans. on Acoustics Speech and Signal Processing, Apr. 1986, ASSP34(2), 331-341.
Kelley, et al., "Array Antenna Pattern Modeling Methods that Include Mutual Coupling Effects," IEEE Trans. on Antennas and Propagation, Dec. 1993, 41(1), 1625-1632.
Kennedy, et al., "Direction Finding and "Smart Antennas" Using Software Radio Architectures," IEEE Communications Magazine, May 1995, 62-68.
Klukas, et al., "Line-of-Sight Angle of Arrival Estimation in the Outdoor Multipath Environment," IEEE Trans. on Vehicular Technology, Feb. 1998, 47(1), 342-351.
Krim, et al., "Two Decades of Array Signal Processing Research," IEEE Signal Processing Magazine, Jul. 1996, 67-93.

Mouly, et al., "The Pseudo-Synchronisation, a Costless Feature to Obtain the Gains of a Synchronised Cellular Network," 1997, 51-55.

Muhamed, et al., "Comparision of Conventional Subspace-Based DOA Estimation Algorithms with Those Employing Property-Restoral Techniques: Simulation and Measurements," IEEE, 1996, 1004-1008.

State of New Jersey Department of Law and Public Safety Division of State Police, "Report on the New Jersey Wireless Enhanced 911 System Trial Jan. 22 to Apr. 30, 1997, The First 100 Days," Jun. 16, 1997.

Oh, et al., "Efficient Realisation of Alternating Projection Algorithm for Maximum Likelihood Direction Finding," Electronics Letters, Sep. 1989, 25(20), 1325-1326.

Ozanich, "Texas Wireless Integration Project: 9-1-1, Greater Harris County 9-1-1 Network," Oct. 3, 1996.

TruePosition, Inc., "TruePosition, Inc. Signs Contract with Great Harris County 9-1-1 Emergency; Network for Wireless E9-1-1 Phase 2 Services in Houston; First Commercial Implementation of Wireless Location System," Press Release Jun. 19, 1998.

Rappaport, et al., "Position Location using Wireless Communications on Highways for the Future," IEEE Communications Magazine, Oct. 1996, 33-41.

Rogers, "Phase and Group Delay Calibration of a Very Long Baseline Interferometer by East Coast VLBI Group," NASA Conference Publication Radio Interferometery Techniques for Geodesy, 1979, 2115, 255-261.

Roller, et al., "Effects of Mutual Coupling on Super-Resolution DF in LinearArrays," IEEE, 1992, V-257-V-260.

Roy, et al., "ESPIRIT—Estimation of Signal Parameters Via Rotational Invariance Techniques," IEEE 1989, 984-995.

Shan, et al., "On Spatial Smoothing for Direction-of-Arrival Estimation of Coherent Signals," IEEE Trans. on Speech and Signal Processing, Aug. 1985, ASSP-33(4) 806-811.

Sheinvald, et al., :Direction Finding with Fewer Receivers via Time-Varying Preprocessing, IEEE Trans. on Signal Processing, Jan. 1999, 47(1), 2-9.

Sheinvald, et al., "Localization of Multiple Sources with Moving Arrays," IEEE Trans. on Signal Processing, Oct. 1998, 46(10), 2736-2743.

Song, "Automatic Vehicle Location in Cellular Communications Systems," IEEE Trans. on Vehicular Technol., 1994, 43(4), 1-6.

Stilp, "Time Difference of Arrival technology for Locating Narrowband Cellular Signals," Proceedings of the SPIE, 1996, 134-144.

Stoica, et al., "Maximum Likelihood Methods for Direction-of-Arrival Estimation," IEEE Trans. on Acoustics Speech and Signal Processing, Jul. 1990, 38(7), 1132-1143.

Stoica, et al., "Music, Maximum Likelihood, and Cramer-Rao Bound," IEEE Trans. on Acoustics Speech and Signal Processing, May 1989, 37(5), 720-741.

Stoica, et al., "Music, Maximum Likelihood, and Cramer-Rao Bound: Further Results and Comparisons," IEEE Trans. on Acoustics Speech and Signal Processing, Dec. 1990, 38(12), 2140-2150.

Stoica, et al., "Novel Eigenanalysis Method for Direction Estimation," Oct. 1989.

Stoica, et al., "Performance Study of Conditional and Unconditional Direction-of-Arrival Estimation," IEEE Trans. on Acoustics Speech and Signal Processing, Oct. 1990, 18(10), 1783-1795.

Swasey, "911 Demo Is 'A Success,'" Wireless Week, Jan. 27, 1997.

Technical Report GSM 01.04 V8.0.0 (May 2000), Digital cellular telecommunications system (Phase 2+); version 8.0.0 (Release 1999); Abbreviations and acronyms.

Texas Wireless Integration Project, "World Premier Presentations and Demonstrations of Technology," Houston, Texas, Dec. 5, 1996, 1-29.

ANSI TIA/EIA Standard IS 553A; Jun. 2003.

CDMA—EIA/TIA Standard IS-95A; ANSI J-STD-008; May 1995. Mobile Station—Land Station Compatibility Standard for Dual-Mode Narrowband Analog Cellular Technology, TIA/EIA Standard IS-88; Jan. 1993.

TDMA—Third Generation Wireless; EIA/TIA Standard ANSI/TIA-136-000-E; Jan. 14, 2004.

Triton PCS License Company L.L.C., Phase II E911 Implementation Report, May 1, 2003.

Civil Action No. 01-0823-GMS, True Position, *KSI Inc.*, vs. *Allen Telecom, Inc.*, Mar. 11, 2003, 1-48 and 1-32 pages of index.

*TruePosition, Inc.* and *KSI, Inc.*, v. *Allen Telecom, Inc.*, C.A. No. 01-0823-GMS, "Defendant's Response to Plaintiff's First Set of Interrogatories," Apr. 1, 2002, 1-20.

*TruePosition, Inc.* and *KSI, Inc.*, v. *Allen Telecom, Inc.*, C.A. No. 01-0823-GMS, "Defendant's Supplemented Response to Interrogatory No. 4," Jul. 12, 2002, 4 pages.

*TruePosition, Inc.* and *KSI, Inc.*, v. *Allen Telecom, Inc.*, C.A. No. 01-0823-GMS, "Deposition of Joseph Kennedy," May 14, 2002, pp. 1-27, 31-53, 63-75, 81-86, 90-100, 105-110, 116-121, 124, 149-150, 152-158, 164-165, 167-221, and 224-260.

TruePosition, Inc., Telecommunications Industry Associate, "J-STD-036 Suggested Improvements and Workplan," Jul. 9, 2002. (TR45.2.AHES/2002.07.09).

TruePosition, Inc., "Progressive Position for Call Routing by Non-Wideband PDEs," Jul. 31, 2002. (TR45.2AHES-2002.07.31).

TruePosition, Inc., "Best Effort Scenario for Call Routing and Final Location," Aug. 7, 2002. (TR45.2AHES-2002.08.07).

TruePosition, Inc., "TR-45: Enhanced Wireless J-STD-036-A 1 9-1-1 Phase 2," Aug. 2000.

TruePosition, Inc., "TR-45: Enhanced Wireless TIA/EIA/J-STD-036-A 1 9-1-1 Phase 2," Aug. 2000, Contents, Chapters 1-9, and Annexes A-H.

TruePosition Cellular Location System, "Wireless Location for Enhanced 911 Emergency Services: Responses to Bell South Wireless, Inc.; Industry Request for Information," Apr. 19, 1996, 1-61.

TruePosition™ Cellular Location System, "System Specification," Apr. 20, 1995, 1-31.

Van Veen, et at., "Beamforming: A Versatile Approach to Spatial Filtering," IEEE ASSP Magazine, Apr. 1988, 4-24.

Viberg, et al., "Detection and Estimation in Sensor Arrays Using Weighted Subspace Fitting," IEEE Trans. on Signal Processing, Nov. 1991, 39(11), 2436-2449.

Viberg, et al., "Sensor Array Processing Based on Subspace Fitting," IEEE Trans. on Signal Processing, May 1991, 39(5), 1110-1121.

Warner, "Vendor to Give Houston First Phase II E911 System," Wireless Week, Jun. 29, 1998.

Wang, et al., "On the Performance of Signal-Subspace Processing—Part I: Narrow-Band Systems," IEEE Trans. on Acoustics, Speech, and Signal Processing, Oct. 1986, ASSP-34(5), 1201-1209.

Wax, et al., "A New Least Squares Approach to Blind Beamforming," IEEE, 1997, 3477-3480.

Yang, et al., "DF Directed Multipath Equalization," IEEE, 1995, 1418-1422.

Zoltowski, et al., "A Vector Space Approach to Direction Finding in a Coherent Multipath Environment," IEE Trans. on Antennas and Propagation, Sep. 1986, AP-34(9), 1069-1079.

United Kingdom, Patent Acts Examination Report Under Section 18(3), Jun. 23, 2009.

ECID Location

ADVANCED TRIGGERS FOR LOCATION-BASED SERVICE APPLICATIONS IN A WIRELESS LOCATION SYSTEM

CROSS REFERENCE

This application is a divisional of U.S. application Ser. No. 11/150,414, filed Jun. 10, 2005, which is a continuation-in-part of U.S. application Ser. No. 10/768,587, filed Jan. 29, 2004, now U.S. Pat. No. 7,167,713, which is a continuation of U.S. application Ser. No. 09/909,221, filed Jul. 18, 2001, now U.S. Pat. No. 6,782,264 B2, which is a continuation-in-part of U.S. application Ser. No. 09/539,352, filed Mar. 31, 2000, now U.S. Pat. No. 6,317,604 B1, which is a continuation of U.S. application Ser. No. 09/227,764, filed Jan. 8, 1999, now U.S. Pat. No. 6,184,829 B1.

TECHNICAL FIELD

The present invention relates generally to methods and apparatus for locating wireless devices, also called mobile stations (MS), such as those used in analog or digital cellular systems, personal communications systems (PCS), enhanced specialized mobile radios (ESMRs), and other types of wireless communications systems. More particularly, but not exclusively, the present invention relates to the use of prescribed network message sequences in initiating, or triggering, location-based service applications and re-use of existing radio interface parameters within such message sequences to provide low-accuracy location or to allow tuning of specialized receivers for high accuracy location for a particular subscriber.

BACKGROUND

Early work relating to Wireless Location Systems is described in U.S. Pat. No. 5,327,144, Jul. 5, 1994, "Cellular Telephone Location System," which discloses a system for locating cellular telephones using time difference of arrival (TDOA) techniques. Further enhancements of the system disclosed in the '144 patent are disclosed in U.S. Pat. No. 5,608,410, Mar. 4, 1997, "System for Locating a Source of Bursty Transmissions." Both of these patents are assigned to TruePosition, Inc., the assignee of the present invention. TruePosition has continued to develop significant enhancements to the original inventive concepts.

Over the past few years, the cellular industry has increased the number of air interface protocols available for use by wireless telephones, increased the number of frequency bands in which wireless or mobile telephones may operate, and expanded the number of terms that refer or relate to mobile telephones to include "personal communications services", "wireless", and others. The air interface protocols now used in the wireless industry include AMPS, N-AMPS, TDMA, CDMA, GSM, TACS, ESMR, GPRS, EDGE, UMTS WCDMA, and others.

The viability and value of Wireless Location System technology has been extensively demonstrated. In 2004 and 2005, TruePosition (the assignee of the present invention) installed E-911 Wireless Location Systems in more than 40,000 Base Transceiver Stations (BTS), providing emergency location coverage for wireless subscribers across the continental United States.

The wireless communications industry has acknowledged the value and importance of the Wireless Location System. In June 1996, the Federal Communications Commission issued requirements for the wireless communications industry to deploy location systems for use in locating wireless 9-1-1 callers. Widespread deployment of these systems can reduce emergency response time, save lives, and save enormous costs because of reduced use of emergency response resources. In addition, surveys and studies have concluded that various wireless applications, such as location sensitive billing, fleet management, and others, will have great commercial value in the coming years.

As mentioned, the wireless communications industry uses numerous air interface protocols in different frequency bands, both in the U.S. and internationally. In general, neither the air interface nor the frequency bands impact the Wireless Location System's effectiveness at locating wireless telephones.

All air interface protocols use two categories of channels, where a channel is defined as one of multiple transmission paths within a single link between points in a wireless network. A channel may be defined by frequency, by bandwidth, by synchronized time slots, by encoding, shift keying, modulation scheme, or by any combination of these parameters.

The first category, called control or access channel, is used to convey information about the wireless telephone or transmitter, for initiating or terminating calls, or for transferring bursty data. For example, some types of short messaging services transfer data over the control channel. Different air interfaces use different terminology to describe control channels but the function of the control channels in each air interface is similar.

The second category of channel, known as voice or traffic channel, typically conveys voice or data communications over the air interface. Traffic channels come into use once a call has been set up using the control channels. Voice and user data channels typically use dedicated resources, i.e., the channel can be used only by a single mobile device, whereas control channels use shared resources, i.e., the channel can be accessed by multiple users. Voice channels generally do not carry identifying information about the wireless telephone or transmitter in the transmission. For some wireless location applications this distinction can make the use of control channels more cost effective than the use of voice channels, although for some applications location on the voice channel can be preferable.

The following paragraphs discuss some of the differences in the air interface protocols:

AMPS—This is the original air interface protocol used for cellular communications in the U.S. and described in TIA/EIA Standard IS 553A. The AMPS system assigns separate dedicated channels for use by control channels (RCC), which are defined according to frequency and bandwidth and are used for transmission from the BTS to the mobile phone A reverse voice channel (RVC), used for transmission from the mobile phone to the BTS, may occupy any channel that is not assigned to a control channel.

N-AMPS—This air interface is an expansion of the AMPS air interface protocol, and is defined in EIA/TIA standard IS-88. It uses substantially the same control channels as are used in AMPS but different voice channels with different bandwidth and modulation schemes.

TDMA—This interface, also known as D-AMPS and defined in EIA/TIA standard IS-136, is characterized by the use of both frequency and time separation. Digital Control Channels (DCCH) are transmitted in bursts in assigned timeslots that may occur anywhere in the frequency band. Digital Traffic Channels (DTC) may occupy the same frequency assignments as DCCH channels but not the same timeslot assignment in a given frequency assignment. In the cellular band, a carrier may use both the AMPS and TDMA protocols, as long as the frequency assignments for each protocol are kept separated.

CDMA—This air interface, defined by EIA/TIA standard IS-95A, is characterized by the use of both frequency and code separation. Because adjacent cell sites may use the same frequency sets, CDMA must operate under very careful power control, producing a situation known to those skilled in the art as the near-far problem, makes it difficult for most methods of wireless location to achieve an accurate location (but see U.S. Pat. No. 6,047,192, Apr. 4, 2000, Robust, Efficient, Localization System, for a solution to this problem). Control channels (known in CDMA as Access Channels) and Traffic Channels may share the same frequency band but are separated by code.

GSM—This air interface, defined by the international standard Global System for Mobile Communications, is characterized by the use of both frequency and time separation. GSM distinguishes between physical channels (the timeslot) and logical channels (the information carried by the physical channels). Several recurring timeslots on a carrier constitute a physical channel, which are used by different logical channels to transfer information—both user data and signaling.

Control channels (CCH), which include broadcast control channels (BCCH), Common Control Channels (CCCH), and Dedicated Control Channels (DCCH), are transmitted in bursts in assigned timeslots for use by CCH. CCH may be assigned anywhere in the frequency band. Traffic Channels (TCH) and CCH may occupy the same frequency assignments but not the same timeslot assignment in a given frequency assignment. CCH and TCH use the same modulation scheme, known as GMSK. The GSM General Packet Radio Service (GPRS) and Enhanced Data rates for GSM Evolution (EDGE) systems reuse the GSM channel structure, but can use multiple modulation schemes and data compression to provide higher data throughput. GSM, GPRS, and EDGE radio protocols are subsumed by the category known as GERAN or GSM Edge Radio Access Network.

UMTS—Properly known as UTRAN (UMTS Terrestrial Radio Access Network), is an air interface defined by the international standard third Generation Partnership program as a successor to the GERAN protocols. UMTS is also sometimes known as WCDMA (or W-CDMA), which stands for Wideband Code Division Multiple Access. WCDMA is direct spread technology, which means that it will spread its transmissions over a wide, 5 MHz carrier.

The WCDMA FDD (Frequency Division Duplexed) UMTS air interface (the U-interface) separates physical channels by both frequency and code. The WCDMA TDD (Time Division Duplexed) UMTS air interface separates physical channels by the use of frequency, time, and code.

All variants of the UMTS radio interface contain logical channels that are mapped to transport channels, which are again mapped to W-CDMA FDD or TDD physical channels. Because adjacent cell sites may use the same frequency sets, WCDMA also uses very careful power control to counter the near-far problem common to all CDMA systems.

Control channels in UMTS are known as Access Channels whereas data or voice channels are known as Traffic Channels. Access and Traffic Channels may share the same frequency band and modulation scheme but are separated by code. Within this specification, a general reference to control and access channels, or voice and data channels, shall refer to all types of control or voice and data channels, whatever the preferred terminology for a particular air interface. Moreover, given the many types of air interfaces (e.g., IS-95 CDMA, CDMA 2000, UMTS, and W-CDMA) used throughout the world, this specification does not exclude any air interface from the inventive concepts described herein. Those skilled in the art will recognize other interfaces used elsewhere are derivatives of or similar in class to those described above.

GSM networks present a number of potential problems to existing Wireless Location Systems. First, wireless devices connected to a GSM/GPRS/UMTS network rarely transmit when the traffic channels are in use. The use of encryption on the traffic channel and the use of temporary nicknames (Temporary Mobile Station Identifiers (TMSI)) for security render radio network monitors of limited usefulness for triggering or tasking wireless location systems. Wireless devices connected to such a GSM/GPRS/UMTS radio network merely periodically "listen" for a transmission to the wireless device and do not transmit signals to regional receivers except during call setup, voice/data operation, and call breakdown. This reduces the probability of detecting a wireless device connected to a GSM network. It may be possible to overcome this limitation by actively "pinging" all wireless devices in a region. However, this method places large stresses on the capacity of the wireless network. In addition, active pinging of wireless devices may alert mobile device users to the use of the location system, which can reduce the effectiveness or increase the annoyance of a polling location-based application.

SUMMARY

The following summary provides an overview of various aspects of exemplary implementations of the invention. This summary is not intended to provide an exhaustive description of all of the important aspects of the invention, or to define the scope of the invention. Rather, this summary is intended to serve as an introduction to the following description of illustrative embodiments.

Methods and systems in accordance with the present invention are employed by a wireless location system (WLS) for locating a wireless device operating in a geographic area served by a wireless communications system. An exemplary method includes monitoring a set of signaling links of the wireless communications system, and detecting at least one predefined signaling transaction occurring on at least one of the predefined signaling links. Then, in response to the detection of the at least one predefined network transaction, at least one predefined location service is triggered.

For example, in accordance with the present invention, a Link Monitoring System (LMS) maintains tables of Abis, A and GSM-MAP interface traffic on a subscriber-by-subscriber basis. U.S. Pat. No. 6,782,264 B2, Aug. 24, 2004, Monitoring of Call Information in a Wireless Location System, discloses how an AMS, an early incarnation of the present LMS, can be used advantageously to initiate location services and schedule radio resources in a Wireless Location System. In the context of the present invention, this retained subscriber information can allow the location of wireless devices to be determined while a subscriber is placing a call, on a call, or even idle. The retained network information can allow for the location of subscribers in an area or in proximity to another specified mobile device. In accordance with the present invention, a series of triggers can be used to effectively locate wireless devices, and this ability to locate wireless devices can be leveraged for possible security-related functions. The series of triggers can include a called-number trigger, MSISDN and IMSI triggering, idle mobile location trigger, list of all mobile devices recently in set of cells (CGI) triggering, background location of all subscribers in set of cells (CGI) triggering, and smart proximity identification triggering. (Those skilled in the art will appreciate that a cell is the area given radio coverage by one base transceiver station, or BTS, and that the standard GSM network identifies each cell via the cell global identity (CGI) number assigned to each cell. A location area (LA) is defined in GSM parlance as a group of cells, and is the area in which the subscriber is paged. Each LA is served by one or more base station controllers, or BSCs, and is assigned a location area identity (LAI) number.)

For example, a wireless device can be located based on the number called by the wireless device. The system can be tasked with a dialled digit trigger at the Link Monitoring System (LMS) in accordance with an aspect of the present invention. (As described below, an LMS in accordance with the present invention may be viewed as an enhanced version of an Abis Monitoring System.) Once the trigger is tasked, the system can automatically locate any wireless device in the service area dialling the specified "trigger" number. For example, when the specified "trigger" number is dialled by another wireless device, the Wireless Location System can identify and locate the wireless device that called the specified "trigger" number. Further, existing AMS trigger/tasking tables support international dialling lengths, and therefore even international numbers can be used as the "trigger" number. (U.S. Pat. No. 6,519,465 B2, Feb. 11, 2003, Modified Transmission Method for Improving Accuracy for E-911 Calls, describes that an E911 "trigger" may be stored in a phone and employed to cause the phone to transmit a special signal when the user dials 911. The special signal assists the WLS in locating the phone.)

A system in accordance with the present invention may be configured to locate a wireless device by its International Mobile Station Identity (IMSI). An IMSI or list of IMSIs can be loaded into the LMS. The LMS can scan the Abis and A messaging traffic until the IMSI-to-TMSI correlation can be verified and retained. The IMSI-TMSI association is updated with changes when the LMS notifies the Serving Mobile Location Center (SMLC). The discovered TMSI is then set as a trigger so that the mobile device of interest can be located at a later time.

The system may also be configured to locate idle mobile devices in a network by requesting the Gateway Mobile Location Center (GMLC) to submit Any Time Interrogation (ATI) queries to the HLR. Submission of ATI queries to the HLR can result in a call being placed to the wireless device by the network, using supplementary services. The call placed to the wireless device by the network can page and authenticate the wireless device without placing the wireless device on a traffic channel or otherwise notifying the subscriber of the call. During the paging and authentication messaging, the system can use U-TDOA to process and accurately determine the location of the wireless device. A lower accuracy CGI+TA location is automatically generated by this transaction. Acting as a GSM Service Control Function (gsmSCF), the GMLC may use ATI to request information (e.g., subscriber state and location information) from the HLR at any time. The ATI procedure can be used to transition the MS from an idle state to an active signaling state which then can be located with high-accuracy by the wireless location system.

Wireless devices may also be identified and located based on their presence in a defined geographic area. This feature can be accomplished by loading a location area, defined as a set of cells (CGIs), into the LMS. The LMS then develops a list of IMSIs, MSISDNs, and associated TMSIs that initiate a network transaction in the geographic area of interest. A network transaction for this feature may be defined as a call origination or termination, a SMS exchange, and a location update (i.e., a GSM MAP "location" update for the purposes of roaming as opposed to a U-TDOA location event).

Mobile devices can also be identified and located based on their historical presence in a pre-defined geographic area. The background location feature can allow an operator to define an area of interest, collect the IMSI/TMSI information for mobiles that had a network transaction in the area of interest, and locate the identified mobiles on later network transactions.

Mobile devices can also be identified and located on the basis of proximity to another mobile device using Smart Proximity Identification. The Smart Proximity Identification feature can be used to allow an operator to obtain a list of wireless devices operating in the same area as a mobile device of interest. For example, a set of wireless devices operating in an area near a known wireless device of interest can be located. The known wireless device can be located via its known mobile ID. Subsequently, a complete list of mobile devices in the same area can be determined. The mobiles found in the same geographic area as the mobile of interest can then be queried via Anytime Interrogation (ATI) and the supplementary services and the locations produced can be used to determine proximity to the mobile of interest.

Additional features and advantages of the invention will be made apparent from the following detailed description of illustrative embodiments.

BRIEF DESCRIPTION OF THE DRAWINGS

The foregoing summary, as well as the following detailed description, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

A. Overview

The inventive system described herein may be viewed as a substantial extension of the system described in U.S. Application Ser. No. US10/768,587, and its parent, U.S. Pat. No. 6,782,264 (Anderson). For example, while the '264 patent describes a system that monitors communications between a base transceiver station and base station controller, and forwards mobile station (MS) information to a Wireless Location System for emergency call location, the advanced location-based services applications described herein utilize additional network messages as triggering events and information sources for a wide variety of location-based services.

It should be noted that many of the acronyms and abbreviations used herein are taken from Technical Report GSM 01.04 V8.0.0 (2000-05), Digital cellular telecommunications system (Phase 2+); version 8.0.0 (Release 1999); *Abbreviations and acronyms*. The terminology and nomenclature used to describe this invention are intended to be non-limiting and are based on the GSM definitions published by the GSM Association in "Terms & Acronyms". This publication is available at http://www.gsmworld.com/technology/glossary-.shtml. However, although GSM-centric terms are used, the concepts embodied in the subject matter described herein apply to other wireless radio communications networks.

In Universal Mobile Telecommunications System (UMTS), the planned successor to GSM, the wideband Code Division Multiple Access (W-CDMA) radio interface will benefit from use of wideband radio network monitor (RNM) receivers for passive radio monitoring. Wideband location measuring units (LMUs) may be used for high-accuracy U-TDOA and AoA location. Changes to the interface and interoperability standards by the Third Generation Partnership Program (3GPP) mean that some of the acronyms and naming conventions change, but the operations performed in the radio control network and intelligent services network remain substantively the same. Thus, in this specification, these items can be viewed as equivalents:

| GSM/GPRS/GSM-R | UMTS |
| --- | --- |
| Cell Global Identifier (CGI) | Cell ID (CI) |
| Timing Advance (TA) | ½ Round-Trip-Time (RTT) |
| Abis Interface | Iub Interface |
| A Interface | Iu-CS (circuit Switched) or Iu-PS (Packet Switched) |
| Abis Monitor (LMS) | Iub Monitor (IMS) |
| Base transceiver station (BTS) | Node-B |
| Base station Controller (BSC) | Radio Network Controller (RNC) |
| Mobile Station (MS) | User Equipment (UE) |
| Subscriber Information Module (SIM) | User Service Identity Module (USIM) |

Figure 1A:
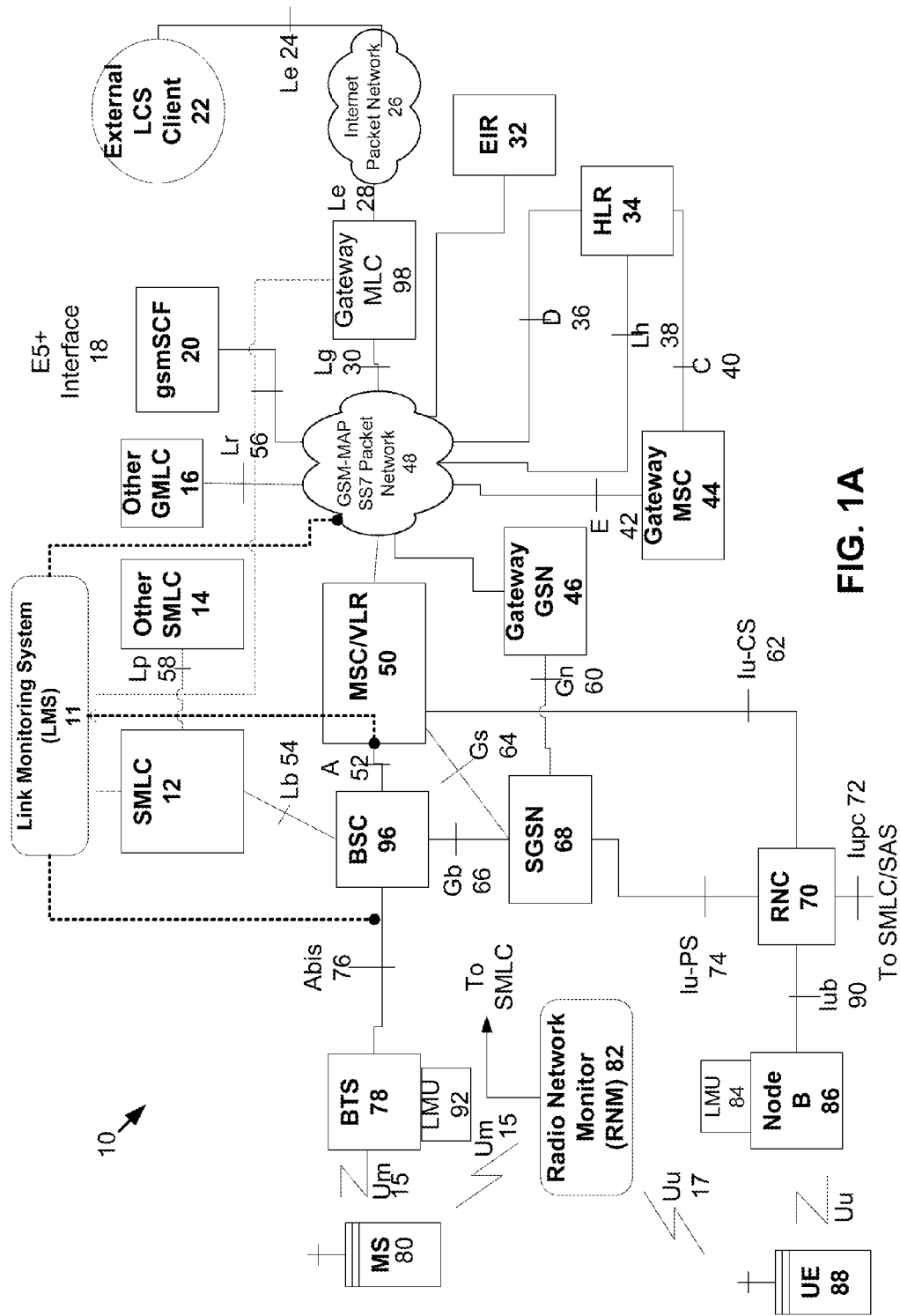
FIG. 1A illustrates an exemplary architecture for a GERAN/UTRAN network reference in accordance with the present invention.

FIG. 1A shows the architecture of an illustrative GERAN/UTRAN network reference model 10 with a Radio Network Monitor (RNM) 82 and a Link Monitoring System (LMS) 11. The RNM 82 is effectively a bank of narrowband receivers tunable to both the uplink and downlink channels anywhere in the frequency band. The RNM was initially implemented on the TruePosition® AnyPhone™ Location Measuring Unit (LMU) radio receiver platform (the present LMU was previously described in U.S. Pat. No. 6,782,264 as the alternative narrowband embodiment of the receiver module for the SCS). The LMS is an improvement to the Abis monitor described in U.S. Pat. No. 6,782,264 and is able to monitor not only the Abis and A interfaces, but also the GSM-MAP, Iub, Iu-PS and Iu-CS interfaces. The LMS can be implemented, with modifications, on the same hardware/software chassis as the Abis Monitor (a set of custom applications with unmodified Agilent Access7 software application running on a cluster of Intel TSEMT2 or TSRLT2 UNIX servers)

The network 10 further includes a Serving Mobile Location Center (SMLC) 12. The RNM 82 is the primary component that can be deployed at a carrier's cell sites. The RNM 82 is preferably implemented as a distributed network of radio receivers capable of receiving RACH and SDCCH messages for autonomous generation of location services. The RNM 82 tunes to directed frequencies to gather data for the system. The RNM 82 can then forward the collected data to the SMLC 12. All RNMs 82 in a network are preferably time- and frequency-synchronized through the use of the Global Positioning Satellite (GPS) constellation (not shown).

The SMLC 12 is preferably a high volume location-processing platform. The SMLC 12 contains U-TDOA and multipath mitigation algorithms for computing location, confidence interval, speed, and direction of travel. The SMLC 12 can also determine which wireless phones to locate based upon triggering from the Link Monitoring System (LMS) 11 or requests from the $L_b$ interface 54 to an infrastructure vendor's Base Station Controller (BSC) 96 (or MSC 50 in some cases). The SMLC 12 is typically co-located at the operator's BSC 96 but can also be remotely distributed. The primary functions of the SMLC 12 are to receive reports on signal detection from the RNMs 82, to perform location processing, and to calculate the location estimate for each signal. The SMLC 12 manages the network and provides carrier access to location records. The SMLC 12 is responsible for the collection and distribution of location records. The SMLC 12 also maintains configuration information and supports network management.

The LMS 11 continuously monitors all Abis signaling links 76 (and in some cases A-interface links 52 and GSM Mobile Application Protocol (GSM-MAP) 48 interface) in a network 10 to which the LMS 11 is connected. The function of the LMS 11 is to capture messages in the call (e.g., a GSM voice conversation or a GPRS data session) and SMS setup procedure, mid-call control messages, and call termination and release messages for MSs 80. The LMS 11 then forwards the data contained in those messages to the SMLC 12 for subsequent location processing.

The GSM service control function (gsmSCF) 20, also called a service control point (SCP), contains database and logical rules for providing non-call oriented services to a subscriber. The GSM Mobile Application Protocol (GSM-MAP) 48 is the communications medium for call-related control services on the wired part of a wireless network. The GSM-MAP 48 exists to provide services like automatic roaming, authentication, location services intersystem hand-off, and short message service routing on a GSM or UMTS network. All wireless network elements such as the MSC 50, HLR 34, VLR (in the MSC 50), GMSC 44, EIR 32, GMLC 98, and gsmSCF 20 use this messaging protocol to communicate among each other. The GSM-MAP 48 resides on the international Signaling System 7 network (SS7).

The Gateway Mobile Location Center (GMLC) 98 is defined by 3GPP standards as the clearinghouse for location records in a GSM/GPRS/UMTS network. The GMLC 98 serves as a buffer between the tightly controlled SS7 network (the GSM-MAP network) 48 and the public internet. Authentication, access control, accounting, and authorization functions for location-based services are commonly resident on or controlled by the GMLC 98.

The Le interface 24 is an IP-based XML interface originally developed by the Location Interoperability Forum (LIF) and then later standardized by the 3rd Generation Partnership Program (3GPP) for GSM (GERAN) and UMTS (UTRAN). The Location-based services (LBS) client 22 is also known as a LCS (Location Services). The LBS and LCS 22 are software applications and services uniquely enabled to use the location of a mobile device.

The E5+ interface 18 is a modification of the E5 interface defined in the Joint ANSI/ETSI Standard 036 for North American E9-1-1. The E5+ interface 18 connects the SMLC 12 and GMLC 98 nodes directly allowing for push operations when LMS 11 or RNM 82 triggers are used by the wireless location system with either network acquired information (cell-ID, NMR, TA, etc) or via TDOA and/or AoA (angle of arrival) performed by specialized receivers.

User equipment (UE) 88 can be defined as equipment such as a UMTS mobile device. NodeB 86 is the Universal Mobile Telephony System Radio Access Network (UTRAN) network interface to the UMTS radio interface. The Radio Network Controller (RNC) 70 enables autonomous radio resource management (RRM) by UTRAN. The RNC 70 performs the same functions as the GSM BSC, providing central control for the RNS elements (RNC and Node Bs). The RNC 70 handles protocol exchanges between Iu, Iur, and Iub interfaces and is responsible for centralized operation and maintenance of the entire radio network system.

The Serving GPRS Support Node (SGSN) 68 monitors the location of individual GPRS capable Mobile Stations 80 and performs basic security functions and access control functions. The SGSN 68 can serve both the Global System for Mobility (GSM) radio access network (GERAN) and UMTS radio networks.

The Gateway GPRS Support Node (GGSN) 46 acts as a system routing gateway for the GPRS network. The GGSN 46 is a connection to external packet data networks (e.g., public internet) and performs the task of billing, routing, security firewalling, and access filtering. The Gateway MSC (GMSC) 44 acts as a bridge for roaming subscribers to visited MSCs in other operator's networks. Both control signaling and traffic trunks are setup via the GMSC 44.

The Um 15 is the GSM radio interface. The Uu 17 is the UMTS radio interface. The Iub interface 90 is located on a UMTS network and is found between the RNC (Radio Network Controller) 70 and the NodeB 86. The Iupc 72 interconnects the UMTS RNC 70 with the SMLC (also called the SAS) in the UMTS network for location estimation generation. The Iu-CS (Circuit Switched) interface 62 connects the UMTS RNC 70 with the circuit switched communications oriented network (the MSC) 50. The Iu-PS (Packet Switched) interface 74 connects the UMTS RNC 70 with the packet switched communications oriented network (SGSN) 68. The Gb interface 66 interconnects the BSC 96 with the SGSN 68 allowing for routing of GPRS communications.

The Gn interface 60 is a GPRS packet interface which is located between the SGSN 68 and GGSN 46. The Gs interface 64 is a GPRS system interface located between the SGSN 68 and the MSC 50. The Gr interface is a GSM-MAP interface which is located between the SGSN 68 and the Home Location Register (HLR) 34.

As described in U.S. Pat. No. 6,782,264, it is possible to monitor the base transceiver station (BTS) to base station controller (BSC) link (e.g., the Abis link) for triggering messages and information fields. A passive network monitor, called the AMS (Abis Monitoring System) in the '264 patent and exemplified by monitoring the GSM Abis interface, has been extended in accordance with the present invention and is now called the Link Monitoring System, or LMS. The Link Monitoring System (LMS) can monitor multiple cellular network data links simultaneously, scanning for data of interest, and can detect particular messages or data fields within messages. Setting or tasking of messages or data fields of interest can take place at any time. When a match occurs, the LMS may be further triggered to perform a pre-set action, such as a write to storage memory or forwarding of the triggering message and (or) data fields to another system node.

The Radio Network Monitor extends the concept of passive monitoring for location triggering information and messaging to the radio air interface. The RNM can detect and monitor both uplink (mobile device to BTS or NodeB) and downlink radio communications.

The illustrative system employs information from both the wireless network and the wired (or landline) network. In advance of national or international standardization efforts for location-based services in such organizations as 3GPP, ETSI and ANSI, the LMS has been developed to assist in acquiring the certain radio, call and caller information for the immediate deployment of location-based services. All attributes and abilities of the LMS can be incorporated into other nodes of the wireless and wired communications networks. This approach is applicable to all digital cellular and like wireless networks, including but not limited to TDMA, CDMA, and OFDM-based wireless networks. (OFDM stands for Orthogonal Frequency Division Modulation, a spread spectrum method used for carrier modulation in digital transmissions). The GSM system is used to describe the inventive concepts underlying the present invention, but the differing naming systems and acronym conventions used does not preclude application of the invention to the GPRS and UMTS system.

The Link Monitoring System allows for passive, non-intrusive monitoring of, for example, the GSM, GSM-R, GPRS, and UTMS systems. In the exemplary case of a GSM system, the LMS can passively receive data streams from the Abis (BTS-BSC) interface, the A (BSC-MSC) interface, and the GSM MAP interface (MSC-HLR, MSC-GMLC, MSC-GMSC and MSC-gsmSCF). The term GSM MAP (where MAP stands for Mobile Application Part) is used to refer to the global SS7 network and includes the C, D, E, F, H, Gc, Gf, Gr, Lh, and Lg interfaces.

In the exemplary case of a GPRS system, the LMS can passively receive data streams from the Abis (BTS-BSC or BTS-PCU) interface, the Gb (PCU-SGSN) interface, and the GSM MAP interface (SGSN-HLR, SGSN-GMLC and SGSN-gsmSCF). In the exemplary case of a UMTS system, the LMS can passively receive data streams from the Iub (Node B-RNC) interface, the Iu-CS (RNC-MSC) interface, the Iu-PS (RNC-SGSN) interface, and the GSM MAP interface (MSC-HLR, MSC-GMLC and MSC-gsmSCF, SGSN-HLR, SGSN-GMLC and SGSN-gsmSCF).

The LMS can search received data for particular messages or data fields within messages. Setting or tasking of messages or data fields of interest can take place at any time. When a match occurs, the LMS is further triggered to perform a pre-set action, normally a write to storage memory or forwarding of the triggering message and (or) data fields to another system node.

Once the LMS has been triggered, a variety of information may be obtained from the triggering message or subsequent data messaging. Information gleaned from this method can include event-related information, mobile or subscriber account information, conversation-related information, serving cell information, and radio environment information.

Event-related information can include the triggering event, accumulated radio interface and cellular system data, subscriber data, the monitored data link where the triggering data was received as well as internally developed LMS timestamp and indexing information. Mobile or subscriber account information can include information available from the handset over the radio interface and from the carrier HLR. Both the IMEI from the handset and the IMSI from the SIM could be acquired, as well as the calling or called MS-ISDN, dependent on the links monitored and the messages scanned. Conversation-related information can include the calling number and the called number for both the mobile originating and mobile terminating cases. These numbers are sometimes also called the SMS PINS, but would still be included in the conversation-related information.

Serving cell information can include the Cell ID (CGI for GERAN networks or CI for UMTS networks), the Timing Advance (TA in GSM/GPRS) or Round-Trip-Time (RTT in UMTS), the Radio Frequency (Absolute Radio Frequency Channel Number (ARFCN)), the Base Station Identity Code (BSIC), the Terminal Endpoint Identifier (TEI), and Location Area Code (LAC). Prior Cell information is available during a handover event and includes the same data set as the current serving cell.

Radio-related information gathered by the system can include the uplink (MS to BTS, or UE to Node-B) and the downlink (BTS to MS or Node-B to UE) power and quality levels, and the Beacon or Broadcast Control Channel (BCCH) ARFCN, power, and quality. The Network Measurement Report (NMR) with channel and power levels to potential handoff candidates sectors or cells can also be collected when available.

We will now describe the use of radio transactions, network events, and filters in accordance with various aspects of the present invention.

B. Radio Transactions, Network Events and Filters

The network monitor allows the wireless location system to passively monitor the traffic between the mobile phone and the BTS on both the uplink and downlink. The Radio Network Monitor (RNM) 82, a wideband receiver or bank of narrowband receivers located within the area of interest, scans and discovers, or is pre-set with frequency, timeslot, codes and/or hopping sequence, to monitor the Random Access Channels (RACH), Access Grant Channels (AGCH) and control channels (SDCCH in GSM/GPRS) for messages of interest. Since the RNM 82 has no capability to decrypt encrypted information the message transactions of interest will be restricted to: (1) call originations, (2) call terminations, (3) short message service (SMS) originations, (4) SMS terminations, and (5) location update requests.

Wireless devices can be located without physical connection to the wireless carrier's infrastructure through the use of the RNM 82 by receiving the Access Grant Channels (AGCH) on the downlink transmissions from the BTS and accessing the messaging information contained therein which includes the timing advance (TA), channel reference number and frame number. This information is obtained by detecting, demodulating and decoding the unencrypted AGCHs from the BTS's downlink transmissions. This is used as a network-autonomous trigger for the wireless location system enabling it to locate the wireless device with UTDOA by receiving subsequent uplink transmissions from the mobile devices on SDCCH. The wireless device's location can also be estimated, albeit with much less accuracy than UTDOA or AoA, with CGI+TA. The CGI+TA can be improved with other information from the AGCH as well as other a priori information about the wireless network. Demodulating and decoding the initial SDCCH transmissions from the mobile device will provide identifying information about the mobile device, specifically the TMSI or IMSI. If ciphering is not enabled in the wireless network further demodulation and decoding of SDCCH transmissions from the wireless device will provide other identifying information such as IMEI, MSISDN as well as calling number or called number.

C. Network Triggers and Events

The LMS 11 may be set to trigger on call connection events or radio interface events. These events may comprise a single message or a series of messages, each related to the call connection or radio event. These events include: (1) Network Measurement Report Received, (2) Mobile Originated Call Placed, (3) Mobile Terminated Call Received, (4) Mobile Originated SMS Sent, (5) Mobile Terminated SMS Received, (6) Handover (Begins), (7) Handover (Completed), (8) Location Update, (9) RF Channel Assignment, (10) IMSI Attach, (11) IMSI Detach, (12) Mobile Originated Call Disconnect (13) Mobile Terminated Call Disconnect, and (14) Identify Equipment Response, and (15) Call Failure.

The inventive system described herein uses more than the call setup messaging transactions previously described in U.S. Pat. No. 6,782,264 (Anderson). In addition to the call setup information employed for location system triggering and tasking, advanced location-based services triggering applications may utilize additional radio interface, Abis, A, and GSM-MAP interface messages transactions and data. The term "transaction" refers to a message or message sequence potentially useful to the advanced trigger invention. The term "filter" refers to pre-set rules in the LMS for analysis of the monitored data within the transaction. Filters can include MS identification, cell identification, location area codes, or differences between the monitored and expected pre-set information.

The following procedures are used for location triggering by the Radio Network Monitor (RNM) and/or Link Monitoring System (LMS). A trigger for wireless location consists of a transaction and a filter. If a transaction occurs and the filtering matches, then a location trigger is generated. Each procedure contains the messaging needed for determination if a potential location-triggering event has occurred. The description of each message includes the fields for filtering by the preset rules for positive determination of the occurrence of a location trigger.

In the interest of brevity, descriptions of some common call message sequences are grouped as procedures.

Initial Channel Assignment Procedure

The initial channel assignment procedure described below is common to (1) mobile originated calls, (2) SMS originations, and (3) location updates. In the initial channel assignment procedure, no messaging is encrypted over the radio interface and therefore all Mobile to BTS and Mobile to BSC communications are available to the RNM as well as to the LMS.

The mobile device sends a CHANNEL REQUEST [3GPP 44.018, 9.1.8] to the BTS via the Random Access Channel (RACH) and the BTS then sends a CHANNEL REQUIRED message [3GPP TS 48.058, 8.5.3] to the BSC. The BSC will first respond with a CHANNEL ACTIVATION [3GPP TS 48.058, 8.4.1] message to the BTS. The BTS (if sufficient radio resources are available) will respond to the BSC with a CHANNEL ACTIVATION ACKNOWLEDGE message [3GPP TS 48.058, 8.4.2]. This message pair is linked via the contained Channel Number.

Once the BSC has confirmed the reservation of the channel for the Mobile device, the BSC will order the Mobile via the BTS with a IMMEDIATE ASSIGNMENT COMMAND message [3GPP TS 48.058, 8.5.6] on the downlink CCCH (the Access Grant Channel (AGCH).

The IMMEDIATE ASSIGNMENT COMMAND consists of one of three possible Radio Resource (RR) assignment commands in the "Full 1 mm Assign Info" element. The relevant immediate assignment message is as defined in 3GPP TS 04.08 (IMMEDIATE ASSIGNMENT [3GPP TS 24.008, 9.1.18], or IMMEDIATE ASSIGNMENT EXTENDED [3GPP TS 24.008, 9.1.19] or IMMEDIATE ASSIGNMENT REJECT [3GPP TS 24.008, 9.1.20]) with the "Page Mode" element set to the value "no change".

The IMMEDIATE ASSIGNMENT COMMAND messages are all associated to the original CHANNEL REQUIRED message on the Abis link via the Request Reference parameter [3GPP TS 48.058, 9.3.19 and 3GPP TS 44.018, 10.5.2.30]. This Request Reference parameter identifies the both access request and access reason.

By linking the Establishment Cause Value [3GPP TS 44.018, Table 9.1.8.1] 9.1.8] of the original CHANNEL REQUEST and CHANNEL REQUIRED messages with the Channel Number carried in the IMMEDIATE ASSIGNMENT COMMAND, the RNM or LMS can follow the ongoing call origination, SMS origination, or location update to the S-DCCH where mobile and subscriber identification will become available.

The RNM and LMS will collect the cause value and the S-DCCH assignment, storing both in local memory. If the cause value is part of a location trigger for call origination, SMS origination, or location update event, the RNM or LMS may inform the wireless location system of the event for scheduling, initialization of a new historical call record, updating of an existing call record or the keeping of statistics on such network access events. The RNM and LMS will also collect originating cell site information such as cell ID or CGI.

1. Location Update

In order for the MS to make mobile-terminated calls, the wireless network should know the location of the MS, regardless of its movement. Thus, the MS periodically reports its location to the network using the Location Update procedure. The Location Update procedure is performed when: (1) the MS has been switched off and wants to become active; (2) the MS is active but not involved in a call, and it moves from one location area to another; or (3) after a regular predetermined time interval. During a Location Update procedure and the processing of a mobile call, certain numbers are used including the Mobile Station ISDN Number (MSISDN), the Mobile Subscriber Roaming Number (MSRN), the International Mobile Subscriber Identity (IMSI), the Temporary Mobile Subscriber Identity (TMSI), and the Local Mobile Station Identity (LMSI) described above.

The Mobile Station ISDN Number (MSISDN) is the directory number allocated to the mobile subscriber. The MSISDN is dialed to make a telephone call to the mobile subscriber. The number consists of Country Code (CC) of the country in which the mobile station is registered (for example, Germany is 49, and Brunei is 673), followed by a national mobile number which consists of Network Destination Code (NDC) and Subscriber Number (SN). A Network Destination Code is allocated to each GSM PLMN. The composition of the MSISDN is such that it can be used as a global title address in the Signaling Connection Control Part (SCCP) for routing messages to the HLR of the mobile subscriber.

The Mobile Station Roaming Number (MSRN) is the number required by the gateway MSC to route an incoming call to a MS that is not currently under the gateway's control. Using the MSISDN, a mobile-terminated call is routed to the gateway MSC. Based on this MSISDN, the gateway MSC can request for a MSRN to route the call to the current visited MSC.

The International Mobile Subscriber Identity (IMSI) is embodied in the SIM of the mobile equipment. The MS provides the IMSI any time the MS accesses the network. The IMSI code has three components including the Mobile Country Code (MCC), which has the same meaning and format as in the LAI, Mobile Network Code (MNC), which also has the same meaning and format as in the LAI, and the Mobile Subscriber Identification Number (MSIN), which is the code that identifies the mobile subscriber within a GSM PLMN. The overall number of digits in an IMSI code does not exceed 15.

The Temporary Mobile Subscriber Identity (TMSI) is an identity alias that is used instead of the IMSI when possible. The use of a TMSI ensures that the true identity of the mobile subscriber remains confidential by eliminating the need to transfer an IMSI code enciphered over a radio link. A Visitor Location Registry (VLR) allocates a unique TMSI code to each mobile subscriber that is operating in its area. This code, which is valid only within the area supervised by the VLR, is used to identify the subscriber in messages to and from the MS. When a change of location area also involves a change of VLR area, a new TMSI code is allocated and communicated to the MS. The MS stores the TMSI on its SIM.

The Local Mobile Station Identity (LMSI) is temporary subscriber data. Use of the LMSI is, however, optional. In order to speed up the search for subscriber data in the VLR, a supplementary Local Mobile Station Identity (LMSI) can be defined. The LMSI is allocated by the VLR at location updating and is sent to the Home Location Resister (HLR) together with the IMSI. The HLR makes no use of the LMSI, but includes it together with the IMSI in all messages sent to the VLR concerning that MS.

When the GSM or UMTS mobile station (i.e., wireless device) detects a change in the Location Area Index (LAI) carried by the serving cells BCCH, a location update procedure can be invoked. A GSM or UMTS mobile can perform a Location Area Update (LAU) when in the Idle state. The LAU can be triggered when the mobile crosses a LA (Location Area) boundary, or periodically (the periodicity being set by the carrier network). A LAU can also be performed when the mobile is powered on. If the change in LAI occurs mid-call (either due to carrier changes to the LAC or from movement of the Mobile), the mobile station can perform the Location Update procedure once the call has completed and the mobile has returned to idle state.

Similarly a GPRS mobile can perform a Routing Area Update in the Ready and Standby state. The RAU can be triggered when the mobile crosses a RA (Routing Area) boundary, or periodically (the periodicity being set by the carrier network). A RAU can also be performed when the mobile moves from the Idle to the Standby state as will typically happen when the mobile is powered on. Execution of a RAU caused by crossing a LAC boundary can be accompanied by a LAU for mobile devices with both packet data (GPRS) and voice capability (GSM/UMTS).

The Location Update procedure uses the initial channel assignment procedure described above with the CHANNEL REQUIRED message's cause value [3GPP TS 24.008, 9.1.8] bit sequence set for "Location Updating"

Once assigned to an S-DCCH, the mobile device sends the Mobility Management (MM) message LOCATION UPDATE REQUEST [3GPP TS 24.008, 9.2.15] to the BTS which echoes back the LOCATION UPDATE REQUEST. The BTS then passes the LOCATION UPDATE REQUEST to the BSC. The LOCATION UPDATE REQUEST will contain either the mobile devices static International Mobile Station Identifier (IMSI) [3GPP TS 23.003, 2.2] or the locally assigned Temporary Mobile Station Identifier (TMSI) [3GPP TS 23.003, 2.4] depending on the registration status of the mobile. A newly powered-on mobile will initiate the LOCATION UPDATE REQUEST with the IMSI, while those mobile devices already registered with the network or one just entering the LA will use the TMSI for identification during the LOCATION UPDATE REQUEST.

The network will then authenticate the mobile device, set ciphering, could check the IMEI of the mobile device via the Identity Request procedure, could set a new TMSI via the TMSI reallocation procedure, complete the location update procedure, and then use the Release procedure to free up the reserved S-DCCH channel for other uses.

The completion of the successful Location Update procedure requires that the LOCATION UPDATING ACCEPT [3GPP 24.008, 9.2.13] be sent by the MSC via the BSC and BTS to the mobile. The LMS may collect the mobile's current location area identification (LAI) [3GPP TS 24.008, 10.5.1.3] at this time.

During the location update procedure, the RNM or LMS can collect the TMSI to IMSI association for the newly registered mobile, collect the TMSI associated to both the collected location areas and collected serving cells (current and prior), and can trigger the wireless location system to perform either a low accuracy (Cell-ID and Cell-ID with timing advance are both available) or high accuracy (U-TDOA and/or AoA based) location estimate while the mobile is on the S-DCCH.

A high accuracy location usually involves using TDOA or AoA for a more accurate location of a wireless device than is available via cell ID techniques. The high accuracy location is more accurate than cell-based location techniques and is typically better than 250 meters in accuracy. In the United States, high accuracy has been defined by the Federal Communications Commission (FCC) in the E9-1-1 phase II mandate as 100 meters or less 67% of the time and less than 300 meters 95% of the time. In contrast, a low accuracy location uses cell-ID based location techniques such as CGI/CI, CGI/CI with TA/RTT, and Enhanced Cell ID (ECID). These low accuracy location techniques have highly variable non-uniform location accuracies that are not as accurate as the high accuracy techniques discussed above.

The ECID technique relies on the mobile device's ability to record the power levels (RXLev) of multiple potential handover candidate/neighbor cells. This technique adds a power-difference-of-arrival (PDOA) measurement, derived from the existing GSM Network Measurement Report (NMR), in an attempt to improve a CGI+TA-based location estimate.

The PDOA value is based on the received signal levels (RXLEV) collected by the mobile for the serving cell and at least three neighboring cells. Since the PDOA data collection requires visibility to three or more neighbor cell sites, yield will be less than 100%. The affects of RF multipath, mobile receiver quality, and granularity of the 7-bit RxLEV measurement act to reduce location accuracy.

Since ECID uses PDOA multi-lateration, the geographic layout of the neighbor cells also affects the quality of the location through geographic dilution of precision. The limitation of only 6 neighbor cell RxLEV measurements present in the NMR limits accuracy by limiting potential GDOP reduction though site selection.

Since the PDOA measurement requires averaging over multiple samples (NMR is sent every 480 ms during an active call), latency is much higher then for other cell-ID based techniques.

Figure 1B:
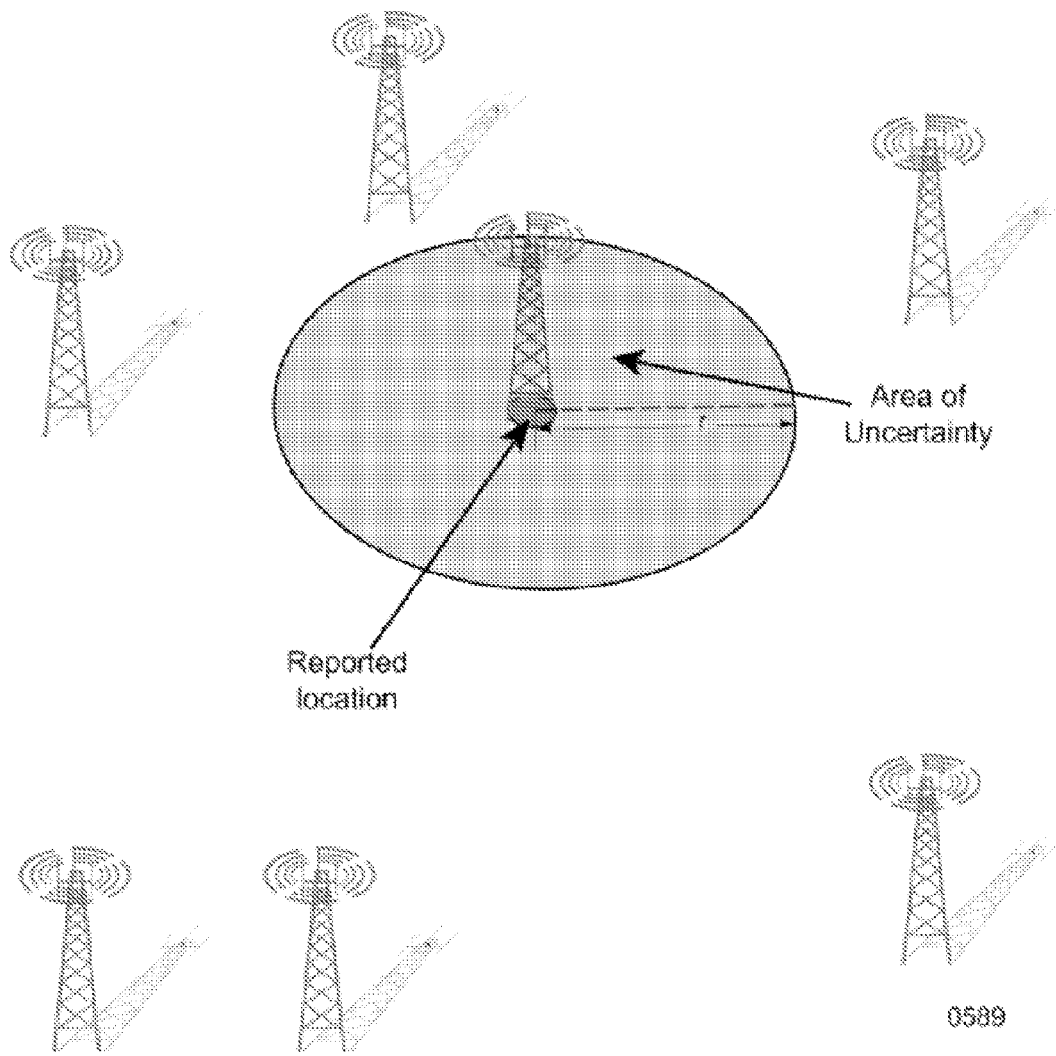
FIG. 1B illustrates the CGI/CI location for omni cells in accordance with the present invention.
Figure 1C:
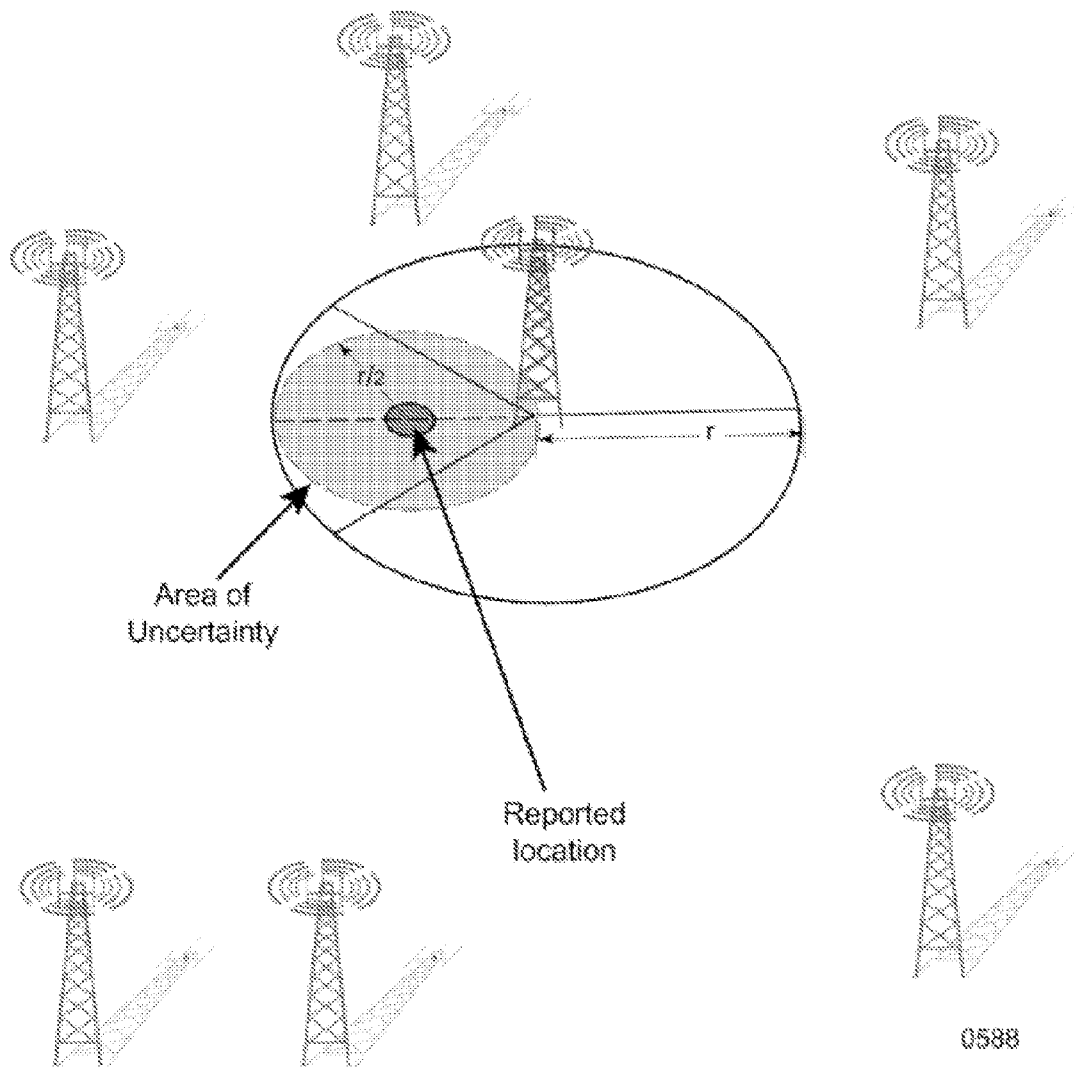
FIG. 1C illustrates the CGI/CI location for sectored cells in accordance with the present invention.
Figure 1D:
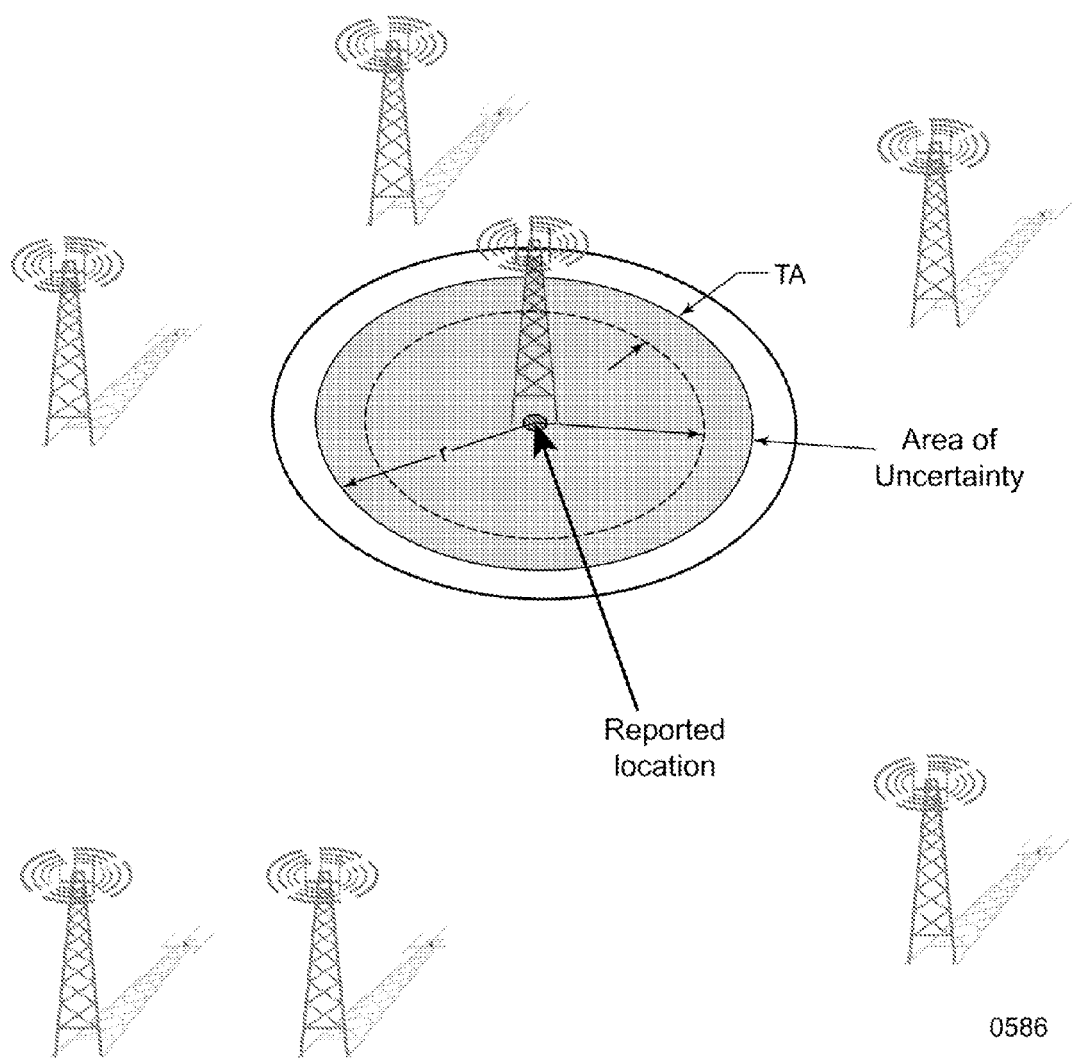
FIG. 1D illustrates the CGI+TA location for omni cells in accordance with the present invention.
Figure 1E:
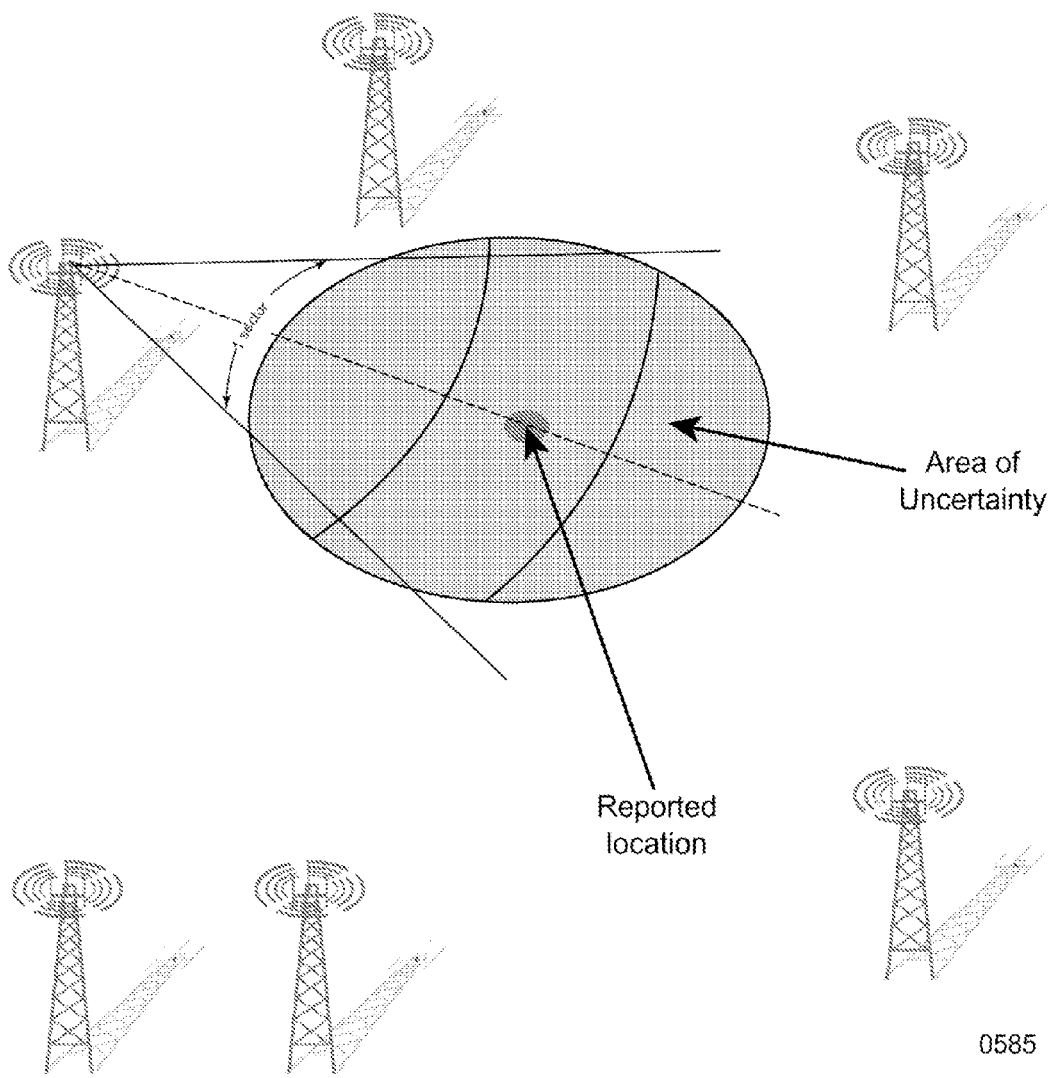
FIG. 1E illustrates the CGI+TA location for sectored cells in accordance the present invention.
Figure 1F:
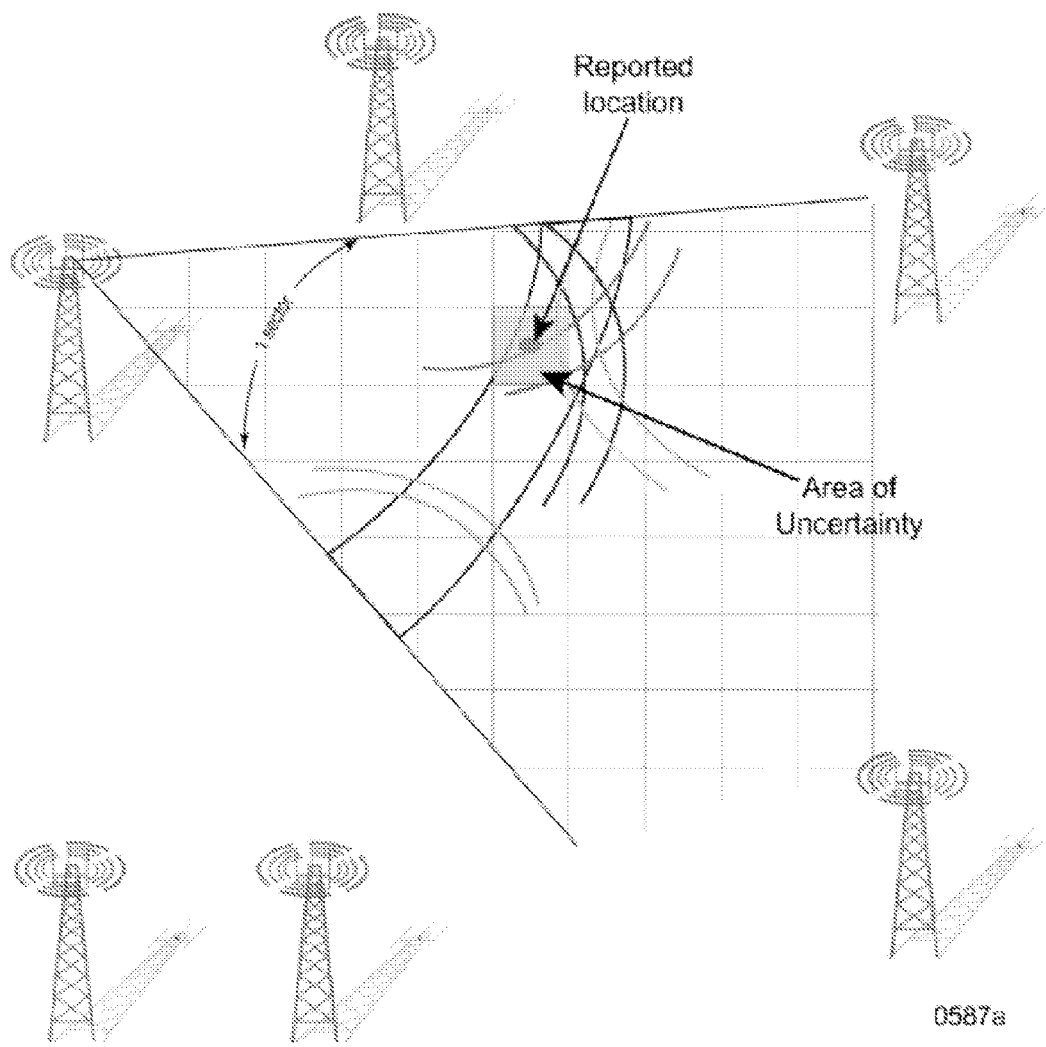
FIG. 1F illustrates Enhanced Cell ID (ECID) with grid mapping in a sectored cell in accordance with the present invention.

FIGS. 1B and 1C illustrate the CGI/CI location for omni and sectored cells respectively. FIGS. 1D and 1E illustrate the CGI+TA (omni) and CGI+TA (sectored) location processes FIG. 1F illustrates Enhanced Cell ID (ECID) with grid mapping in a sectored cell. FIGS. 1B-1F are shown in accordance with the present invention and are as used in wireless telecommunications industry conventions and standards.

The location update is detectable over the GSM, GPRS, or UMTS air interface using the SDCCH Radio Network Monitor (RNM) 82. The Location Update is also detectable over the Abis interface as a Location Update Request mobility management message. The Location Update event will trigger the LMS 11 to collect additional information for both low accuracy locations (CGI, CGI+TA, and CGI+TA+NMR) and radio frequency information for tasking Location Measuring Units (LMUs) 92 emplaced in the carrier local area for high accuracy TDOA or AoA location.

2. Routing Update

A GPRS mobile will perform a Routing Area Update (RAU) in the Ready and Standby state. The RAU is triggered when the mobile crosses a Routing Area (RA) boundary, or periodically, the periodicity set by the carrier network. A RAU is also performed when the mobile moves from the Idle to the Standby state. This will typically happen when the mobile is powered on.

3. Handover

A typical handover occurs between traffic channels mid-session when a wireless phone is handed from one cell or sector to the next in order to maintain a radio connection with the network. Handovers between control channels are also possible. The variables that dictate a handover depend on the type of cellular system. In CDMA based systems, interference requirements are the limiting factor for handover. In FDMA and TDMA systems such as GSM the main limiting factor is the signal quality available to the Mobile Station (MS). Other factors include: distance from the antenna (Timing Advance in GSM, Round Trip Time in UMTS); local load; and received signal strength or path loss levels.

Handover messaging takes place on the Fast Associated Control Channel (FACCH). The Fast Associated Control Channel appears in place of the traffic channel when lengthy signaling is required between a GSM mobile and the network while the mobile is in call. The GSM Handover is detectable over the Abis interface as a Handover Command RR BSS-MAP message. The Handover Command cannot be normally detected by the RNM 82 unless encryption key sharing is enabled.

The handover procedure starts with the HANDOVER COMMAND [3GPP TS 44.018, 9.1.15] issued by the BSC to the BTS. The HANDOVER COMMAND contains the current Cell ID [3GPP 23.003, 4.3.1], the current TCH [3GPP TS 44.018, 10.5.2.5] and future TCH [3GPP TS 44.018, 10.5.2.5a], the Timing Advance [3GPP TS 44.018, 10.5.2.40] and the Handover Reference [3GPP TS 44.018, 10.5.2.15].

The handover procedure completes with the HANDOVER COMPLETE [3GPP TS 44.018, 9.1.16] message between the BTS and BSC. This message exists to confirm the handover was successful. The LMS can use this message for the same purpose.

The LMS can collect all the information fields available in the listed messages for local storage, location triggering and for following the TCH reassignment for the current call. The LMS may forward the collected information and accumulated call record to the WLS for a low-accuracy location based on the newly collected cell-ID and timing advance data. The LMS may forward the collected information and accumulated call record to the WLS for a high accuracy U-TDOA or AoA location on the newly assigned Traffic Channel.

4. Call Release

Call Release refers to the end-of-call or end-of-data session when channel resources currently reserved for use are freed for reuse and reassignment. An established call session can be terminated by the calling party, the called party, or by radio interference and signal loss.

Release [3GPP TS 24.008, 9.3.18] message contents vary dependent on the release initiation party. RELEASE for the network to mobile station direction is detailed in 3GPP TS 24.008, 9.3.18.1. RELEASE for the mobile station to network direction is detailed in 3GPP TS 24.008, 9.3.18.2. RELEASE for signal loss is the same as for the network to mobile station direction.

For the network to mobile station direction, the RELEASE message is sent to indicate that the network intends to release the transaction identifier, and that the receiving equipment shall release the transaction identifier after sending RELEASE COMPLETE [3GPP TS 24.008 9.3.19.1] specific to the network to mobile station direction.

For the mobile to network direction, the RELEASE message is sent from the mobile station to the network to indicate that the mobile station intends to release the transaction identifier, and that the receiving equipment shall release the transaction identifier after sending RELEASE COMPLETE [3GPP TS 24.008, 9.3.19.2]

The LMS monitors for the RELEASE and RELEASE COMPLETE messages to determine the end of the monitored call session and for completing the historical, accumulated call record. The LMS may also store the release Cause [3GPP TS 24.008, 10.5.4.11] if available for later analysis.

The LMS may forward the RELEASE message event to the wireless location system with the total accumulated call record. The WLS may generate a final low-accuracy estimation based on the last recorded cell-ID, timing advance, and measurement report or may attempt a final high-accuracy U-TDOA or AoA location on the remaining mobile transmissions.

Since corresponding radio messages for the Release procedure take place on the encrypted FACCH, the RNM 82 normally cannot be used to detect the Release event trigger.

5. Paging

When the network has an incoming call, the mobile station is paged in the common Paging channel (PCH) when in the idle state. The mobile's response to a page, commonly called a page response, is to request a SDDCH from the wireless network via a Radio Resource Channel Request [3GPP 44.018, 9.1.8] with cause value set to binary 0001xxxx, 0010xxxx, 0011xxxx or 100xxxxx where "x" is used to indicate a "don't-care" bit where that bit and be either a one or a zero without effecting the cause value. To minimize the traffic caused by paging, a page request is typically first sent to the Location Area (LA) where the mobile last had a radio transaction with the wireless network as stored in the subscriber's home location register (HLR) or the visitor location register (VLR) of the currently listed service area (Public Land Mobile Network (PLNM).

Both the RNM 82 and LMS 11 can detect a Paging Response by monitoring the Radio Resource Channel Request message for the noted cause values. The RNM 82 can demodulate this unencrypted message sent on the RACH. The LMS 11 can detect the page response either in the initial Channel Required [3GPP 48.058, 8.5.3] message or in the subsequent Radio Resource Page Response message.

Paging can also be forced when no call is incoming via use of the GSM-MAP Anytime Interrogation procedure and use of supplementary services at the MSC. This page will not alert the user and can be used for location-applications requiring periodic location updating of an idle mobile. The same non-alerting page is also possible in some system by sending an SMS message to the mobile device of interest with no alpha-numeric content.

The Paging procedure is used when there is a terminating call to a mobile device. A mobile termination call is routed towards the operator's gateway MSC, the Gateway MSC consults HLR, the HLR request paging from visited MSC.

The visited MSC the pages the handset based on the last known Location Area. When a page response is received, the HLR is informed. The HLR then sends the visiting MSC address to the gateway MSC that then routes the call to visited MSC and the mobile terminating call is established.

The paging of an MS is initiated by BSC sending a PAGING COMMAND [3GPP TS 48.058, 8.5.5] message to BTS. The message contains the MS identity (TMSI or IMSI), the paging population number of the MS, optionally an indication for the MS about which combination of channels will be needed for the subsequent transaction related to the paging and optionally an indication of the priority of the call.

The PAGING REQUEST [3GPP TS 44.018, 9.1.22 & 9.1.23 & 9.1.24] messages to be sent on the dedicated paging channel (PCH) radio path are built and sent by BTS.

Successful paging of the mobile device results vi the PAGING REQUEST message in a page response procedure, that is the use of the initial channel assignment procedure with the CHANNEL REQUIRED message's cause value [3GPP TS 24.008, 9.1.8] bit sequence set for "page response". At the end of a successful paging procedure, the Mobile-Terminated Call Establishment procedure is entered.

During the paging procedure, the LMS can collect the TMSI or IMSI used in the BSC-to-BTS PAGING COMMAND along with the Location Area Index (LAI) where the mobile last had a successful Location Update. The RNM can collect the mobile identity information from the PAGING REQUEST message. This collected information is stored locally or forwarded to other nodes for resource scheduling purposes or statistical data analysis.

6. Identity Response

The Identity Response is sent only in response to an Identity Request, which is, according to 3GPP standards, generated in the GSM-MAP network by the Equipment Identity Register. The Identity Request and Response messages are delivered on the SDCCH, but after encryption so the RNM 82 cannot be used to detect the response without encryption key sharing. The LMS 11 can detect the Identity Response on the BTS-BSC interface. The Identity response will include the International Mobile Equipment Identity (IMEI) an electronic serial number that uniquely identifies the mobile device. The Identity Response can also include the subscriber's International Mobile Station Identifier (IMSI) and the Temporary Mobile Station Identity (TMSI).

The Identify Equipment Procedure can be performed when the mobile device is on the S-DCCH. The MSC initiates the procedure with a Mobility Management Direct Transfer Application Part (DTAP) Identity Request [3GPP TS 24.008, 9.2.10] sent via the BSC and BTS to the mobile device. The mobile device responds with a Mobility Management Identity Response [3GPP TS 24.008, 9.2.11] containing the International Mobile Equipment Identifier (IMEI) and possibly the TMSI and/or IMSI of the mobile device.

Since the Identify Equipment Procedure is typically used after ciphering has been set, the RNM cannot typically monitor this procedure for IMEI collection. The LMS can monitor this procedure and collect the IMEI for local memory storage or transfer to another system node.

Figure 2:
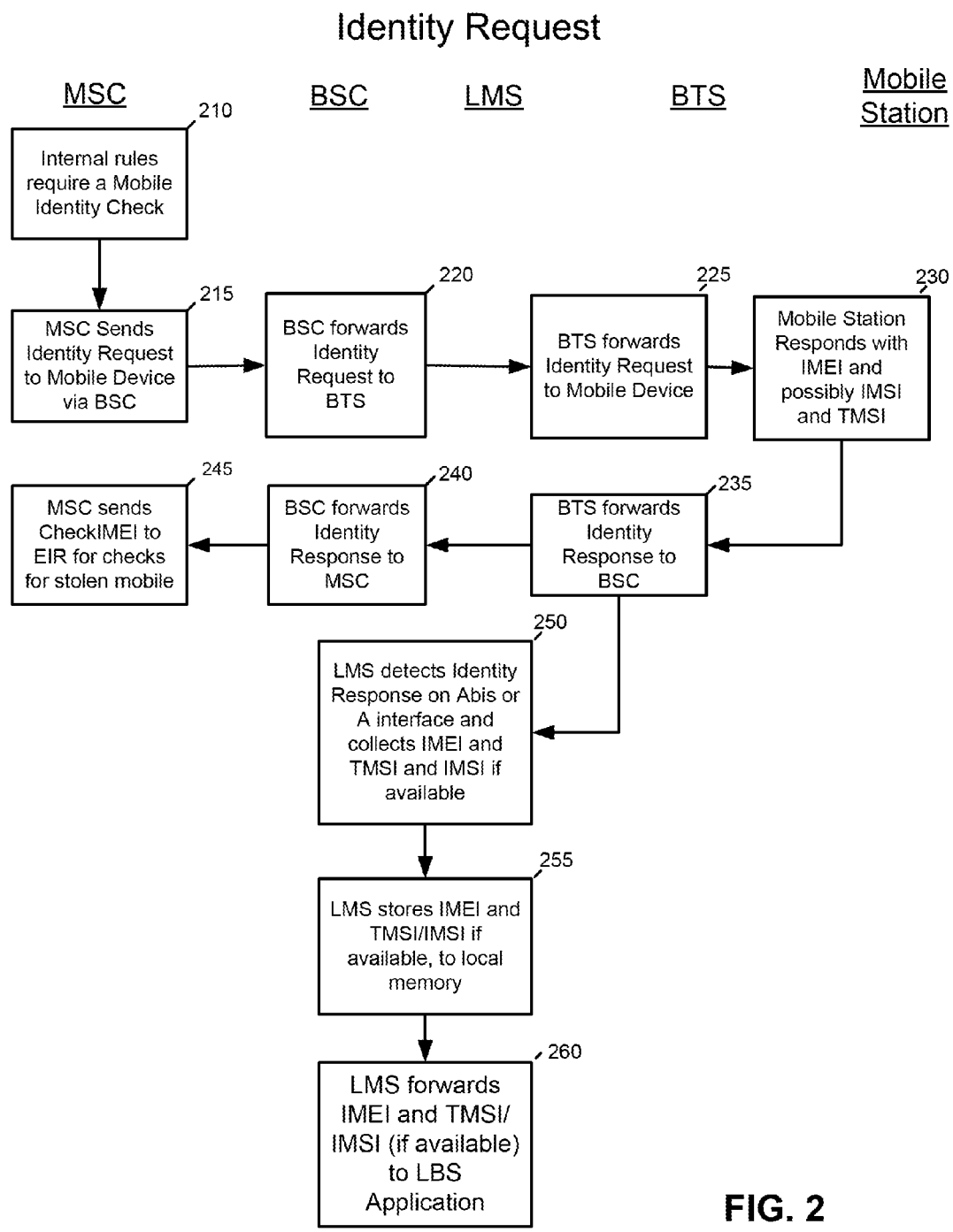
FIG. 2 depicts an exemplary method for the MSC to obtain the IMEI of a mobile station in accordance with the present invention.

FIG. 2 depicts an exemplary method for the MSC to obtain the IMEI of a mobile station in accordance with the present invention. Initially, a mobile identity check is elected at step 210. The MSC then will send an Identity Request to the mobile device via the BSC at step 215. The BSC will forward the Identity Request without other processing to the BTS at step 220. The BTS will then transmit the Identity Request to the mobile device at step 225. As a result of the received Identity Request at step 225, the mobile station will respond by transmitting its IMEI back to the BTS in an Identity Response message at step 230. Further, if the IMSI and TMSI are required by the identity check parmeters, the mobile station will also transmit the IMSI and TMSI back to the BTS at step 230. Dependent on what the BTS receives from the mobile station, the BTS will forward any IMEI, IMSI, or TMSI information in the Identity Response message back to the BSC at step 235. The BSC can then forward the Identity Response message containing the identity information to the MSC at 240. The MSC will then send a CheckIMEI to the EIR for further analysis of the mobile at step 245.

As a result of the Identity Response message from the mobile station at step 230, the LMS can obtain a copy of the Identity Response message and contents from passive monitoring of the Abis or A interface and collect the IMEI, IMSI, and TMSI information at step 250 pending on what is sent from the mobile station at step 230. The LMS can store the IMEI, IMSI, and TMSI information in local memory at step 255. The LMS can also forward the IMEI, IMSI, and TMSI information, if available, to a LBS application for further analysis at step 260.

7. Measurement Report

The Measurement Report (MR) is sent periodically during an active voice or data session. The MR is used by the mobile device to inform the wireless network of the mobile device's potential need for a handover and contains downlink (base station to mobile device) measurements on neighboring transmitters (sector antennae or omni directional cell antennae). This technique, called mobile-assisted-handoff (MAHO), is common to most cellular radio networks including US TDMA (IS-136), CDMA, GSM, and UMTS. During a voice or data session, the mobile device uses idle time to retune its receiver to monitor the broadcast channels (also known as beacons) of nearby base station antennae. For the serving cell, the mobile measures both the beacon receive level and the receive quality; for all other neighbors in the measurement report, only receive level is available. In some spread-spectrum technologies, the path-loss measurement is returned rather than the received beacon strength.

The measurement request is only available during an active (encrypted) session on the FACCH and thus the RNM 82 cannot be used without key sharing. The LMS 11 can detect the measurement report on the Abis, or BTS-BSC, interface. Since the measurement report is periodic, the LMS 11 can determine call duration. Since the measurement report contains power levels, the wireless location system can use the measurement report, timing advance, serving cell and sector information with knowledge of the beacon broadcast power levels to perform a hybrid Cell-ID with power-difference-of-arrival once beacon powers (or path-losses) have been normalized.

The measurement report procedure contains a single message of interest for this invention. The MEASUREMENT RESULT [3GPP TS 48.058 8.4.8] message from BTS to BSC is used to report to BSC the results of radio channel measurements made by BTS (uplink) and to convey the measurement reports from MS received on SACCH and in the L1 headers. The MEASUREMENT RESULT contains the TCH Channel Number [3GPP TS 48.058, 9.3.1], Uplink Measurements [3GPP TS 48.058, 9.3.25] and the Base Station Power [3GPP TS 48.058, 9.3.4] and possibly the MS Power [3GPP TS04.058, 9.3.13], Timing Advance [3GPP TS 48.058, 9.3.24]. and MS Timing Offset [3GPP TS 48.058, 9.3.37].

The LMS can detect the MEASUREMENT RESULT and reference to an LMS-internal call record by the TCH Channel Number. The LMS may then store the collected information locally or forward the event type, call record information and newly collected information to the wireless location system for use in generation of an enhanced Cell-ID location using the cell-ID, timing advance, uplink measurements and the MS Timing Offset. The WLS may also use the MEASUREMENT RESULT event as a trigger to perform a high accuracy (U-TDOA and/or AoA based) location estimate on the TCH.

Figure 3A:
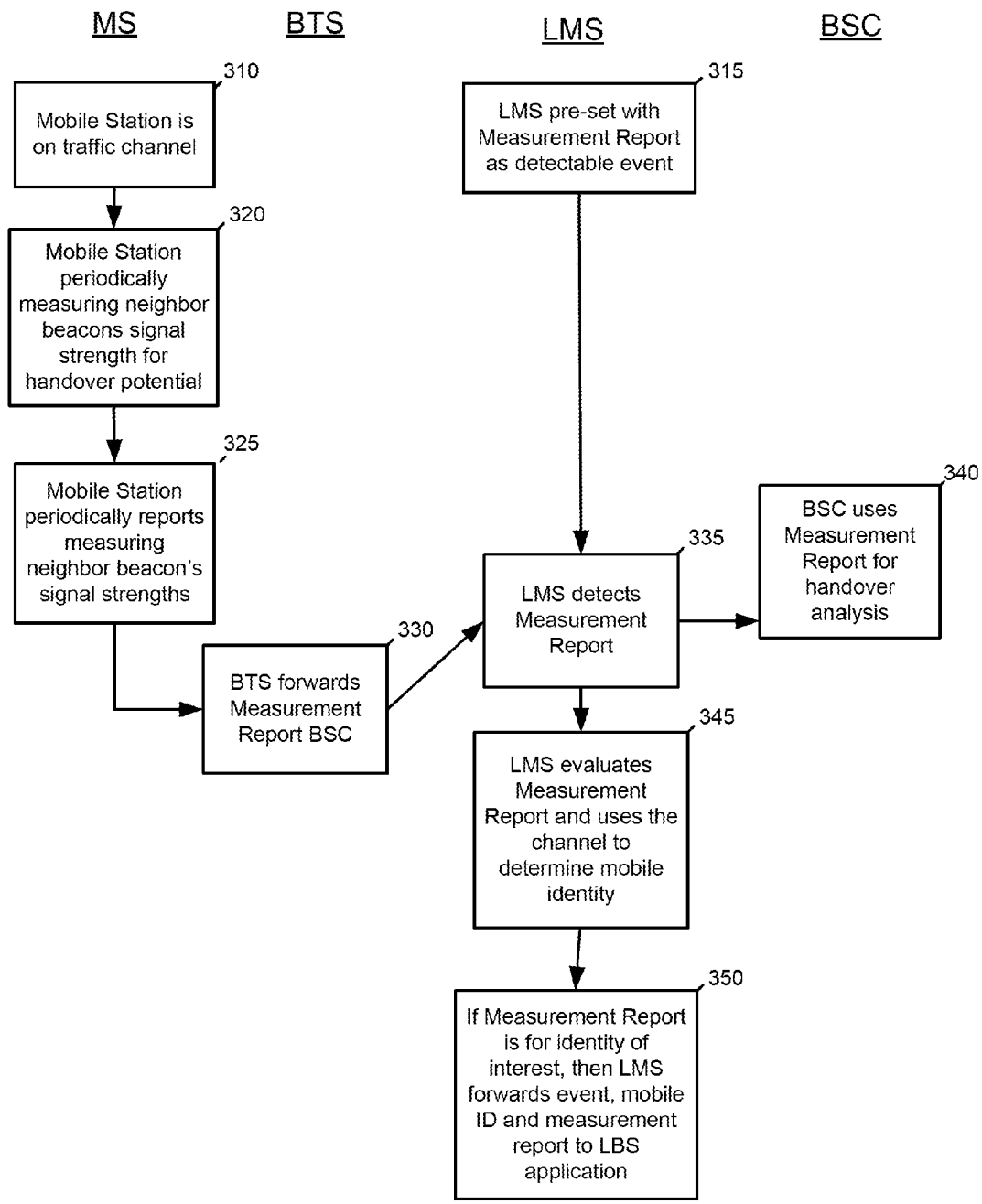
FIG. 3A depicts an exemplary method for an LMS to determine the identity of a mobile station in accordance with the present invention.

FIG. 3A depicts an exemplary method for an LMS 11 to determine the identity of a mobile station in accordance with the present invention. At step 310 a mobile station is on a traffic channel. The mobile station will periodically measure neighboring CGI beacons to determine their signal strength for handover potential at step 320. When the mobile station performs the measuring of the signal beacon signal strength at step 320, the mobile station also will report such measuring to the BTS at step 325. The BTS then will report the measurement report to the BSC at step 330. Assuming the LMS 11 is pre-set to detect measurement reports at step 315, the LMS 11 will detect the reporting of the measurement report at step 335. While the BSC uses the measurement report for handover purposes at step 340, the LMS 11 can evaluate the measurement report and channel to determine the identity of the mobile station at step 345. If the measurement report corresponds to a mobile station of interest based on the filter analysis performed in step 345, the LMS 11 can forward the event, the mobile station identification information, and measurement report to a LBS application for further analysis at step 350.

8. SMS Origination

An Short Message Service session is originally detectable by both the RNM and the LMS in the initial call setup procedure when the CHANNEL REQUIRED message [3GPP TS 48.058, 8.5.3] is sent to the BSC via the Random Access Channel (RACH). The CHANNEL REQUIRED message Cause Value [3GPP TS 24.008, 9.1.8] field identifies the initial establishment as being for an SMS-MO.

For SMS-MO, the initial channel assignment procedure is followed by the mobile device sending a CM SERVICE REQUEST [3GPP 24.008, 9.2.9] message on the S-DCCH to the BTS. The BTS will forward the CM SERVICE REQUEST to the BSC with then forwards the message to the MSC. The CM SERVICE REQUEST contains the CM service type [3GPP TS 24.008, 10.5.3.3], which indicates service is being requested for a SMS-MO.

The CM SERVICE REQUEST contains the Mobile Identity field, the first time in a mobile origination that the mobile identity [3GPP 24.008, 10.5.1.4] is available to the RNM and LMS. The mobile identity will be either the TMSI or the IMSI only if TMSI is unavailable. The CM Service Request also contains the Mobile Station ClassMark [3GPP TS 44.018, 10.5.1.6]. At this point, the LMS or RMS may trigger the wireless location system to perform a location using either cell-ID methods based on collected Cell-ID and Timing advance data or using a TDOA or AoA technique by harnessing the geographically distributed receiver network (the LMU or SCS network) to locate on the radio energy transmitted on the S-DCCH or by following the current call session to a Traffic channel (TCH) and using the radio energy transmitted from the mobile device during the conversation or data exchange.

Typically, the mobile device will undergo authentication, ciphering, TMSI reallocation and possibly equipment identification procedures while remaining on the S-DCCH.

Figure 3B:
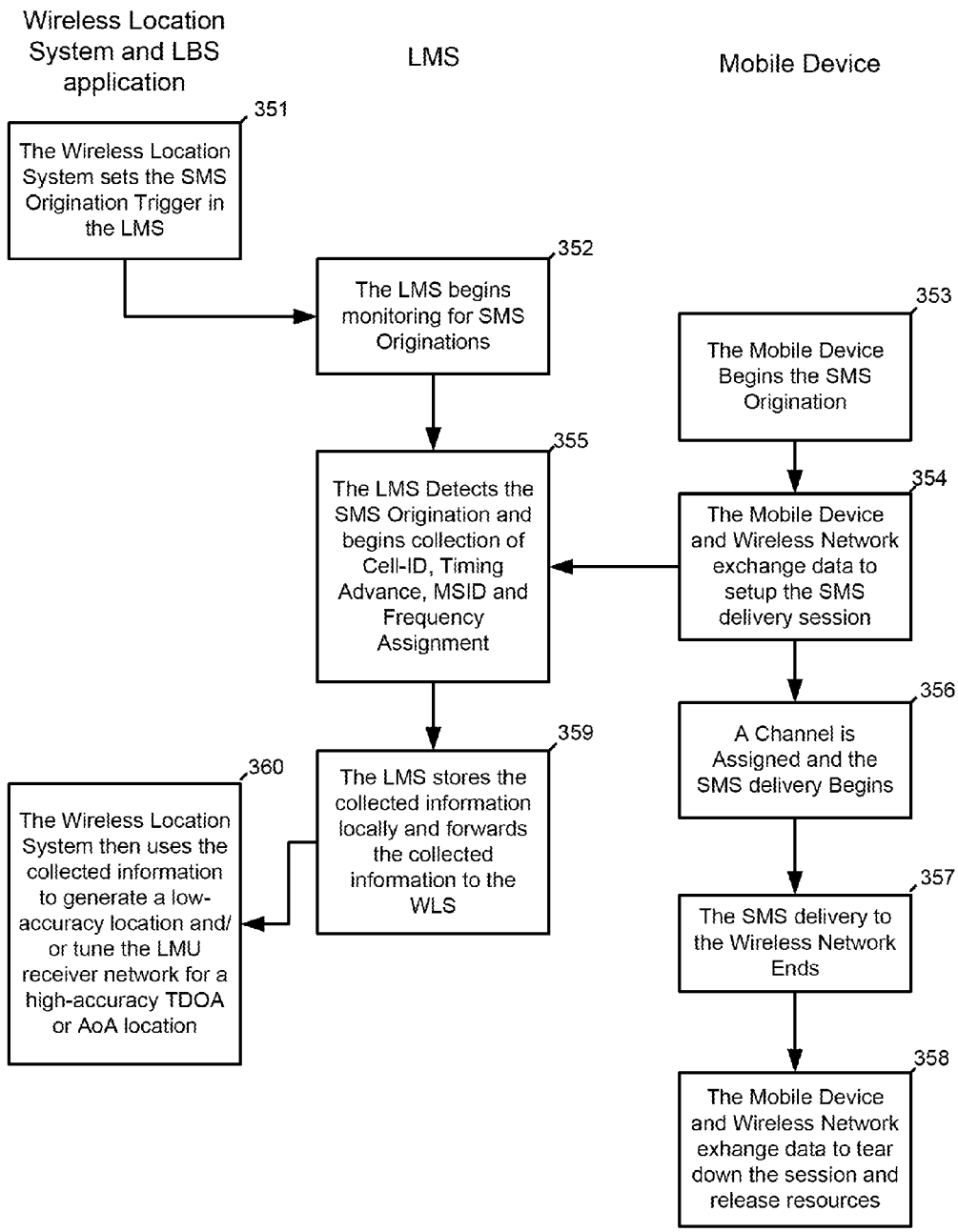
FIG. 3B illustrates an exemplary method of the SMS origination trigger in accordance with the present invention.

FIG. 3B illustrates an exemplary method of the SMS origination trigger in accordance with the present invention. At step 351, the wireless location system (WLS) sets the SMS origination trigger in the LMS. The LMS can then begin to monitor for any SMS originations at step 352. When a mobile device begins the SMS origination at step 353, the mobile device and wireless network exchange data to setup the SMS exchange delivery session at step 354. The LMS can then detect the SMS origination and begin collecting the Cell-ID, Timing Advance, MSID, and frequency assignment at step 355. Concurrently a channel can be assigned to the mobile device and the SMS delivery can begin at step 356. The SMS delivery to the wireless network will subsequently end at step 357 and the mobile device and wireless network can exchange data to tear down the session and release the resources at step 358.

Based on the collection of information at step 355, the LMS can then store the information locally and forward the information to a WLS at step 359. The WLS can then use the collected information to generate either a low or high accuracy location of the wireless device at step 360.

9. SMS Termination

The SMS-Mobile Terminated (SMS-MT) is initially indicated in the paging of the mobile device. The paging of an MS for SMS-MT is initiated by BSC sending a PAGING COMMAND [3GPP TS 48.058, 8.5.5] message to BTS. The message contains the MS identity (TMSI or IMSI), the paging population number of the MS, optionally an indication for the MS about which combination of channels will be needed for the subsequent transaction related to the paging and optionally an indication of the priority of the call.

The PAGING REQUEST [3GPP TS 44.018, 9.1.22 & 9.1.23 & 9.1.24] messages to be sent on the dedicated paging channel (PCH) radio path are built and sent by BTS.

During the paging procedure, the LMS can collect the TMSI or IMSI used in the BSC-to-BTS PAGING COMMAND along with the Location Area Index (LAI) where the mobile last had a successful Location Update. This collected information is stored locally or forwarded to other nodes for resource scheduling purposes or statistical data analysis.

Successful paging of the mobile device results vi the PAGING REQUEST message in a page response procedure, that is the use of the initial channel assignment procedure with the CHANNEL REQUIRED message's cause value [3GPP TS 24.008, 9.1.8] bit sequence set for "page response".

Upon receipt of a SDCCH assignment via the Immediate Assigment Message, the MS sends a PAGING RESPONSE [3GPP 44.018, 9.1.25]. This message contains the Mobile Identity field, which would include the TMSI, IMSI, or IMEI. The Mobile identity can be used to identify a subscriber or MS and trigger a location.

Figure 3C:
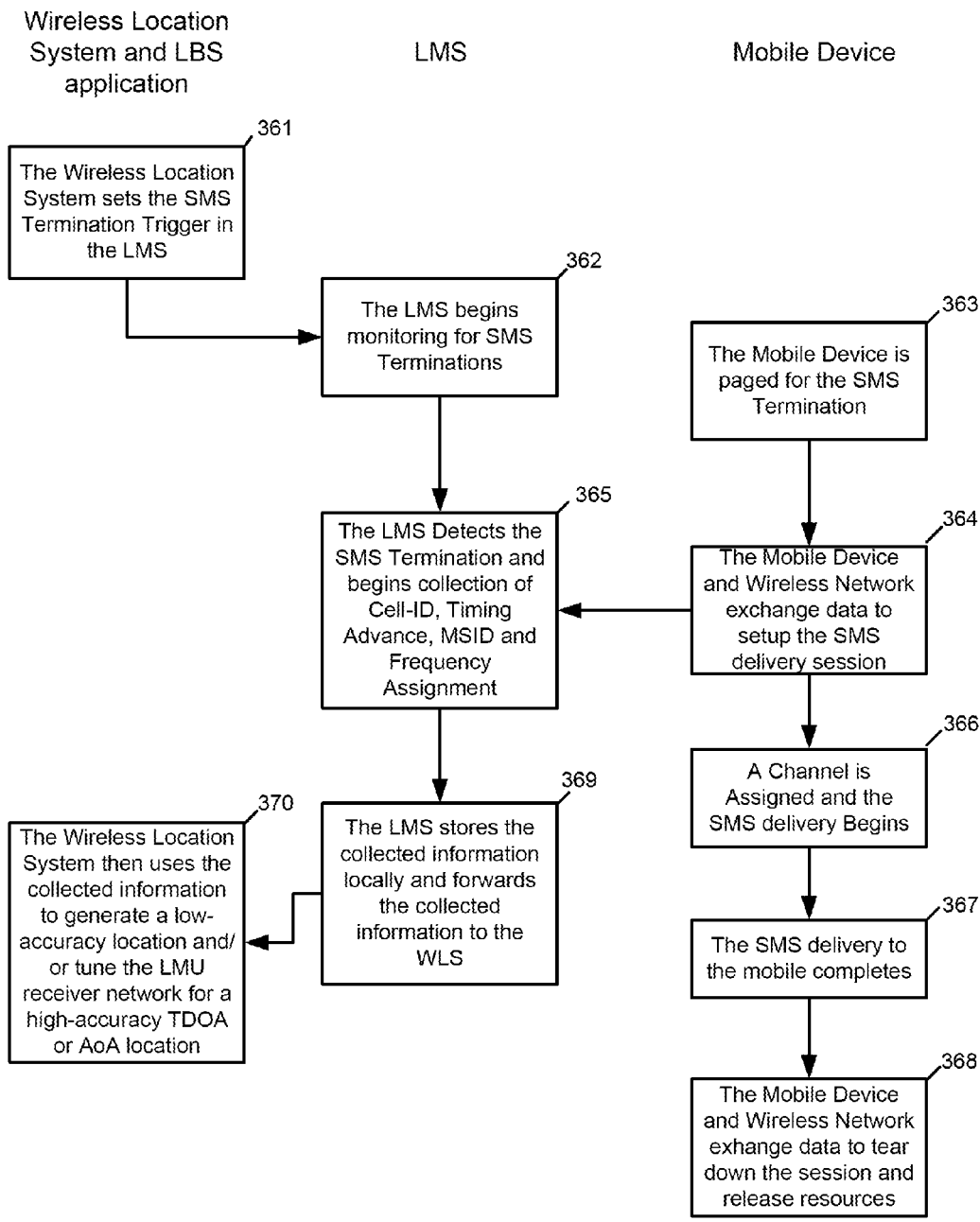
FIG. 3C illustrates an exemplary method of the SMS termination trigger in accordance with the present invention.

FIG. 3C illustrates an exemplary method of the SMS termination trigger in accordance with the present invention. At step 361, the wireless location system (WLS) sets the SMS termination trigger in the LMS. The LMS can then begin to monitor for any SMS terminations at step 362. When a mobile device is paged for the SMS termination at step 363, the mobile device and wireless network exchange data to setup the SMS delivery session at step 364. The LMS can then detect the SMS termination and begin collecting the Cell-ID, Timing Advance, MSID, and frequency assignment at step 365. Concurrently a channel can be assigned to the mobile device and the SMS delivery can begin at step 366. The SMS delivery to the wireless network will subsequently end at step 367 and the mobile device and wireless network can exchange data to tear down the session and release the resources at step 368.

Based on the collection of information at step 365, the LMS can then store the information locally and forward the information to a WLS at step 369. The WLS can then use the collected information to generate either a low or high accuracy location of the wireless device at step 370.

10. Message-Type, Message-Content, and Complex Triggers

LMS triggers include message-type triggers, when the message itself is the location triggering event, and triggers based on the contents of monitored messages where a network transaction and a filter are both necessary. By combining these triggers with LMS stored information, a third type of trigger, the complex trigger, can be produced. Any of the three types of triggers can be set to cause (trigger) a location estimation procedure. In general, message-type triggers are tripped in response to a mobile station transmission. Message type triggers include: (1) Mobile Origination (CM Service Request); (2) Mobile Termination (CM Service Request); (3) Identity Response; (4) Location Update; Page Response; (5) Handover; and (6) Release (Channel Release). The LMS 11 can also analyze, in real-time, the contents of specific message fields within the triggers. Other such triggers include: (1) Calling-number Trigger; (2) Called-number Trigger; (3) Mobile Identity (MSISDN, IMEI, IMSI, and TMSI) Triggering; (4) CGI/Cell-ID triggering; and (5) LAC triggering.

The LMS maintains tables of Abis, A, and GSM-MAP interface traffic on a per subscriber basis. The LMS 11 may be set to trigger on call connection events or radio interface events. These events include:

TABLE 1

LMS Detected Network Transactions

| Network Measurement Report Received | Mobile Originated Call Placed |
|---|---|
| Mobile Terminated Call Received | Mobile Originated SMS Sent |
| Mobile Terminated SMS Received | Handover (Begins) |
| Handover (Completed) | Location Update |
| RF Channel Assignment | IMSI Attach |
| IMSI Detach | Mobile Originated Call Disconnect |
| Mobile Terminated Call Disconnect | Identity Response |

Retained network information allows for location of subscribers in a specific area or in proximity to another mobile that is being monitored.

11. Mobile Origination

Mobile Origination is the act of a mobile device placing a call to the wireless network to begin a conversation or data session. Mobile Originations are detectable over the radio interface via a radio network monitor (RNM) and by the Link Monitor System. Both high accuracy and low accuracy location is possible during the Mobile Origination transaction with cell-id and timing advance available as well as the frequency assignment for the S-DCCH for use by specialized receivers.

Using the LMS, the Mobile Origination may be followed to the traffic channel. Once the mobile is on the traffic channel, the LMS provides the frequency for subsequent location estimates. Once on the traffic channel the mobile may experience handover which is covered in a following section.

For a Mobile-Originated call establishment, the initial channel assignment procedure is followed by the mobile device sending a CM SERVICE REQUEST [3GPP 24.008, 9.2.9] message on the S-DCCH to the BTS. The BTS will forward the CM SERVICE REQUEST to the BSC with then forwards the message to the MSC. The CM SERVICE REQUEST contains the CM service type [3GPP TS 24.008, 10.5.3.3], which indicates service is being requested for a Mobile Originated Call.

The CM SERVICE REQUEST contains the Mobile Identity field, the first time in a mobile origination that the mobile identity [3GPP 24.008, 10.5.1.4] is available to the RNM and LMS. The mobile identity will be either the TMSI or the IMSI only if TMSI is unavailable. The CM Service Request also contains the Mobile Station ClassMark [3GPP TS 24.088, 10.5.1.5, 10.5.1.6 & 10.5.1.7] allowing for classes of LBS services based on mobile manufacturer or model At this point, the LMS or RMS may trigger the wireless location system to perform a location using either cell-ID methods based on collected Cell-ID and Timing advance data or using a TDOA or AoA technique by harnessing the geographically distributed receiver network (the LMU or SCS network) to locate on the radio energy transmitted on the S-DCCH or by following the current call session to a Traffic channel (TCH) and using the radio energy transmitted from the mobile device during the conversation or data exchange.

Typically, the mobile device will undergo authentication, ciphering, TMSI reallocation and possibly equipment identification procedures while remaining on the S-DCCH. After completion of these procedures the mobile device will transmit the SETUP [3GPP TS 24.008, 9.3.23.2] (for mobile originating call establishment) message on the S-DCCH. In the mobile originating call establishment case, the SETUP message carries the dialed digits. The RNM and/or LMS can detect the SETUP message and collect the dialed digits. The dialed digits can then be compared to pre-set lists of phone numbers or SMS pins of interest. If the dialed digits matches a number of interest the RNM or LMS can forward the cell ID, timing advance, Mobile Identity (TMSI and/or IMSI), S-DCCH channel assignment, and the nature of the trigger with the digit string to the wireless location system. The wireless location system can then perform either a low accuracy (Cell-ID and Cell-ID with timing advance are both available) or high accuracy (U-TDOA and/or AoA based) location estimate while the mobile is on the S-DCCH.

The network will then authenticate the mobile device, set ciphering, could check the IMEI of the mobile device via the Identity Request procedure, and could set a new TMSI via the TMSI reallocation procedure.

The next message of significance to this invention in the Mobile-Originated call establishment is the ASSIGNMENT COMMAND [3GPP TS 44.018, 9.1.2]. The ASSIGNMENT COMMAND carries the Channel Description 2 [3GPP TS 44.018, 10.5.2.5a] for the TCH assignment. The LMS can note TCH assignment and link that information to the previously collected event type (in this case a call origination, a GPRS data session origination or an SMS origination), the TMSI, the IMSI (if collected), the IMEI (if collected), storing that information locally and forward this information to the wireless location system. The wireless location system can then perform a low accuracy (Cell-ID and Cell-ID with timing advance are both available) or high accuracy (U-TDOA and/or AoA based) location estimate once the mobile moves to the newly assigned traffic channel.

Figure 3D:
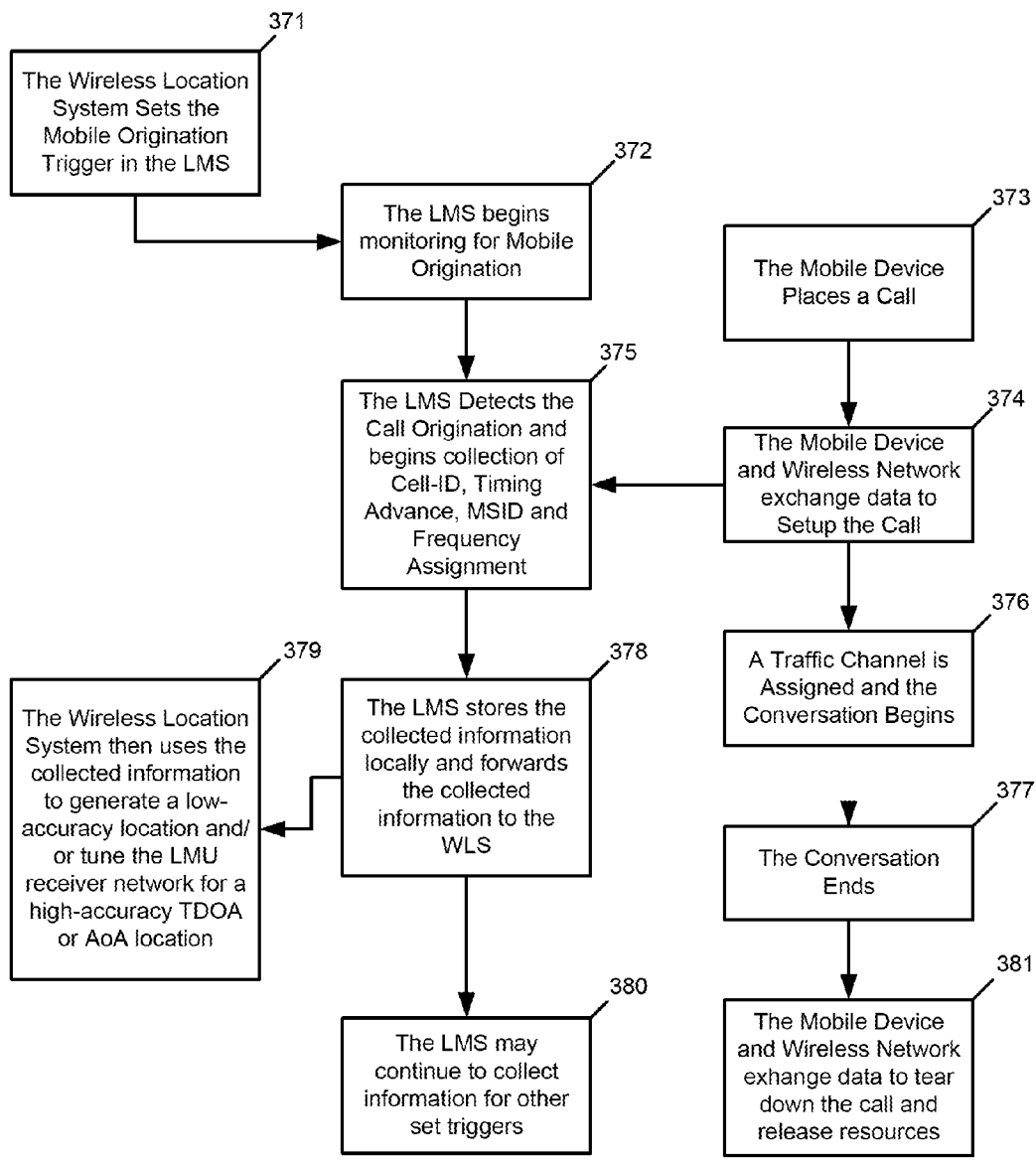
FIG. 3D illustrates an exemplary method of the Mobile Origination trigger in accordance with the present invention.

FIG. 3D illustrates an exemplary method of the Mobile Origination trigger in accordance with the present invention. At step 371, the WLS stes the mobile origination trigger in the LMS. The LMS can then begin monitoring for mobile origination at step 372. When a mobile device places a call at step 373, the mobile device and the wireless network exchange data to setup the call at step 374. The LMS can detect the call origination and can begin collecting the Cell-ID, Timing Advance, MSID, and frequency assignment at step 375. Also, a traffic channel is assigned and conversation begins on the mobile at step 376. The conversation will end at step 377 and the mobile device and wireless network exchange data to tear down the call and release resources at step 381.

The LMS can store the collected information locally and forward the collected information to a WLS for further analysis at step 378. The WLS can use the collected information to perform a high or low accuracy location of the mobile at step 379. The LMS may also continue to collect information for other set triggers at step 380.

12. Mobile Termination

Mobile termination is the act of a mobile device receiving a call from the wireless network to begin a conversation or data session. Beginning with a page and page response sequence, the Mobile Termination is detectable over the radio interface via a radio network monitor (RNM) and by the Link Monitor System (LMS). Both high accuracy and low accuracy location is possible during the Mobile Termination transaction with cell-id and timing advance available as well as the frequency assignment for the S-DCCH for use by specialized receivers.

Using the LMS, the Mobile Termination may be followed to the traffic channel where subsequent location estimates may be made.

The Call Establishment procedure is used when a mobile wants to initiate a voice or data call or respond to a page request.

Following the Initial channel assignment procedure, the mobile device will send a CM SERVICE REQUEST [3GPP 24.008, 9.2.9] message on the S-DCCH to the BTS. The BTS will forward the CM SERVICE REQUEST to the BSC with then forwards the message to the MSC. The CM SERVICE REQUEST contains the Mobile Identity field, the first time in a mobile origination that the mobile identity [3GPP 24.008, 10.5.1.4] is available to the RNM and LMS. The mobile identity (MSID) will be either the TMSI or the IMSI only if TMSI is unavailable.

For mobile terminated call establishment the mobile station shall select the same mobile identity type as received from the network in the PAGING REQUEST message.

For a Mobile-Originated call establishment, initial paging procedure is followed by the initial channel assignment procedure. Once on the S-DCCH, the paged mobile device transmits a PAGE RESPONSE [3GPP TS 44.018, 9.1.25] with both Mobile Station ClassMark [3GPP TS 44.018, 10.5.1.6] and Mobile Identity (MSID) [3GPP TS 44.018, 10.5.1.4]. Both the MSID and Station ClassMark can be collected by the RNM or LMS. The PAGE RESPONSE is then forwarded to the BSC and then to the MSC. Both the MSID and Station ClassMark can be collected by the RNM or LMS. The RNM or LMS may then store the collected information (Cell-ID, LAI, S-DCCH assignment, Timing Advance, Page Response Event, MSID, StationClassMark) or forward the collected information to the wireless location system. The WLS may then perform a low accuracy (Cell-ID and Cell-ID with timing advance are both available) or high accuracy (U-TDOA and/or AoA based) location estimate while the mobile is still on the S-DCCH or by following the current call session to a Traffic channel (TCH) and using the radio energy transmitted from the mobile device during the conversation or data exchange.

The network will then authenticate the mobile device, set ciphering, could check the IMEI of the mobile device via the Identity Request procedure, and could set a new TMSI via the TMSI reallocation procedure.

The next message of significance to this invention in the Mobile-terminated call establishment is the SETUP [3GPP TS 24.008, 9.3.23.1] message (for mobile terminated call establishment). The SETUP message may contain the call's priority level [3GPP TS 24.008, 10.5.1.11], the calling party's number [3GPP TS 24.008, 10.5.4.9], and the called party (the mobile subscriber) number [3GPP TS 24.008, 10.5.4.7]. The LMS can note the SETUP information and link that information to the previously collected event type (in this case a call origination, a GPRS data session origination or an SMS origination), the TMSI, the IMSI (if collected), the IMEI (if collected)) storing that information locally and forwarding this information to the wireless location system. The wireless location system can then perform a low accuracy (Cell-ID and Cell-ID with timing advance are both available) or high accuracy (U-TDOA and/or AoA based) location estimate once the mobile moves to the assigned traffic channel collected from the ASSIGNMENT COMMAND [3GPP TS 44.018, 9.1.2].

The next message of significance to this invention in the Mobile-terminated call establishment is the ASSIGNMENT COMMAND [3GPP TS 44.018, 9.1.2]. The ASSIGNMENT COMMAND carries the Channel Description 2 [3GPP TS 44.018, 10.5.2.5a] for the TCH assignment. The LMS can note TCH assignment and link that information to the previously collected event type (in this case a call origination, a GPRS data session origination or an SMS origination), the TMSI, the IMSI (if collected), the IMEI (if collected), storing that information locally and forward this information to the wireless location system. The wireless location system can then perform a low accuracy (Cell-ID and Cell-ID with timing advance are both available) or high accuracy (U-TDOA and/or AoA based) location estimate once the mobile moves to the newly assigned traffic channel.

Figure 3E:
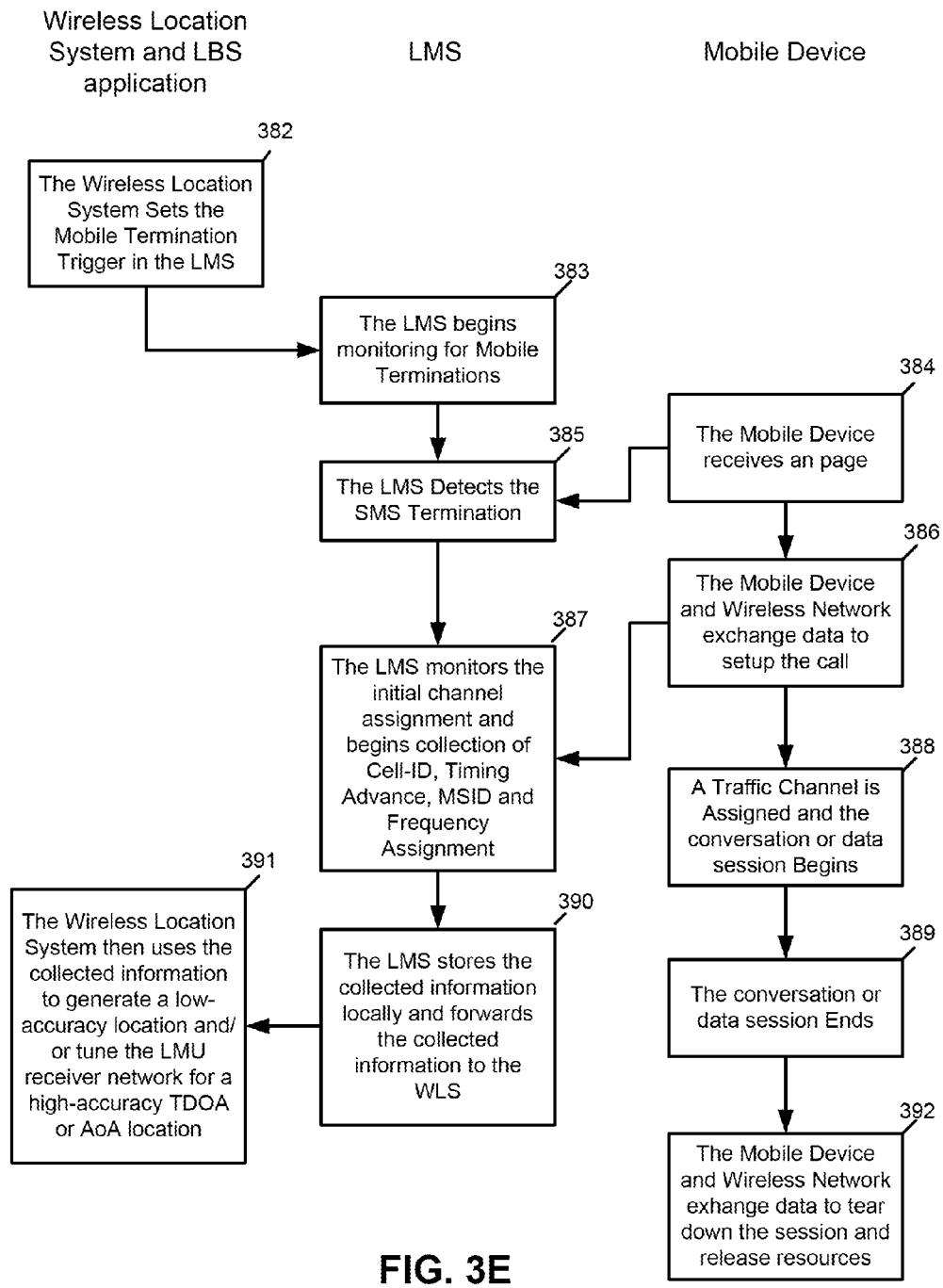
FIG. 3E illustrates an exemplary method of the Mobile Termination trigger in accordance with the present invention.

FIG. 3E illustrates an exemplary method of the Mobile Termination trigger in accordance with the present invention. At step 382, the WLS stes the mobile termination trigger in the LMS. The LMS can then begin monitoring for mobile terminations at step 383. When a mobile device receives a page at step 384, the mobile device and the wireless network exchange data to setup the call at step 386. The LMS can detect the SMS termination at step 385 and can begin collecting the Cell-ID, Timing Advance, MSID, and frequency assignment at step 387. Also, a traffic channel is assigned and conversation begins on the mobile at step 388. The conversation or data session will end at step 389 and the mobile device and wireless network exchange data to tear down the call and release resources at step 392.

The LMS can store the collected information locally and forward the collected information to a WLS for further analysis at step 390. The WLS can use the collected information to perform a high or low accuracy location of the mobile at step 391.

D. Advanced Triggers

Advanced triggers allow for radio or network events (corresponding to specific messages or groups of messages detectable by the LMS 11 or RNM 82) to generate high and low accuracy location estimates. A triggering event, one that initiates a location estimation, may be a detection of a particular message or a field within a specific message. Network events (also called network transactions) include: (1) Mobile originations/terminations; (2) SMS originations/terminations; (3) GPRS Mobile Attach/Detach events; (4) Location/Routing Update (that is, a GSM "location" update for the purposes of mobility and roaming as opposed to a U-TDOA location event); (5) Handovers; and (6) Call Releases.

1. Dialed Digit Triggering

The wireless location system can locate a mobile based on the number called. This number can be a mobile number, a fixed number, a local number, or national/international number of any length. The wireless location system (WLS) can be tasked with any dialled digit trigger at the LMS. Once the trigger is tasked, the system will automatically locate any mobile in the service area dialling the specified number.

For example, the telephone number of the railway safety director may be entered into the LMS 11 system and from that point forward any mobile that dials those numbers will be automatically located with high accuracy (and if moving, the speed and direction of travel can be determined) if within an LMU equipped area or with lower accuracy if outside an LMU equipped area where only Cell ID techniques are available.

Figure 4:
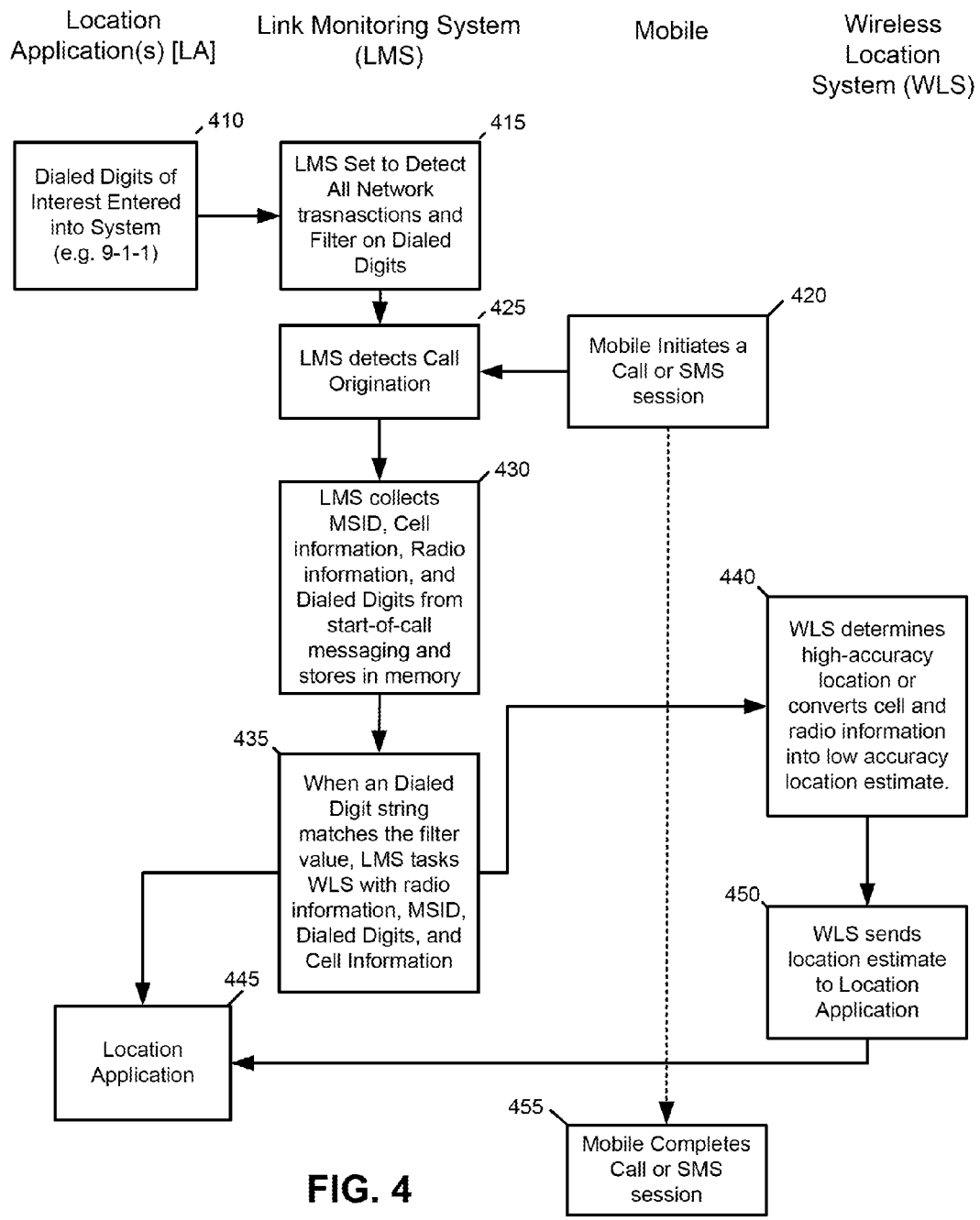
FIG. 4 depicts an exemplary method of dialed digit triggering in accordance with the present invention.

FIG. 4 depicts an exemplary method of dialed digit triggering in accordance with the present invention. Initially, at step 410, the dialed digits of interest can be entered into the wireless location system. The number of interest can, for example, be the cell phone of a missing person or the family member of a missing person. The LMS is set to detect all network transactions and a filter is installed to focus on transactions relating to the dialed digits of interest at step 415. When a mobile initiates a call or SMS session with the dialed digits of interest at step 420, the LMS will detect the call origination at step 425. The LMS can then collect the MSID, cell information, and radio information form the start-of-call messaging and store the information in memory at step 430. Assuming the dialed digit string matches the filter value, or in this case, the dialed digit filter, the LMS will then task the wireless location system (WLS) with the radio information, MSID, dialed digits, and cell information at step 435. The WLS can perform a high-accuracy location on the mobile or it can convert the cell and radio information into a low accuracy location estimate pending the request at step 440. The WLS can then send the location estimate (high accuracy or low accuracy) to the location application for further analysis at step 450. Further, the radio information, MSID, dialed digits, and cell information can be forwarded on to the location application at step 445 for further analysis. Sometime after the call was originated at step 430, the mobile will complete the call or SMS session at step 455.

2. MSID Triggering

The wireless location system can also locate a mobile device by its identification. A functioning mobile or user element will have an associated MSISDN, an International Mobile Station Identity (IMSI) from the SIM, and an International Mobile Equipment Identifier (IMEI) from the terminal. An IMSI or list of IMSIs can be loaded into the LMS via file or location based service application. The LMS will then scan Abis messaging traffic until the IMSI-to-TMSI correlation can be verified and retained. The IMSI-TMSI association can be updated with changes when a subsequent TMSI is issued. In either case, the LMS notifies the SMLC of the IMSI to TMSI correlation.

An MSISDN or list of MSISDNs can be loaded into the LMS via file or location based service application. The LMS can then scan Abis and A interface messaging traffic until the MSISDN-to-IMSI and the IMSI-to-TMSI correlations can be discovered and retained. The MSISDN-IMSI-TMSI association can be updated with changes when a subsequent TMSI is issued. In any case, the LMS can notify the SMLC of the MSISDN to IMSI to TMSI correlation.

An IMEI or list of IMEIs can be loaded into the LMS via file or location based service application. The LMS will then scan Abis messaging traffic until the IMEI-to-IMSI-to-TMSI correlation can be verified and retained. The IMEI-IMSI-TMSI association can be updated with changes when a subsequent TMSI is issued. In either case, the LMS can notify the SMLC of the IEMI to IMSI to TMSI correlation.

Regardless of the original IMEI, IMSI, or MSISDN originally used for identification, the discovered TMSI will be set as a LMS trigger so that the mobile of interest can be located. For example, the MS-ISDN(s), IMEI(s), or IMSI(s) of an individual or group of railway workers, may be entered into the system and from that time forward any network transaction those mobiles make can initiate a high accuracy location for location and mapping purposes. Thus, being able to locate using the IMEI enables the wireless location system to find SIM-less phones and devices as well as detecting SIM changes to a particular terminal or user equipment.

Figure 5A:
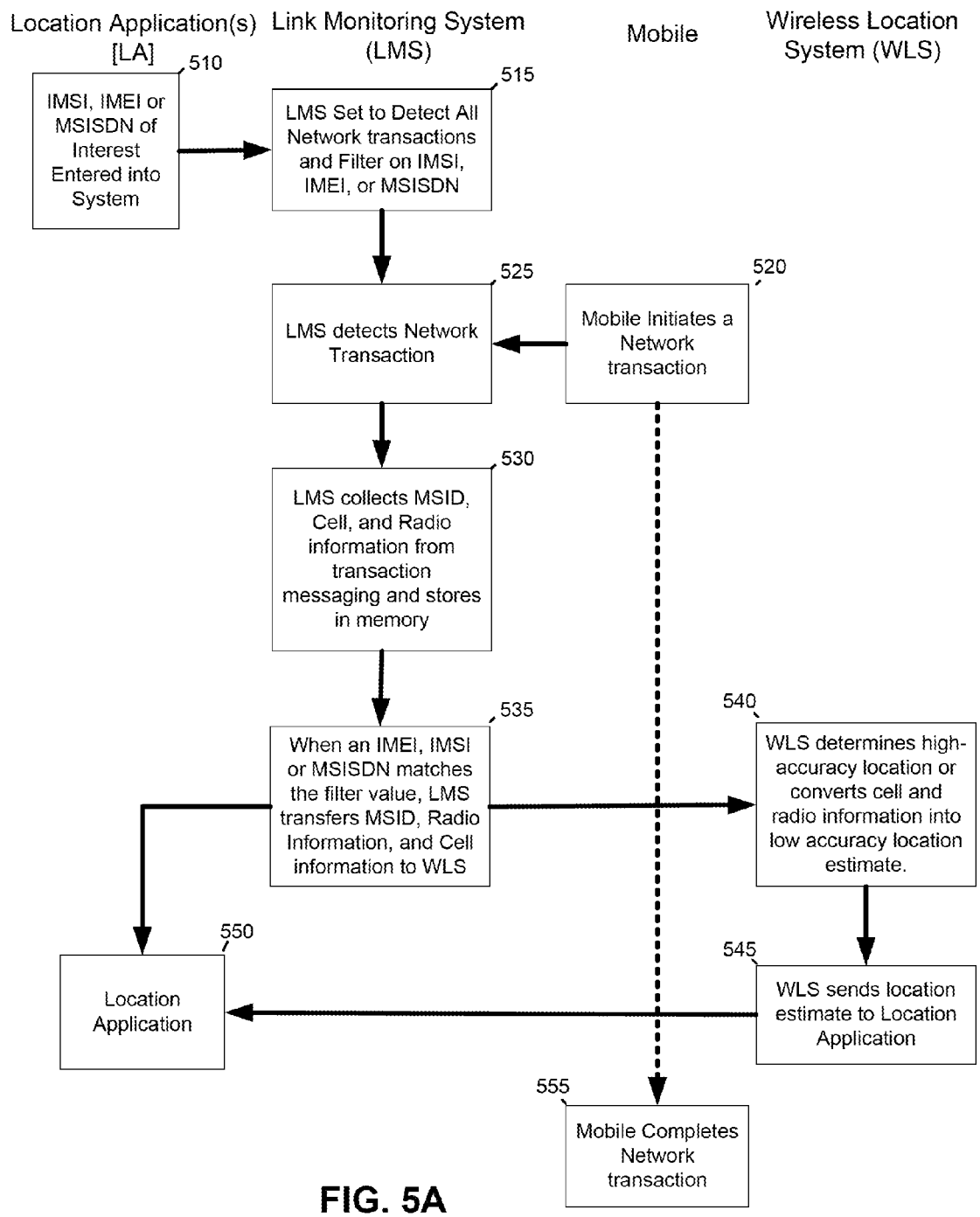
FIG. 5A depicts an exemplary method of MSID triggering in accordance with the present invention.

FIG. 5A depicts an exemplary method of MSID triggering in accordance with the present invention. At step 510, the IMSI, IMEI, or MSISDN of interest are entered into the system. The LMS can be set to detect all network transactions and filter on IMSI, IMEI, or MSISDN at step 515. When a mobile initiates a network transaction at step 520, the LMS can detect the network transaction at step 525. The LMS can collect the MSID, Cell, and radio information from the transaction message and store it in memory at step 530. The mobile will subsequently complete the network transaction at step 555.

When the IMSI, IMEI, or MSISDN matches the filter value entered at step 510, the LMS can transfer the MSID, Cell, and radio information to a WLS at step 535. The WLS can then perform a high or low accuracy location of the mobile at step 540 and send the location estimate to the Location Application at step 545. The Location Application can collect the information received from the WLS and the information from the LMS for further evaluation and analysis at step 550.

3. Idle Mobile Location

The wireless location system can also locate idle mobiles and devices if the IMEI, MSISDN or IMSI of the device is known. The wireless location system can locate idle mobile devices in two ways. First, an idle mobile can be located by entering the IMSI of the mobile device to be located into the LMS 11 system and then by sending a NULL value SMS to that mobile. The mobile device will acknowledge the receipt of the SMS message and can be located with high accuracy. The wireless carrier can set the host wireless network system parameters so that the mobile will not be alerted when the NULL value SMS is received by the mobile. Further, updates to the mobile location may be made by sending a NULL value SMS at any time to meet the requirements of the LBS application. These SMS messages can be automatically sent by the LBS application, for example, and may be set based on quality of service parameters.

An alternate method of idle mobile triggering requires the LBS application to request the GMLC to submit CAMEL 'Any-Time-Interrogation' (ATI) queries to the HLR. This can result in a network page being sent to the mobile. The MSC using standardized Supplementary Services, pages and authenticates the mobile without actually placing the mobile on a traffic channel or otherwise notifying the subscriber. During the paging and authentication messaging, the wireless location system uses U-TDOA or AoA to process and accurately locate the mobile. A lower accuracy CGI+TA location is automatically generated by this transaction. The GSM Service Control Function (gsmSCF) can also be used to cause the GMLC to issue an Anytime Interrogation to request information (e.g., subscriber state and location) from the HLR at any time. The ATI procedure can be used to transition the MS from the IDLE to Active Signaling State.

For example, the IMSI of an asset (e.g., pet) tracking device may be entered into the Wireless location system and any time the asset owner wishes to know the location of that mobile. A NULL value SMS may be sent to the mobile or the asset finder location services application can initiate an ATI message to the GMLC to initiate the location process. Within seconds the asset tracker device will be located with high accuracy (and if moving, the speed and direction of travel) if within an LMU equipped area or with lower accuracy if outside an LMU equipped area where only Cell ID techniques are available.

The preferred method for updating subscriber location from the GMLC is the AnyTimeInterrogation (ATI) message and procedure defined for CAMEL Phase 3 and 4. With the CAMEL Phase 3/4 ATI parameter 'current location' set to 'true', the GMLC can signal the HLR to initiate (force) paging via the MSC's supplemental services. For networks with non-CAMEL 3& 4 compliant GMLC and HLR clusters, a silent SMS based position update may be possible.

According to the specifications, for silently paging user with SMS the GMLC will send the SMSC (via SMPP interface) a 'Submit SM' message using a Data Coding scheme value of '11110110 ' (Dec value=246). Delivery of this message type should not trigger the MS to alert the user either by some visual or audible notification. This SMS message has zero user data length We suggest that carriers verify a selection of their existing phones behavior to the 'silent' SMS. A carrier should also check with MSC and SMSC manufacturers as to the operation of the MSC when given the 'Submit SM' message using a Data Coding scheme value of '11110110'.

If the ATI is unavailable and the silent SMS cannot be performed with the existing mobiles or infrastructure, an alternative may exist. The Provide Subscriber Information (PSI) message, launched from the GMLC to the MSC with 'force paging' set to "true", will page the mobile without alerting the subscriber.

Figure 5B:
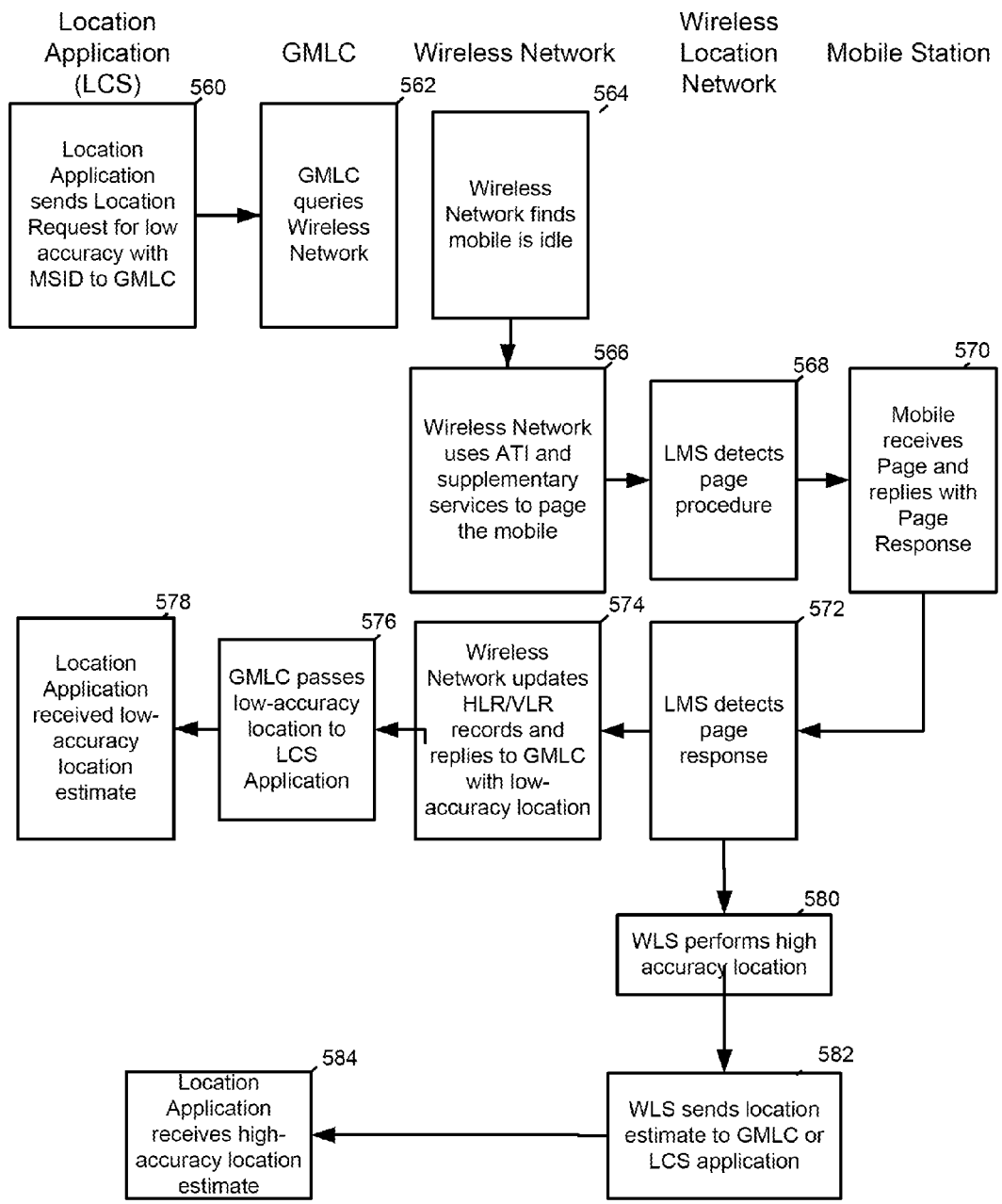
FIG. 5B depicts an exemplary method of using AnyTimeInterrogation (ATI) in accordance with the present invention.

FIG. 5B depicts an exemplary method of using AnyTimeInterrogation (ATI) in accordance with the present invention. Initially, the Location Application sends a location request for low accuracy with MSID to the GMLC at step 560. The GMLC queries the wireless network at step 562. The wireless network then may find that the mobile is idle at step 564. The wireless network can use the ATI and supplementary services to page the mobile at step 566. The LMS can then detect the page procedure at step 568. The mobile will receive the page and reply with a page response at step 570. The LMS can then detect the page response at step 568 and have the WLS perform a high accuracy location at step 580. The WLS can then send the location estimate to the GMLC or LCS application for further use at step 582. The wireless network can update the HLR/VLR records and replies to the GMLC with the low accuracy location at step 574. The GMLC can pass the low accuracy location to the LCS application at step 576. The Location Application receives the low accuracy location at step 578 from the GMLC and the high accuracy location at step 584.

Figure 5C:
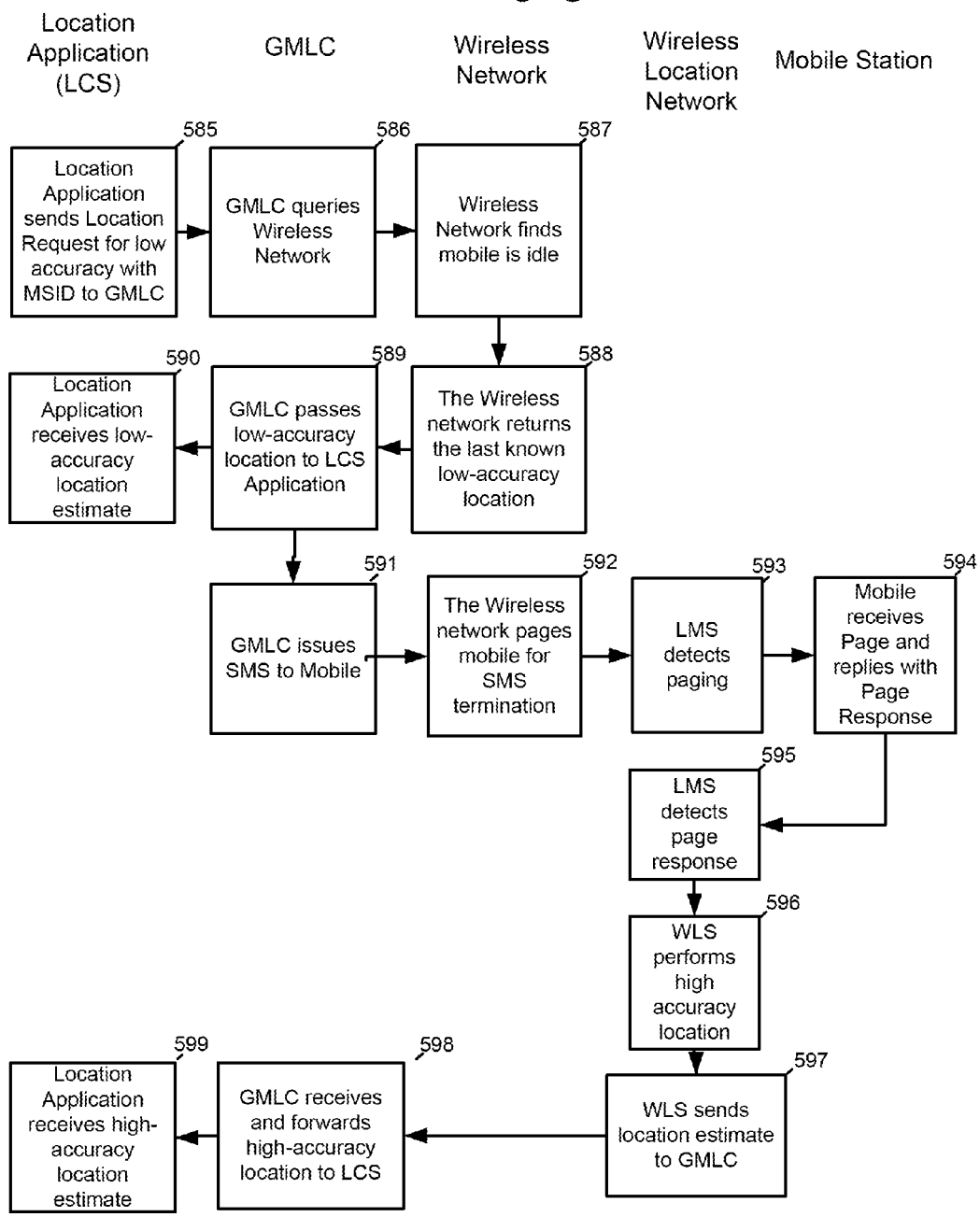
FIG. 5C depicts an exemplary method of using SMS ping in accordance with the present invention.

FIG. 5C depicts an exemplary method of using SMS ping in accordance with the present invention. At step 585, the Location Application send a location request for low accuracy with MSID to the GMLC. The GMLC queries the wireless network at step 586. The wireless network then may find that the mobile is idle at step 587. The wireless network then will return the last known low accuracy location at step 588. The GMLC will pass the low accuracy location to the LCS application at step 589. The Location Application then receives the low accuracy location at step 590. The GMLC issues a SMS to the mobile at step 591. The wireless network pages the mobile for the SMS termination at step 592. The LMS detects the paging at step 593. The mobile will receive the page and can reply with a page response at step 594. The LMS will then detect the page response at step 595. The WLS can then perform a high accuracy location at step 596. The WLS can then send the location estimate to the GMLC at step 597. The GMLC receives the high accuracy location and send it to the LCS application at step 598. The Location application receives the high accuracy location at step 599 and may further evaluate or store the location for further use.

4. Historical Cell Location

Mobile phones may be identified and located on the basis of historical, past presence in a defined geographic area as bounded by a covered by a sector, a cell or group of cells. The background location feature allows the operator to define an area based on cells (CGIs), collect IMSI/TMSI information for mobiles that had a network transaction in the area of interest, and locate the identified mobiles on later network transactions. First, the cells or CGI are loaded into the Wireless location system. After that point in time an LBS application desires to know all the mobile numbers (and thus the identity) of mobiles that were in a specific area during a specific period of time the LMS is queried. The LMS will produce all mobile identifiers known (IMSI, MSISDN, IMEI) to the application. By tasking the LMS with the collected mobile identifiers, the mobiles will then be tracked with high accuracy as they leave the area of interest.

For example, after a tsunami or hurricane, a group of search and rescue personnel, equipped with mobiles or mobile devices, may be identified automatically at a rally point and be added automatically to a high accuracy U-TDOA tracking list for further tracking and oversight within the stricken area.

Figure 6:
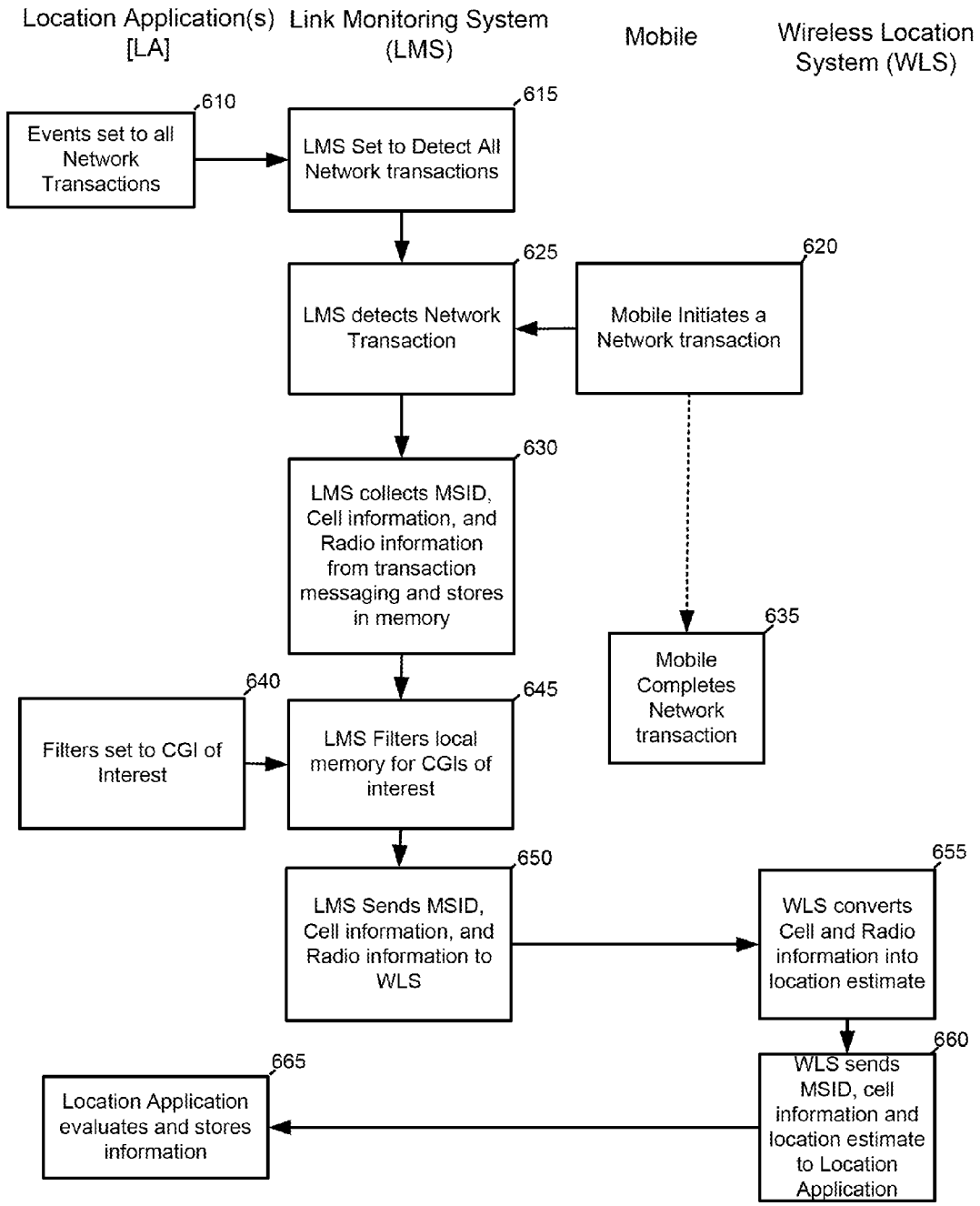
FIG. 6 depicts an exemplary method of using historical cell location in accordance with the present invention.

FIG. 6 depicts an exemplary method of using historical cell location in accordance with the present invention. At step 610, events are set to all network transactions. The LMS is set to detect all network transactions at step 615. When a mobile initiates a network transaction at step 620, the LMS detects the network transaction at step 625 and collects the MSID, Cell, and radio information from the transaction and stores the information in memory at step 630. Filers can be then set in the LMS for CGIs of interest at step 640. The LMS can then filter local memory for the CGIs of interest at step 645. The LMS can then send MSID, Cell, and radio information to the WLS for mobiles of interest. The WLS can convert the Cell and radio information into a location estimate at step 655. The WLS can then send the MSID, Cell, and radio information along with the location estimate to the Location Application at step 660. The Location Application can then evaluate and store the information for further use at step 665. At some point, the mobile will complete the network transaction at step 635.

5. Cell ID Triggers

Mobile phones may be identified and then located on the basis of a cell ID monitored by the LMS. If a mobile makes a network transaction (call origination, call termination, SMS origination, SMS termination, location update, measurement report or handover) then it will be located in the CGI of interest by the monitoring LMS.

Both cell-ID based and high accuracy location is supported for the Cell-ID trigger. The Cell ID based location may be the Cell-ID or cell-ID and timing advance (or ½RTT). ECID location is possible when the mobile is on a traffic channel. High-accuracy location is possible in areas with deployed LMUs whenever the mobile's channel information becomes available to the LMS.

Figure 7:
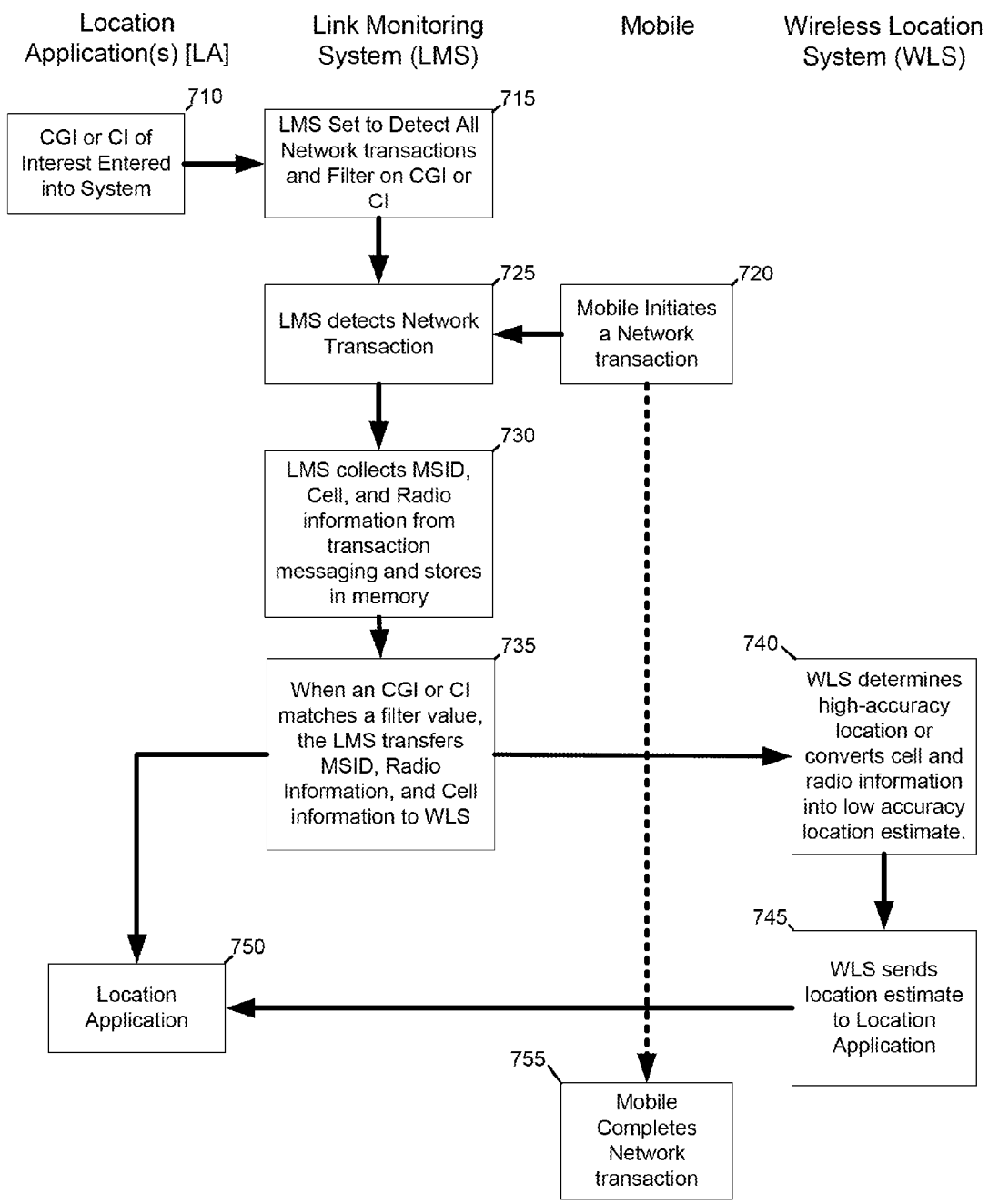
FIG. 7 depicts an exemplary method of using Cell ID triggers in accordance with the present invention.

FIG. 7 depicts an exemplary method of using Cell ID triggers in accordance with the present invention. At step 710, the CGI or CI of interest is entered into the system. The LMS is set to detect all network transactions and filter on CGI or CI at step 715. When a mobile initiates a network transaction at step 720, the LMS can detect the network transaction at step 725. The LMS can then collect the MSID, Cell, and radio information from the transaction and store the information in memory at step 730.

When the CGI or CI matches a filter value, the LMS can transfer the MSID, Cell, and radio information to the WLS at step 735. The WLS can then determine the location of the mobile through a high or low accuracy location at step 740. The WLS can then send the location to the Location Application at step 745 for further evaluation and storage. The Location Application can receive the information from the WLS and the LMS at step 750. At some point, the mobile will complete the network transaction at step 655.

6. Wide-Area Localization Application

Mobile devices can also be identified and located on the basis of presence in a defined geographic area under radio coverage by a sector, a cell or group of cells. This historical location feature is accomplished by loading an area, defined as a set of cells (CGI, CI), into the LMS. The LMS 11 can then develop a list of IMSIs, MSISDNs, and associated TMSIs that initiate a network transaction (e.g., handover, location update, etc.) in the geographic area of interest. The identification and location can also be further filtered by designating a specific time period. Thus, mobile devices will only be identified and located if they were in the designated location at the designated time period.

This application could be used, for example, to determine the identity of all mobile devices in a designated area during a designated time period associated with a fire or emergency event. Cell IDs of interest (CGI or CI) can be loaded into the LMS 11 system that correspond to a particular part of a city where a fire or an emergency event occurred. After that point in time if the authorities desire to know all the mobile numbers (and thus the identity) of individuals that were in a specific area during a specific period (i.e., the period of time that the fire occurred), the list can be available within seconds of the request. This may be particularly useful in obtaining evidence or witnesses to an event, for example.

Figure 8A:
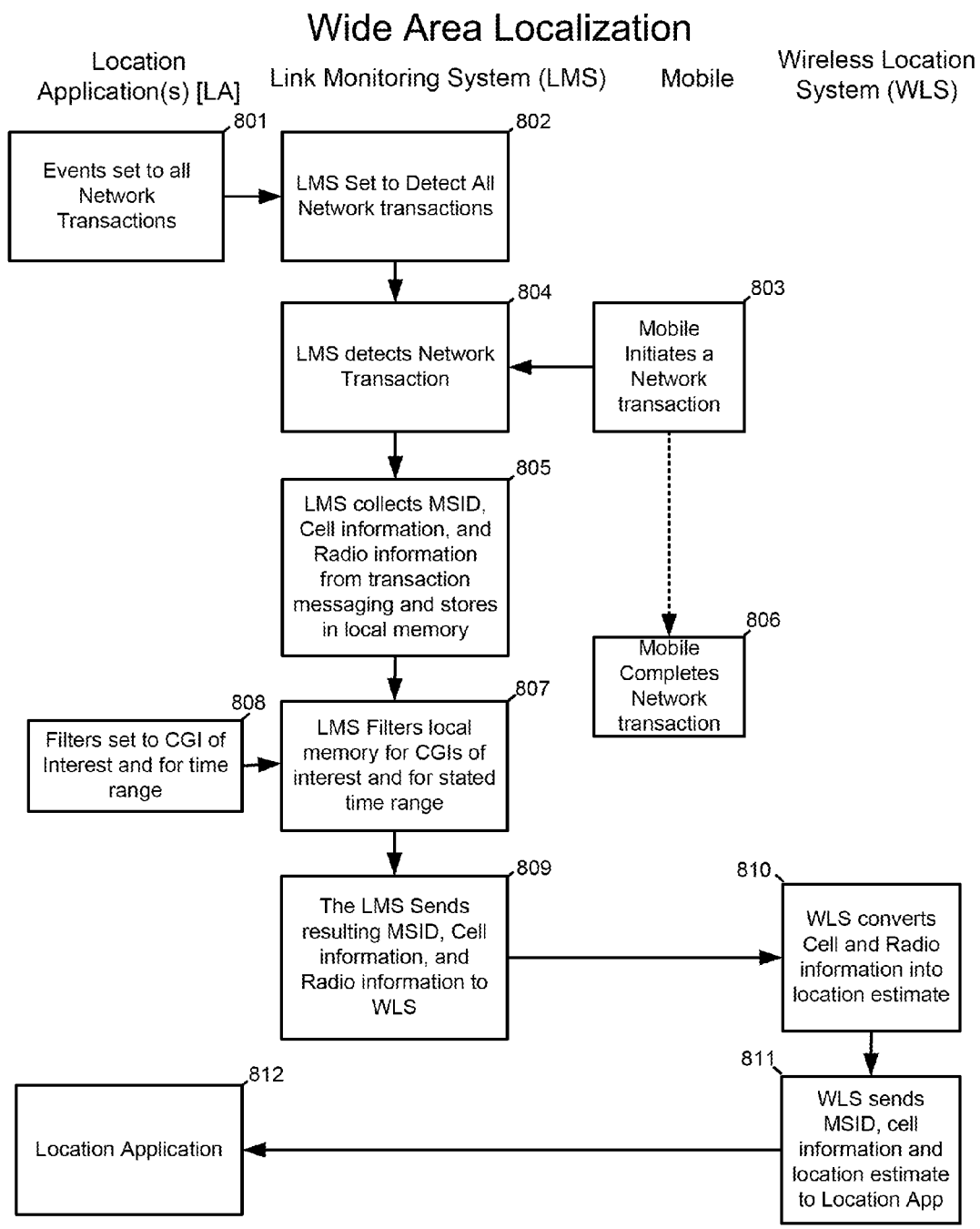
FIG. 8A depicts an exemplary method for detection of mobiles based on location and time in accordance with the present invention.

FIG. 8A depicts an exemplary method for detection of mobiles based on location and time in accordance with the present invention. At step 801, the events are set to all network transactions. The LMS is set to detect all network transactions at step 802. When a mobile initiates a network transaction at 803, the LMS can detect the network transaction at step 804. The LMS can then collect the MSID, Cell, and radio information from the transaction and store the information in memory at step 805.

Filters can be set to the CGI of interest and for a specific time period at step 808. The LMS can then filter local the local memory for CGIs of interest for the specified time period at step 807. The LMS can then send the resulting MSID, Cell, and radio information to the WLS for location at step 809. The WLS can then determine the location of the mobile at step 810. The WLS can then send the MSID, Cell, radio information, and location to the Location Application at step 811 for further evaluation and storage. The Location Application can receive the information from the WLS at step 812. At some point, the mobile will complete the network transaction at step 806.

7. Background Location of All Subscribers

Mobile devices can also be identified and located on the basis of historical or past presence in a defined geographic area as bounded by a covered by a sector, a cell, or group of cells. The background location feature can allow an operator to define an area based on cells (CGIs), collect IMSI/TMSI information for mobiles that had a network transaction in the area of interest, and locate the identified mobiles on later network transactions.

To begin the location, the cells or CGI are loaded into the Wireless Location System. After that point in time, if an LBS application desires to know all the mobile numbers (and thus the identity) of mobiles that were in a specific area during a specific period of time, the LMS 11 is queried. The LMS 11 will produce all mobile identifiers known (IMSI, MSISDN, IMEI) to the application. By tasking the LMS 11 with the collected mobile identifiers, the mobiles will then be tracked with high accuracy as they leave the area of interest. For example, after a tsunami or hurricane, a group of search and rescue personnel, equipped with mobiles or mobile devices, may be identified automatically at a rally point and be added automatically to a high accuracy U-TDOA tracking list for further tracking and oversight within the stricken area.

8. Smart Proximity Location

Smart proximity identification allows mobile devices to be identified and located on the basis of proximity to another mobile device. The smart proximity identification feature allows the operator to obtain a list of all users in the same area as a mobile device of interest. In an avalanche zone, for example, a mobile of a missing skier can be located. A complete list of mobile devices in the same area can also be determined. The mobiles belonging to search and rescue personnel found in the same geographic area to the mobile of interest will be queried via Anytime Interrogation (ATI) or NULL value SMS and the high-accuracy locations produced will be used to determine the proximity to the mobile of interest. The rescuers can then be directed to the missing or distressed skier.

Figure 8B:
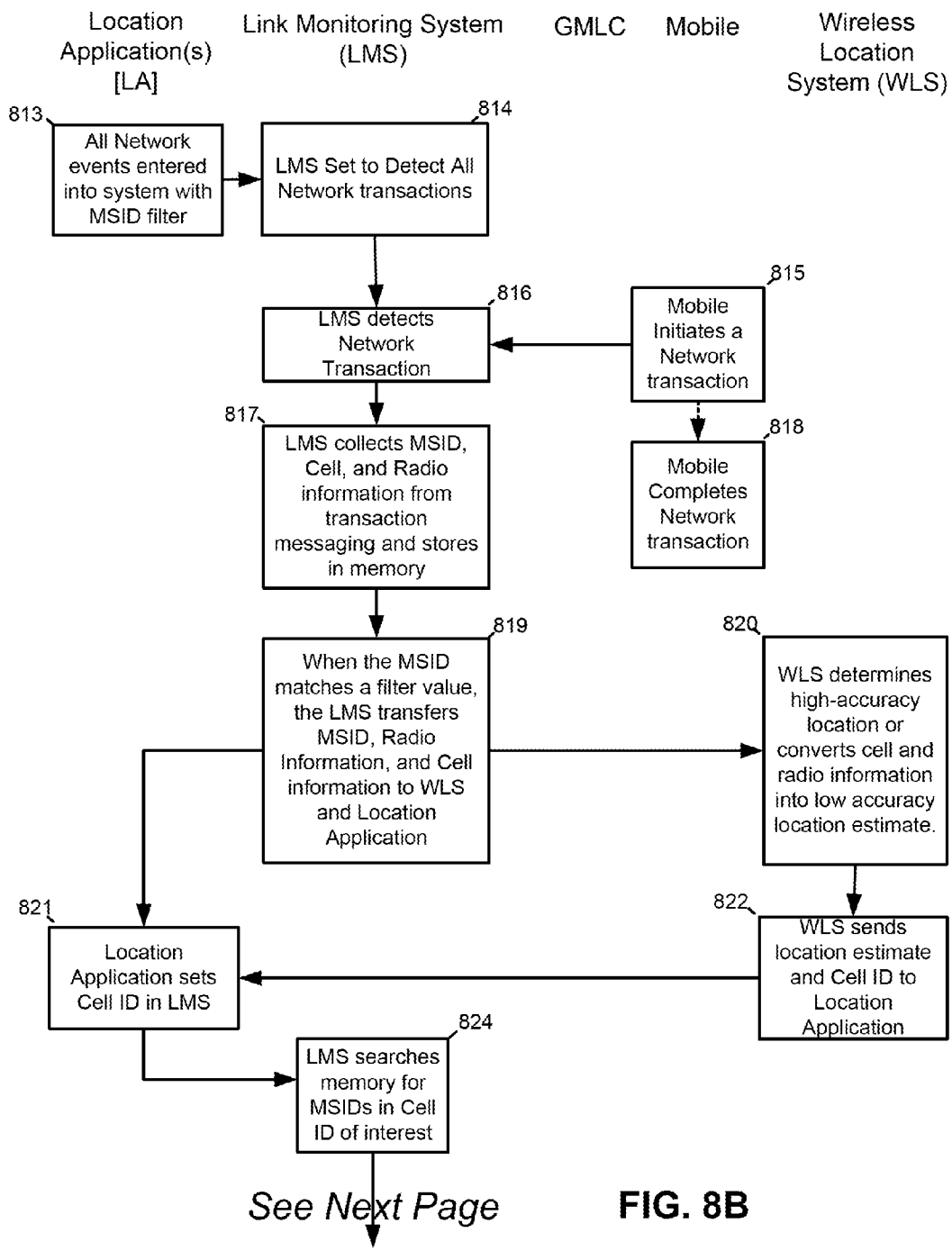
FIG. 8B partially illustrates an exemplary method of Smart Proximity Location in accordance with the present invention.
Figure 8C:
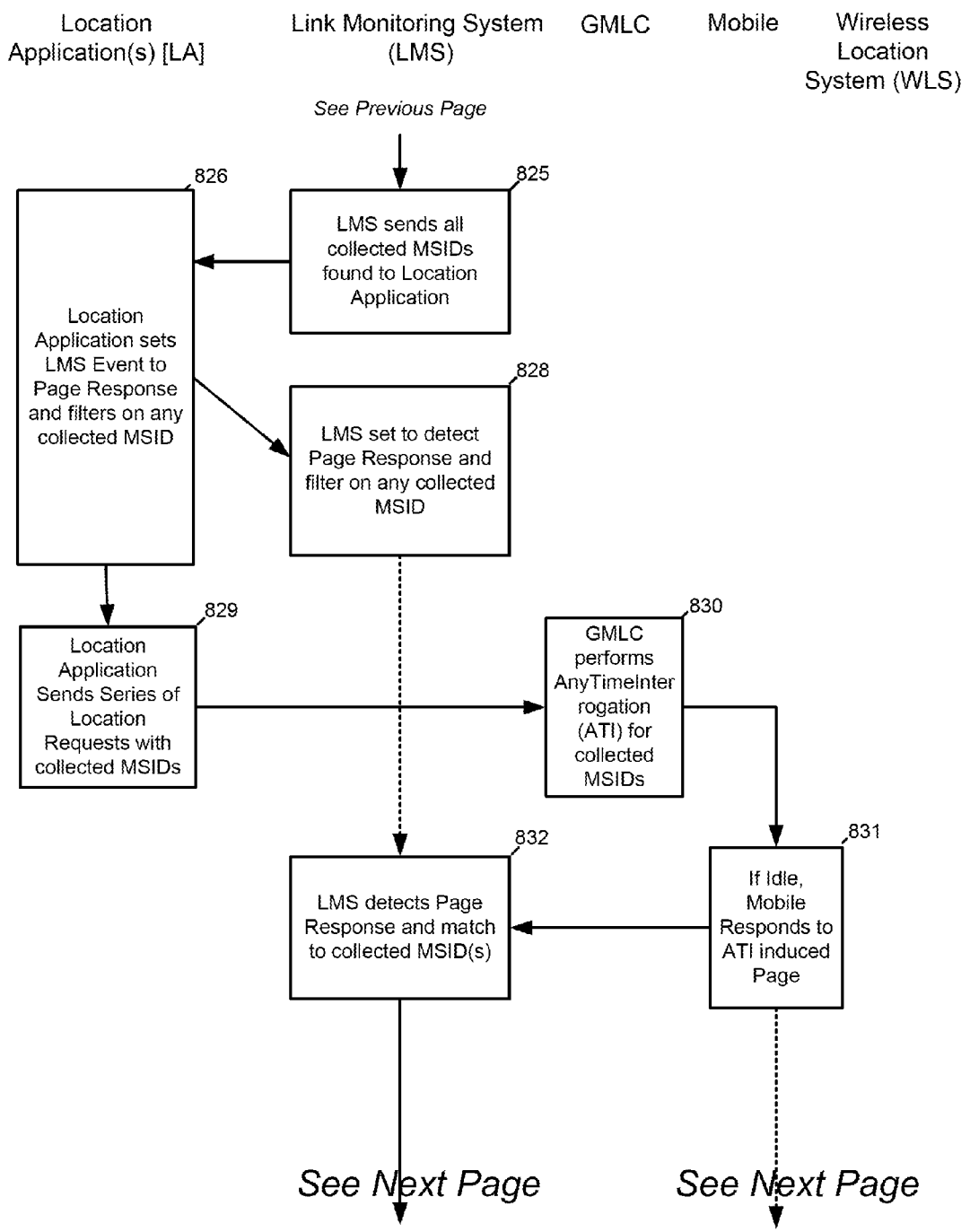
FIG. 8C further illustrates an exemplary method of Smart Proximity Location in accordance with the present invention.
Figure 8D:
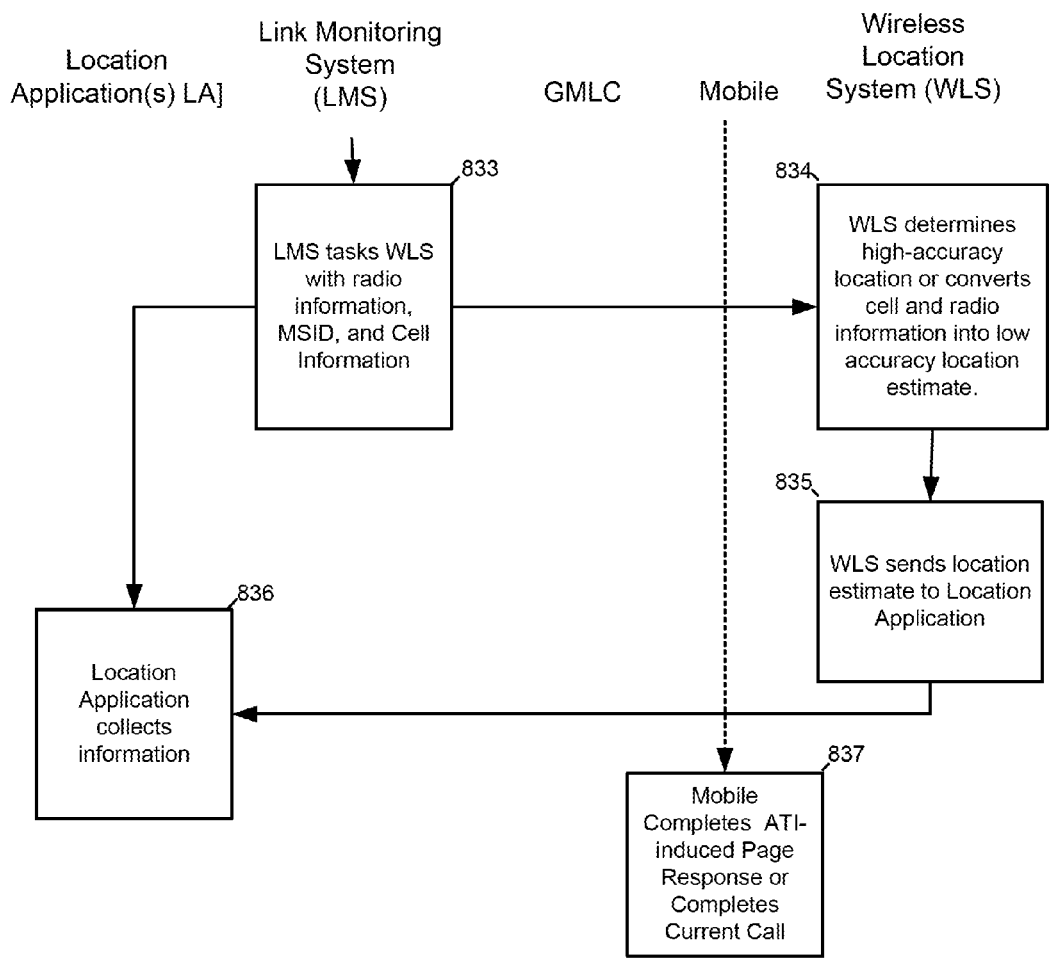
FIG. 8D further illustrates an exemplary method of Smart Proximity Location in accordance with the present invention.

FIGS. 8B-8D illustrate an exemplary method of Smart Proximity Location in accordance with the present invention. At step 813, all network events can be entered into the system with a MSID filter. The LMS can be set to detect all network transactions at step 814. When a mobile initiates a network transaction at step 81, the LMS can detect the transaction at step 816 and collect MSID, Cell, and radio information as a result of the transaction and can store it in memory at step 817. Sometime subsequent to the network transaction, the mobile will complete the transaction at step 818. When a MSID matches a predetermined filter value, the LMS can transfer the MSID, Cell, and radio information to the WLS at step 819. The WLS can perform a low or high accuracy location of the mobile at step 820. The LMS and the WLS will transfer all available information, including the location estimate and Cell ID to a Location Application at steps 819 and 822 respectively. The Location Application can then set Cell ID in the LMS at step 821.

The LMS can then search the memory for MSIDs in Cell ID of interest at step 824. The LMS can then send all the collected MSIDs found to the Location Application at step 825. The Location Application can then set the LMS event to page response and filter on any collected MSID at step 826. The LMS can then be set to detect page response and filter on any of the collected MSID at step 828. The Location Application also can send a series of location requests with the collected MSIDs at step 829. As a result, the GMLC can perform AnyTimeInterrogations (ATI) for the collected MSIDs at step 830. If the mobile is idle, the mobile can respond to the ATI induced page at step 831. The LMS can then detect the page response and match to the collected MSIDs at step 832.

The LMS then can task the WLS with MSID, Cell, and radio information at step 833. The WLS can then perform a low or high accuracy location of the mobile at step 834 and sent the location estimate to the Location Application at step 835. The LMS can also send the MSID, Cell, and radio information to the Location Application at step 833. The Location Application will collect all the information at step 836 for further use. At some point in time, the mobile will complete the ATI-induced page response or call at step 837.

9. Geo-Fencing

Mobile devices can also be identified and then located with high accuracy, on the basis of a cell ID-based location as generated by the LMS. The fenced area can correspond to the area of the cell (CGI) or more restrictive, by the area defined by a cell and sector combined with timing advance (TA). The Geo-fencing feature allows the operator to set specific areas or "restricted" zones based on cell area or sector areas that initiate high-accuracy locations on mobiles entering the area or that get too close to those defined restricted zones.

For example, the CGI serving an area adjacent to the restricted zone can be loaded into the wireless location system. From that time forward any mobile that enters or leaves that area will be located by high accuracy U-TDOA so that a security service, for example, may investigate the incident. The service may also continue to locate that mobile or if the trespass is found to be innocent, terminate the location. In other embodiments, an individual subscriber may be notified, for example, by alarm, if he leaves or arrives to a pre-determined Geo-fenced area at a time not scheduled.

Mobile devices, regardless of the air interface in use, are designed to maximize battery life. For this reason, the power-consuming radio transmitter and receiver are kept in a powered down or standby state unless the user places a call initiates a data session or an internal timer expires. Expiration of an internal timer may cause the phone to transmit or may simply activate the receiver to listen for incoming messaging. Incoming messages may be addressed directly to the mobile device (as in a page) or broadcast by the wireless system to all wireless devices. For purposes of this specification, transmissions by a mobile device are referred to as "radio network events".

As previously mentioned, the mobile device may be quiescent for long durations, rendering problematic its use as a vehicle for location or tracking. This invention relies on the use of unmodified, standardized mobile phones in standard, unaltered operation, a passive network monitoring device, and the designation of geographical zones or boundaries to enable the class of location-based services collectively called "geo-fencing".

Automatic geo-fencing takes advantage of existing wireless network parameters and configurations used to control radio traffic. The Location Area (LA), the Location Area Code (LAC), and the Location Area Index (LAI), and their non-GSM equivalents, are already in use to control delivery of control messaging, data, and voice calls to the mobile device by limiting the paging traffic to a geographic area defined by the wireless operator.

Automatic geo-fencing requires the operator to designate specific areas of interest or zones based on wireless service parameters such as cell, sector, paging area, routing area, or other service area. Once an area has been designated, the wireless location system can detect and locate wireless devices and alert others that wireless devices have entered defined restricted zones or attempted to travel out of the defined zones. A mobile phone also may cause an alarm if it leaves or arrives at pre-determined geo-fenced area at a time when it is not expected or scheduled, for example. Adjustment of wireless network parameters such as the LAC and establishment of the geo-fenced zones of interest could potentially have a non-optimal effect on overall wireless system radio and network traffic such as the creation of higher paging volumes. Geo-fencing is seen as a high-value Location-based service worth of perturbing the wireless network. Geo-fencing using wireless system paging configurations was not possible before recent emergency services projects for both low-accuracy (cell-id based) and high-accuracy (U-TDOA, AoA) network-based location systems.

In addition to the AoA and TDOA location methods described in the listed patents, the wireless location system supports lower accuracy location methods include those based mapping to a serving cell-ID, serving sector, or a combination of serving cell, sector and handover candidate measurements called Enhanced Cell ID (ECID)

The passive monitoring devices (radio network monitors (RNM 82) included in this invention allows for low-accuracy location of mobile phones using existing radio network messaging and information. Additional deployment of overlaid passive receivers covering the geo-fenced area or modification to existing cell-site receivers, will allow for high-accuracy (TDOA, AoA) location of any radio network events.

A. Detailed Description of Geo-fencing

Geo-Fenced Area

All base station radio transmitters in a PLMN broadcast, via a control channel, a Location Area Identity (LAI) code to identify the Location Area (LA) that the base station transmitter serves. When a mobile device is not engaged in a call, it automatically scans the control channel broadcasts transmitted by the base stations in the locality and selects a channel delivering the strongest signal. The LAI code broadcast by the selected channel identifies the location area in which the MS is currently situated. The LAI code is stored in the Subscriber Identity Module (SIM) of the mobile equipment. As the MS moves through the network area, the signal received from the selected control channel gradually diminishes in strength and a new stronger signal is determined. The MS can re-tune to the newly dominant channel and can examine the LAI code that the new channel is broadcasting. If the received LAI code differs from that stored on the SIM, then the MS has entered another location area and initiates a location update procedure to report the change to the Mobile Switching Center (MSC). At the end of the procedure the LAI code in the SIM is updated.

Figure 8E:
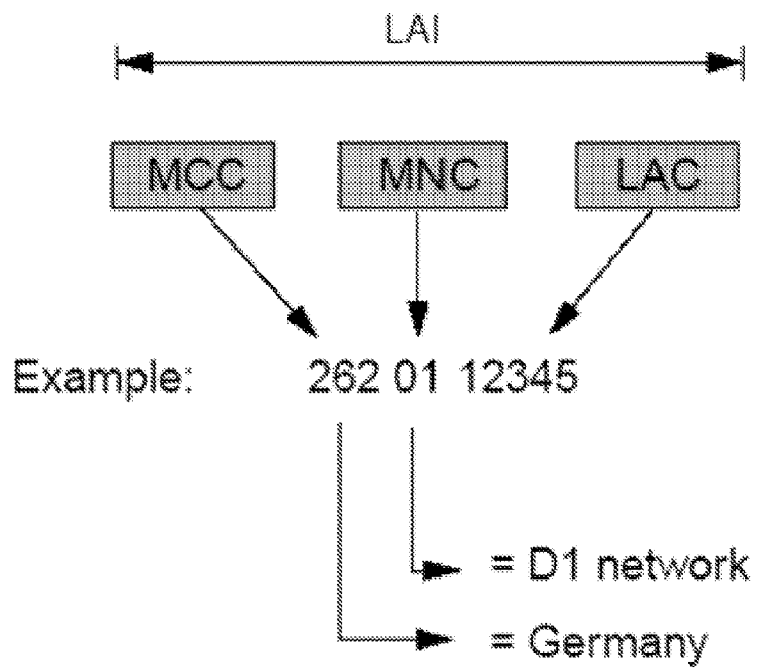
FIG. 8E illustrates a the Location Area Identity code in accordance with the present invention.

The Location Area Identity code identifies the location area in a PLMN. The LAI code has three components including a Mobile Country Code (MCC), a Mobile Network Code (MNC), and a Location Area Code (LAC), as shown in FIG. 8E. The MCC is a 3-digit code that can uniquely identify the country of domicile of the mobile subscriber (e.g., Germany is 262, and Brunei is 528). The MCC is assigned by the International Telecommunications Union (ITU-T) an international standards organization under the auspices of the United Nations). The MNC is a 2-digit code that identifies the home GSM PLMN of the mobile subscriber. If more than one GSM PLMN exist in a country, a unique MNC is assigned to each of them. The government of each country assigns the MNC 2-digit code.

The LAC component identifies a location area within a PLMN. The LAC has a fixed length of 2 octets and can be coded using hexadecimal representation. The operator assigns the LAC component of the LAI. FIG. 8E depicts an exemplary Location Area Identity (LAI) code.

Static Geo-Fenced Area

A static geo-fenced area is defined by a concatenated set of areas covered by a defined group of CGI or CI. The LMS or RNM can use these CGI or CI groups to filter network event triggers. Entry into, movement between cells and sectors, and exit out of the covered geographic areas can be detected for both idle mobile and those in a voice or data session. Size of the geo-fenced area is generally limited by the geographic distribution of RNM or by the area monitored by the LMS.

A static geo-fenced area is created by setting a common Location Area Code (LAC) in cells or sectors that cover a geo-fenced area; this creates a uniquely identified LA (Location Area) within the Public Land Mobile Network (PLMN). Thousands of these geo-fenced areas may be created per GSM wireless network, covering areas from a single sector or microcell to clusters up to national or continental size. Entry into and exit out of the covered geographic areas can be detected even if the mobile is idle. The LAC can be used by the LMS or RNM to network event triggers and limit triggering events only to the area of interest.

Figure 8F:
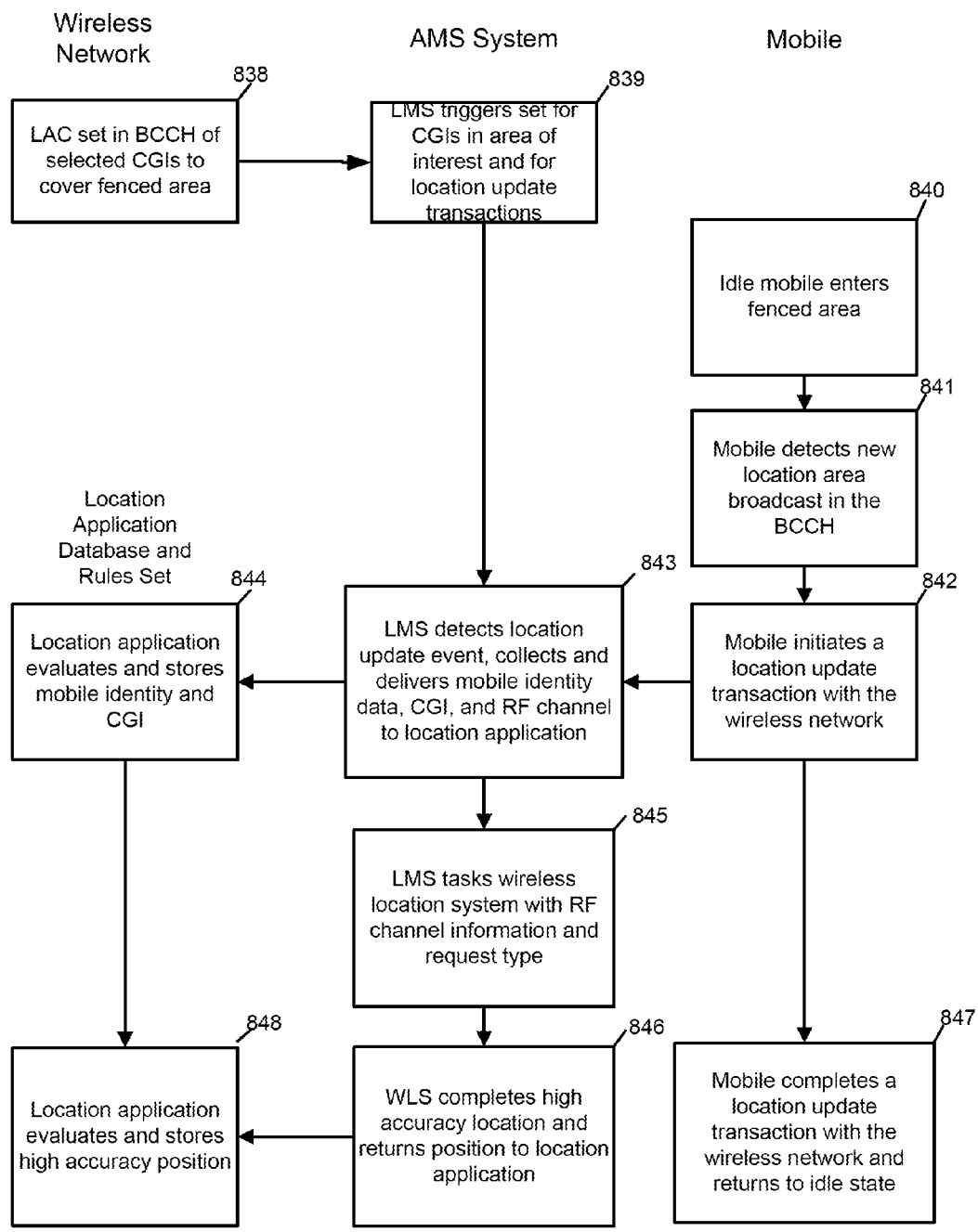
FIG. 8F is a flowchart of an exemplary process for detecting an idle mobile with a static LAC in accordance with the present invention.

FIG. 8F is a flowchart of an exemplary process for detecting a idle mobile with a static LAC in accordance with the present invention. To begin with, the LAC is set in the BCCH of selected CGIs to cover a "fenced" area at step 838. In addition, the LMS triggers are set for CGIs in the area of interest and for any location update transactions at step 839. At step 840, a exemplary mobile, that is idle, enters the "fenced" area. The exemplary mobile will detect the new location area broadcast (i.e., the LAC) in the BCCH at step 841. At step 842, the mobile can initiate a location update transaction with the wireless network. The LMS will detect the location update event at step 843 and will collect and deliver mobile identity data, the CGI, and RF channel to location to a location application, for example. The location application can then, at step 844, evaluate using, for example, a rules set, and store the mobile identity and CGI, in a database. Concurrently, the LMS can task, pending request type, a Wireless Location System (WLS) with RF channel information to complete a high accuracy location of the exemplary mobile at step 845. At some point subsequent to the mobile initiating at location update transaction at step 842, the mobile can complete the location update with the wireless network and return to an idle state at step 847. Further, once the WLS completes the high accuracy location of the mobile and defines the position of the mobile to the location application at step 846, the location application will evaluate and store the high accuracy position at step 848. If further tracking of the mobile is required, the LMS can continue to task the WLS to complete high accuracy locations on the identified mobile (not shown).

Figure 8G:
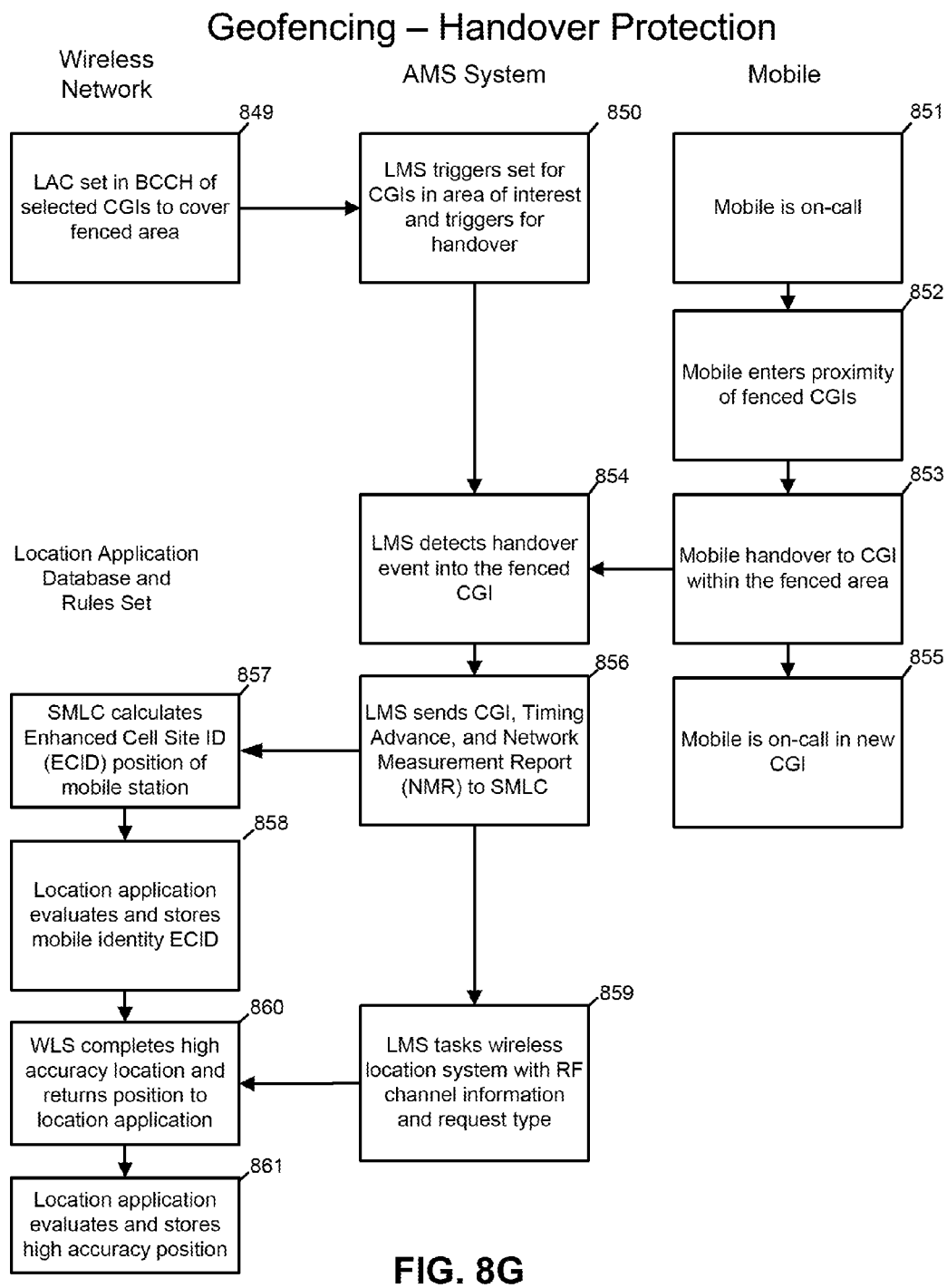
FIG. 8G is a flowchart of an exemplary process for detecting a mobile during handover in accordance with the present invention.

FIG. 8G is a flowchart of an exemplary process for detecting a mobile during handover in accordance with the present invention. To begin with, the LAC is set in the BCCH of selected CGIs to cover a "fenced" area at step 849. In addition, the LMS triggers are set for CGIs in the area of interest and triggers for handover at step 850. At step 850, a exemplary mobile comes on call. The when the mobile enters the proximity of the fenced CGIs at step 852, the mobile will perform a handover to a CGI within the fenced area at step 853. The mobile can then remain on call in the new CGI at step 855.

The LMS, however, detects the handover event at 854 and can send the CGI, Timing Advance, and the Network Measurement Report (NMR) to the SMLC at step 856. The SMLC can calculate the Enhanced Cell Site ID (ECID) position of the mobile station at step 857. The Location Application can evaluate and store the mobile identity ECID at step 858. The LMS can task the WLS with the RF channel information and request type at step 859. The WLS can complete a high accuracy location and return the position of the mobile to the Location Application at step 860. The Location Application can then evaluate and store the high accuracy position at step 861. If further tracking of the mobile is required, the LMS can continue to task the WLS to complete high accuracy locations on the identified mobile (not shown).

Figure 8H:
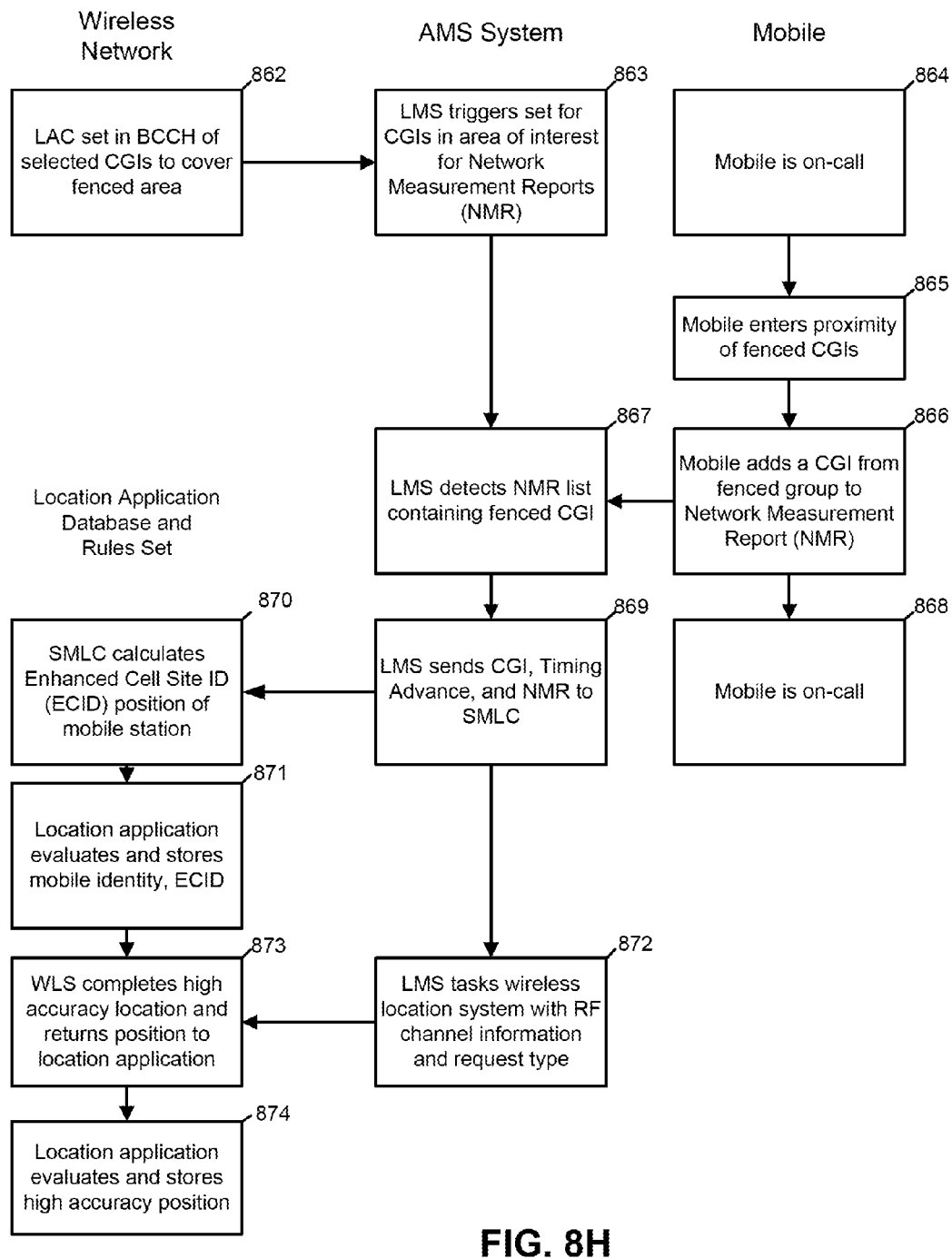
FIG. 8H is a flowchart of an exemplary process for detecting a mobile using proximity detection in accordance with the present invention.

FIG. 8H is a flowchart of an exemplary process for detecting a mobile using proximity detection in accordance with the present invention. Initially, the LAC is set in the BCCH of selected CGIs to cover a "fenced" area at step 862. In addition, the LMS triggers are set for CGIs in the area of interest for NMRs at step 863. At step 864, a exemplary mobile is on call. When the mobile enters the proximity of the fenced CGIs at step 865, the mobile will add a CGI from the fenced group to the NMR at step 866. The mobile can then remain on call at step 868. The LMS, however, detects the NMR list containing the fenced CGI at 867 and can send the CGI, Timing Advance, and the Network Measurement Report (NMR) to the SMLC at step 869. The SMLC can calculate the Enhanced Cell Site ID (ECID) position of the mobile station at step 870. The Location Application can evaluate and store the mobile identity ECID at step 871 The LMS can task the WLS with the RF channel information and request type at step 872. The WLS can complete a high accuracy location and return the position of the mobile to the Location Application at step 873. The Location Application can then evaluate and store the high accuracy position at step 874. If further tracking of the mobile is required, the LMS can continue to task the WLS to complete high accuracy locations on the identified mobile (not shown).

Dynamic

Dynamic changes to a cell's location area code (LAC) can be used to provoke idle mobiles to transmit and thus create a low-accuracy, cell ID-based location estimate or, in areas with installed overlay receivers, create the opportunity for a high-accuracy network-based (U-TDOA, AoA or Hybrid U-TDOA/AoA) location estimate. As a result of the changes in the LAC, mobiles currently in conversation can experience a handoff or can be released but allowed to redial and resume conversation in short order.

An alternate embodiment of the dynamic LAC allocation occurs where a high power, possibly mobile, standalone BTS with a unique LAC is used to provoke the mobiles in the cell's coverage area into performing a Location Update. Detrimental effects on the wireless system can be expected, but can be confined to the coverage area of the standalone BTS and the surrounding cells.

Figure 8I:
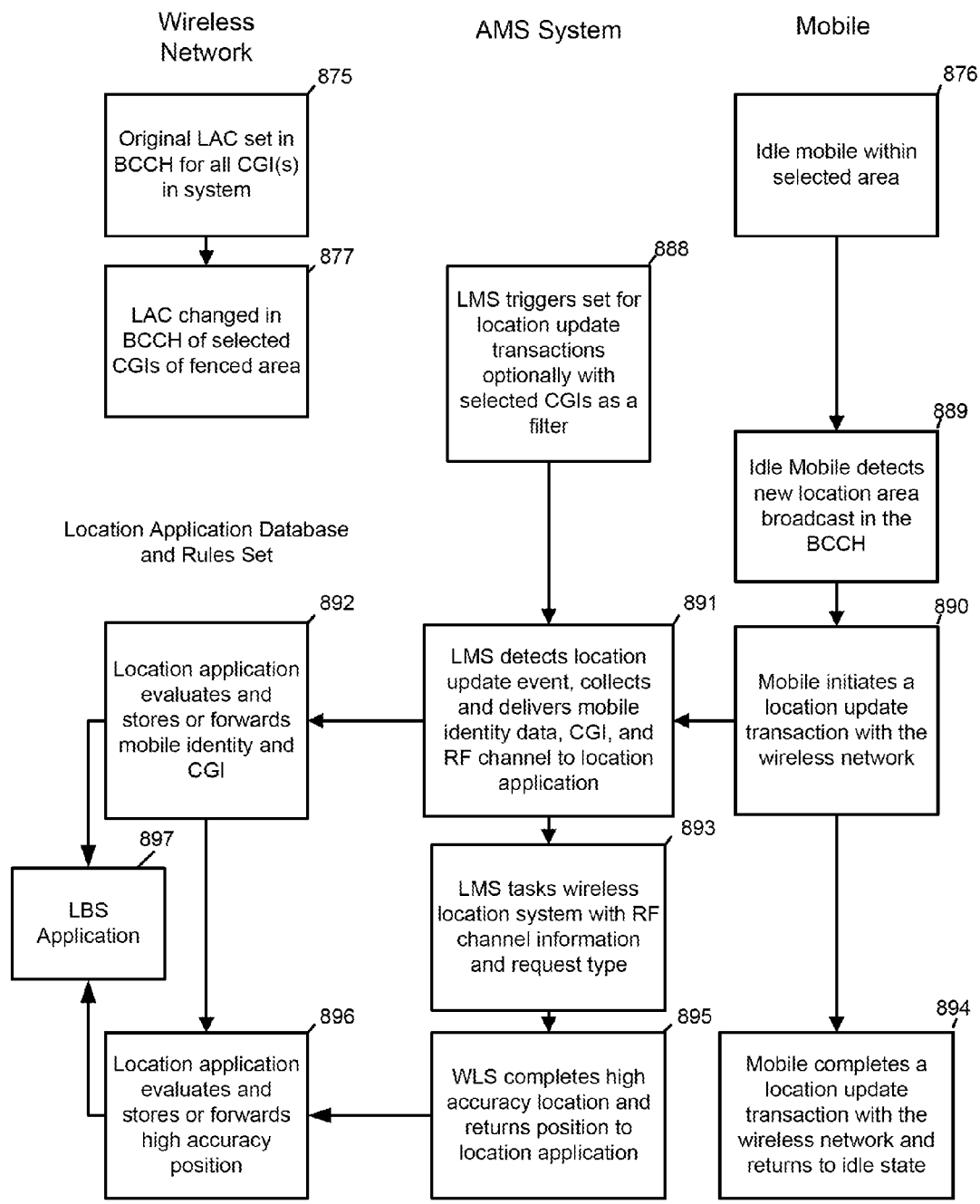
FIG. 8I is a flowchart of an exemplary process for dynamically detecting a mobile using geo-fencing in accordance with the present invention.

FIG. 8I is a flowchart of an exemplary process for dynamically detecting a mobile using geo-fencing in accordance with the present invention. Initially, an original LAC is set in the BCCH for all CGIs in the system at step 875. The sought mobile is idle in the selected area at step 876. The LAC can then be changed in the BCCH for selected CGIs of the fenced area of interest at step 877. Also, the LMS triggers can be set for location update transactions optionally with selected CGIs as a filter at step 888. The idle mobile in the fenced area then will detect the new location area broadcast in the BCCH at step 889. The mobile will initiate a location update transaction with the network at step 890. The LMS can detect the location update event and collect and deliver mobile identity data, CGI, and RF channel information to a location application at step 891. Subsequently, the mobile will complete the location update transaction and return to an idle state in the fenced area at step 894.

The Location Application can evaluate, store, or forward the mobile identity and CGI to an LBS application at step 892. Further, the LMS can task a wireless location system with RF channel information and request type at step 893. The WLS can complete a high accuracy location and return the position to the Location Application at step 895. The Location Application can evaluate, store, and/or forward the high accuracy position on to a LBS application at step 896. The LBS application can then evaluate the information collected at step 897. If further tracking of the mobile is required, the LMS can continue to task the WLS to complete high accuracy locations on the identified mobile (not shown).

Geo-Fencing Option 1

Figure 8J:
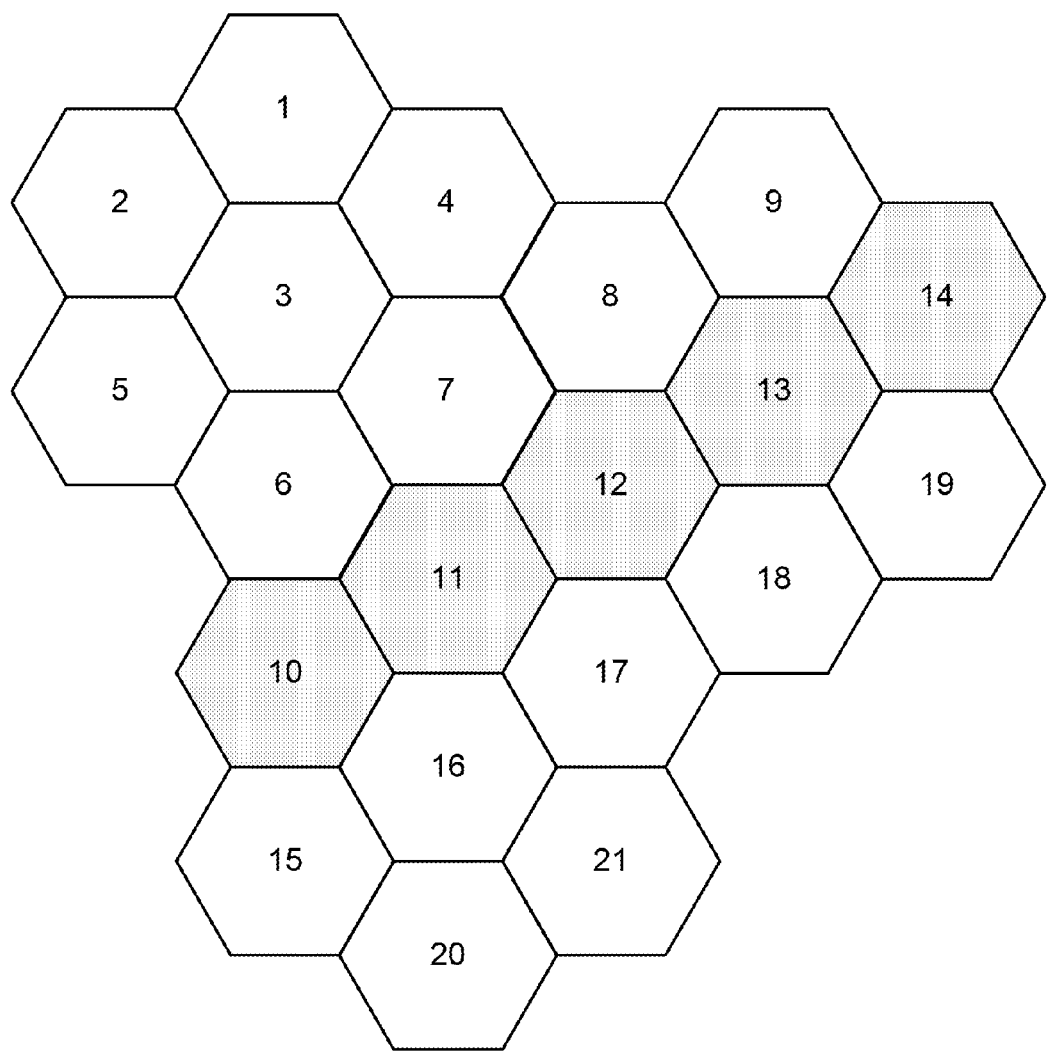
FIG. 8J illustrates an exemplary cell configuration in accordance with the present invention.

In FIG. 8J, receivers (LMUs) are installed at existing cell site or standalone locations with a central processing node (the SMLC) serving the deployed LMUs. The LMUs can determine the local BCCH, establishing the timing and framing of the BCCH. The LMU can then determine the local Access Channels or can be preset to scan a range of access channels. The LMU can detect mobile attempting to use the RACH (or other uplink channels) to access the local GSM network. Once detected, the LMUs in the immediate area can be tasked to locate the accessing mobile.

This geo-fencing application would therefore not be able to detect idle mobiles or those that move into the geo-fenced area while on a call. Identity of the mobile or the subscriber could not be determined by this system, but interface to non-location nodes could provide the necessary TMSI-IMSI-MSIDN mapping.

Standalone receivers can be used to improve the coverage and geometry of the covered area. Geometry of network can be used to minimize the effects of Geometric Dilution of Precision (GDOP) present in all TDOA-based location systems or maximize the signal to noise ratio. Improvements in GDOP or SNR would yield a more accurate location estimate.

In FIG. 8J, BTS's 10, 11, 12, 13, 14 are equipped with RNMs 82 thus setting the size and shape of the geo-fenced area.

Geo-Fencing Option 2

Figure 8K:
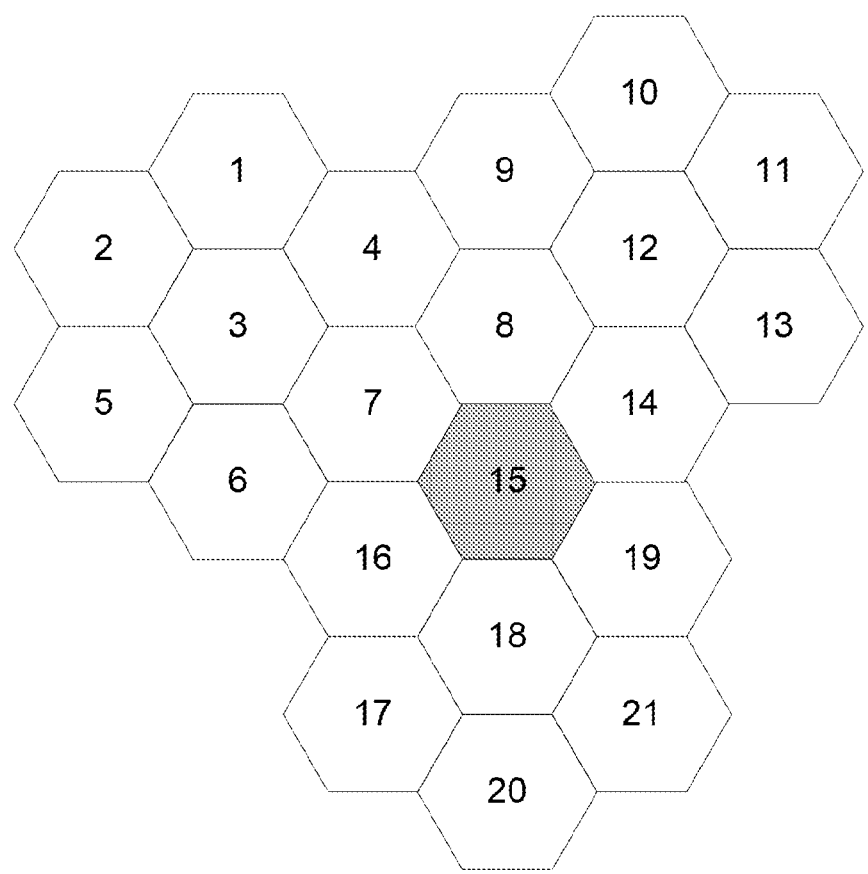
FIG. 8K illustrates another exemplary cell configuration in accordance with the present invention.

In FIG. 8K, receivers (RNMs) can be installed at existing cell site or standalone locations with a central processing node (the SMLC) serving the deployed RNMs. The Location Area Code (the LAC) is set to be unique in the geo-fenced area with all BCCHs in the geo-fenced area using the same LAC.

The RNMs can determine the local BCCH, establishing the timing and framing of the BCCH. The RNM can then determine the local Access Channels or can be preset to scan a range of access channels. The RNM can detect mobiles attempting to use the RACH (or other uplink channels) to access the local GSM network. Once detected, the RNMs in the immediate area would be tasked to locate the accessing mobile.

Since the LAC is unique to the geo-fenced area, idle mobiles would perform a Location Update upon moving into the geo-fenced area. An on-call mobile would perform a Location Update on completion of the call. In either case, the monitoring RNMs would detect the Location Update and perform a location estimate on the triggering Mobile.

Standalone receivers can be used to improve the coverage and geometry of the covered area. Network geometry can be used to minimize the effects of Geometric Dilution of Precision (GDOP) present in all TDOA-based location systems or maximize the SNR. Improvements in GDOP or SNR would yield a more accurate location estimate. Identity of the mobile or the subscriber could not be determined by this system, but interface to non-location nodes (MSC/VLR or HLR) could provide the necessary TMSI-IMSI-MSIDN mapping.

In FIG. 8K, cells 7, 8, 14, 15, 16, 18 and 19 are equipped with RNMs. Cell 15 has been set to broadcast a locally unique Location Area Code on the Broadcast Control Channel (BCCH). It is the LAC that defines the geo-fenced are size and boundaries Geo-Fencing Option 3

Figure 8L:
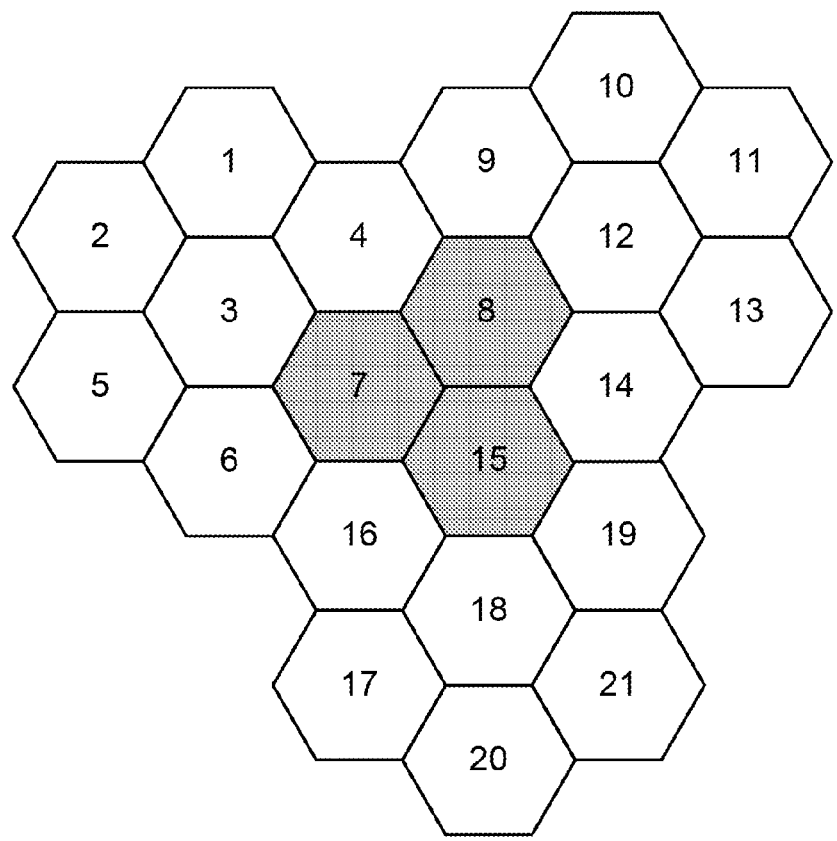
FIG. 8L illustrates another exemplary cell configuration in accordance with the present invention.

As depicted in FIG. 8L, Geo-fencing using the Links Monitor (LMS) (or similar facility built into the base station controller (BSC) or Radio Network Controller(RNC)) is possible with the LMS set to trigger on mobile network transactions. These network transactions include Mobile Originations, Mobile Terminations, Location Updates, Short-Message-Service originations, and SMS terminations as well as other control channel procedures such as handover.

By monitoring the links between the base station (BTS) and BSC, the LMS can detect these events. By link-selective monitoring, or by filtering the triggers based on cell ID, the LMS can be used to create arbitrary geo-fenced areas based on cell or sector coverage areas.

The LMS can then determine a location estimate for a triggering mobile using the information available on the Abis (or Iub) link. Using the information collected by the LMS, the wireless location system (WLS) can compute low-accuracy Cell-ID based locations.

The lowest accuracy, CGI or CI method, is simply the reporting of the latitude and longitude of the serving cell tower or the center of the serving sector. A more accurate location estimate can be computed using both the cell-ID (CGI in GSM or CI in UMTS) and the timing advance (TA) (also used in UMTS as ½ Round-trip-time (RTT) originally used by the wireless system to synchronize the mobile's uplink messaging. Conversion of the Timing Advance to distance (multiplying by the speed-of-light in air) yields a range estimate from the cell tower to the mobile device.

Using the CGI+TA (or CI+RTT) location technique, the reported location is the intersection of the area formed by timing granularity of the timing advance measurement (554 meters in GMS, 39 meters in UMTS) and the bisector of the serving sector. In the case of an omni-directional, single sector cell, the reported location for the CGI+TA or CI+RTT method is the latitude and longitude of the serving cell tower.

The potentially most accurate cell-ID based location technique, called Enhanced Cell ID (ECID), uses LMS collected information on the serving cell, serving sector and timing advance combined with beacon power measurements taken by the mobile station normally used for the determination of handover candidates. By combining the cell-ID, sector information, and timing advance with a power-difference-of-arrival calculation based on the LMS collected power measurements (or path-loss measurements in UMTS) from neighboring cells beacons, the WLS can potentially compute a more accurate location then the use of cell-ID or cell-ID with timing advance alone. Factors such as geometry of the neighboring cells, the RF environment and the number of measured beacons can limit the usefulness of ECID.

This geo-fencing application cannot detect idle mobiles but can detect and estimate location for mobiles on-call, entering (or exiting) the area and undergoing the handover procedure. Identification of the mobile or the subscriber cannot be guaranteed by this system, but interface to non-location nodes, such as the MSC/VLR or HLR could provide the necessary TMSI-IMSI-MSIDN mapping.

In FIG. 8L, the LMS has been preset with triggers for radio network transactions and uses filters to limit forwarded events to the wireless location system. It is the use of filtering that defines the geo-fenced area to cells 7, 8 and 15

Geo-Fencing Option 4

Figure 8M:
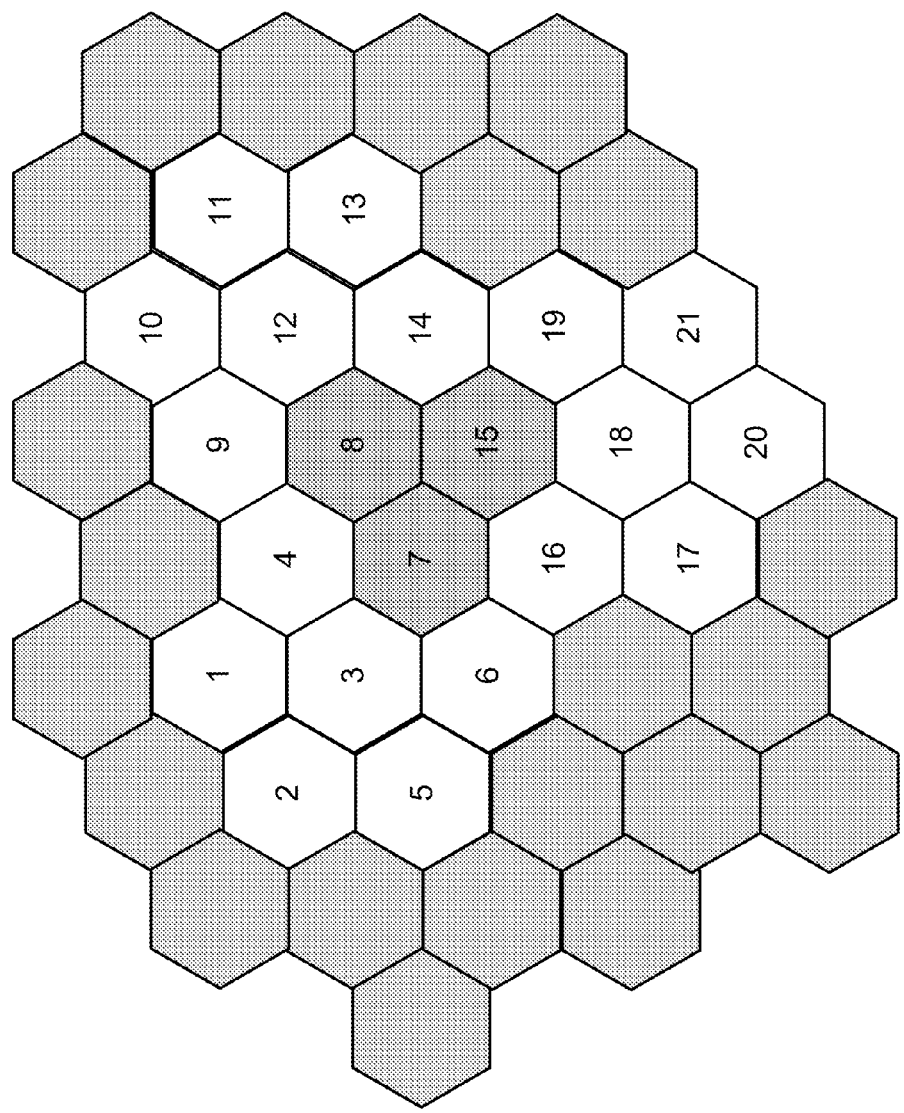
FIG. 8M illustrates another exemplary cell configuration in accordance with the present invention.

As depicted in FIG. 8M, Geo-fencing using the Abis Monitor (LMS) (or similar facility built-into the base station controller (BSC) or Radio Network Controller (RNC)) is possible with the LMS set to trigger on mobile network transactions. These network transactions include Mobile Originations, Mobile Terminations, Location Updates, Short-Message-Service originations, and SMS terminations as well as other control channel procedures such as handover and page response. The inclusion of a Gateway Mobile Location Center (GMLC) allows the system to both periodically relocate triggering mobiles. The GMLC also allows the collection of identity information based on HLR lookups for triggering mobiles.

By monitoring the links between the BTS and BSC, the LMS can detect these events. By link selective monitoring, or by filtering the triggers based on cell ID, the LMS can be used to create arbitrary geo-fenced areas based on cell or sector coverage areas. The LMS would then determine a location estimate for a triggering mobile using the information available on the Abis (or Iub) link. Using the information collected by the LMS, the wireless location system (WLS) can compute low-accuracy Cell-ID based locations. The lowest accuracy, CGI or CI method, is simply the reporting of the latitude and longitude of the serving cell tower or the center of the serving sector. A more accurate location estimate can be computed using both the cell-ID (CGI in GSM or CI in UMTS) and the timing advance (TA) (also used in UMTS as ½ Round-trip-time (RTT) originally used by the wireless system to synchronize the mobile's uplink messaging. Conversion of the Timing Advance to distance (multiplying by the speed-of-light in air) yields a range estimate from the cell tower to the mobile device.

Using the CGI+TA (or CI+RTT) location technique, the reported location is the intersection of the area formed by timing granularity of the timing advance measurement (554 meters in GMS, 39 meters in UMTS) and the bisector of the serving sector. In the case of an omni-directional, single sector cell, the reported location for the CGI+TA or CI+RTT method is the latitude and longitude of the serving cell tower.

The potentially most accurate cell-ID based location technique, called Enhanced Cell ID (ECID), uses LMS collected information on the serving cell, serving sector and timing advance combined with beacon power measurements taken by the mobile station normally used for the determination of handover candidates. By combining the cell-ID, sector information, and timing advance with a power-difference-of-arrival calculation based on the LMS collected power measurements (or path-loss measurements in UMTS) from neighboring cells beacons, the WLS can potentially compute a more accurate location then the use of cell-ID or cell-ID with timing advance alone. Factors such as geometry of the neighboring cells, the RF environment and the number of measured beacons can limit the usefulness of ECID.

The GMLC can be tasked by the SMLC node to query the HLR for identity information on LMS detected mobiles as well as being tasked to issue Any Time Interrogation (ATI) messages to the Mobile Switching Center (MSC) to cause the mobile to transmit a Page Response message sequence over the radio interface.

This geo-fencing application would not be able to detect idle mobiles but can detect and estimate location for mobiles on-call, entering (or exiting) the area and undergoing the handover procedure. Identification of the mobile or the subscriber could not be guaranteed by this system, but interface to non-location nodes could provide the necessary TMSI-IMSI-MSIDN mapping.

In FIG. 8M, the LMS monitors cells 1-21 and has been preset with triggers for radio network transactions and uses filters to limit forwarded events to the wireless location system. It is the use of filtering that defines the geo-fenced area to cells 7, 8 and 15. The addition of the GMLC allows for periodic low-accuracy location anywhere in the LMS coverage area (cells 1-21).

Geo-Fencing Option 5

Figure 8N:
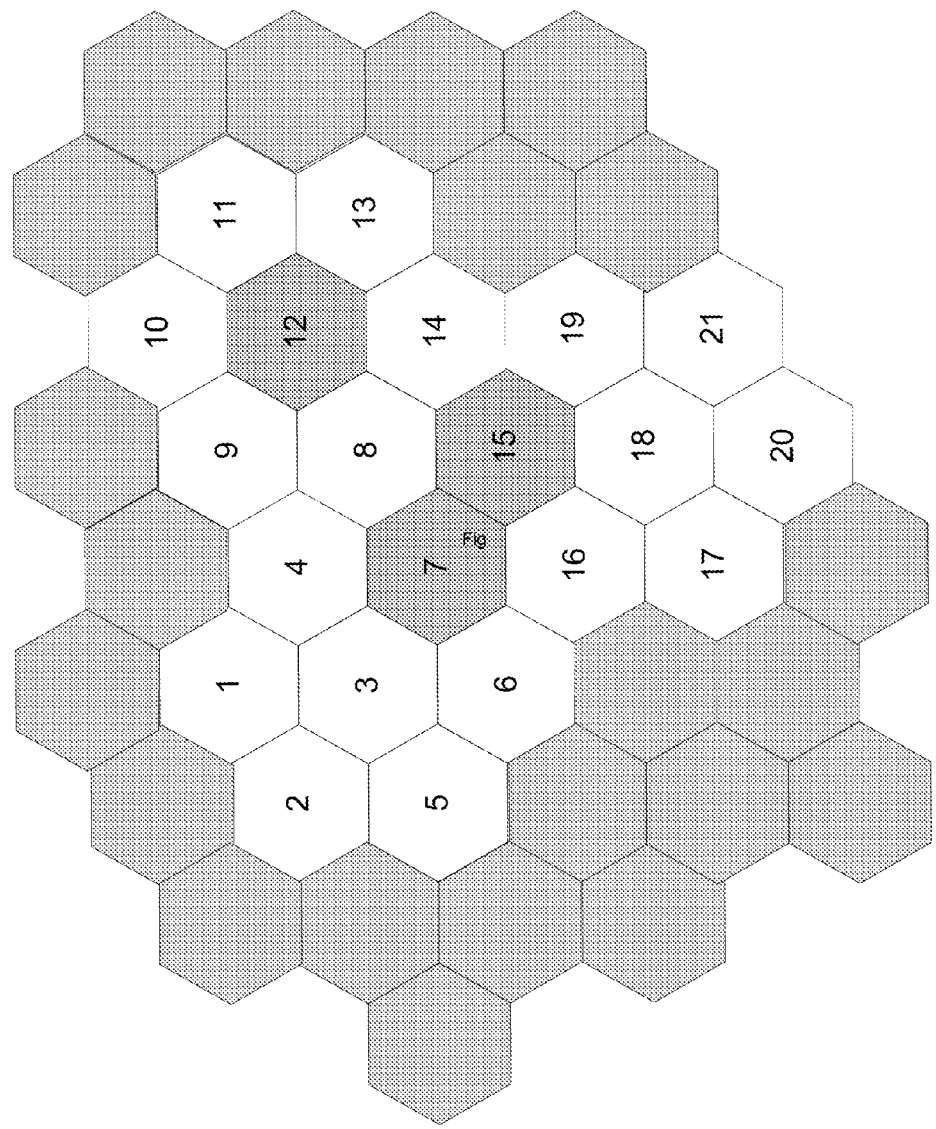
FIG. 8N illustrates another exemplary cell configuration in accordance with the present invention.

As depicted in FIG. 8N, Geo-fencing an arbitrary geographic area, using the Link Monitoring System (LMS) (or similar facility built-into the base station controller (BSC) or Radio Network Controller(RNC)) can occur with the LMS set to trigger on mobile network transactions. These network transactions include Mobile Originations, Mobile Terminations, Location Updates, Short-Message-Service originations, and SMS terminations as well as other control channel procedures such as handover and page response.

By monitoring the links between the base station (BTS) and BSC, the LMS can detect these events. By link selective monitoring, or by filtering the triggers based on cell ID, the LMS can be used to create arbitrary geo-fenced areas based on cell or sector coverage areas. By setting the LAC to be unique to the geo-fenced area, the LMS can be triggered for the Location Update generated by each mobile entering the geo-fenced area. The LMS would then determine a location estimate for any triggering mobile using the information available on the Abis (or Iub) link. Using the information collected by the LMS, the wireless location system (WLS) can compute low-accuracy Cell-ID based locations.

The lowest accuracy, CGI or CI method, is simply the reporting of the latitude and longitude of the serving cell tower or the center of the serving sector. A more accurate location estimate can be computed using both the cell-ID (CGI in GSM or CI in UMTS) and the timing advance (TA) (also used in UMTS as ½ Round-trip-time (RTT) originally used by the wireless system to synchronize the mobile's uplink messaging. Conversion of the Timing Advance to distance (multiplying by the speed-of-light in air) yields a range estimate from the cell tower to the mobile device.

Using the CGI+TA (or CI+RTT) location technique, the reported location is the intersection of the area formed by timing granularity of the timing advance measurement (554 meters in GMS, 39 meters in UMTS) and the bisector of the serving sector. In the case of an omni-directional, single sector cell, the reported location for the CGI+TA or CI+RTT method is the latitude and longitude of the serving cell tower.

The potentially most accurate cell-ID based location technique, called Enhanced Cell ID (ECID), uses LMS collected information on the serving cell, serving sector and timing advance combined with beacon power measurements taken by the mobile station normally used for the determination of handover candidates. By combining the cell-ID, sector information, and timing advance with a power-difference-of-arrival calculation based on the LMS collected power measurements (or path-loss measurements in UMTS) from neighboring cells beacons, the WLS can potentially compute a more accurate location then the use of cell-ID or cell-ID with timing advance alone. Factors such as geometry of the neighboring cells, the RF environment and the number of measured beacons can limit the usefulness of ECID.

For mobiles entering the geo-fenced area, the change in the LAC would cause the mobiles to perform a Location Update procedure. Since identification information (the IMSI and usually the IMEI) is exchanged during the Location Update procedure, the LMS would then have a location estimate and mobile and subscriber information.

This geo-fencing application would not be able to detect idle mobiles but can detect and estimate location for mobiles on-call, entering (or exiting) the area and undergoing the handover procedure if the link monitoring system (LMS) is available.

In FIG. 8N, the LMS monitors cells 1-21 and has been preset with triggers for radio network transactions and uses filters to limit forwarded events to the wireless location system. In addition, cells 7, 12, and 15 have been set to broadcast a locally unique Location Area Code on the Broadcast Control Channel (BCCH). It is the LAC that defines the geo-fenced area size, shape and boundaries. Once detected in the geo-fenced area, the mobile can then be located to low accuracy when transmitting in any of the cells 1-21.

Geo-Fencing Option 6

Figure 8O:
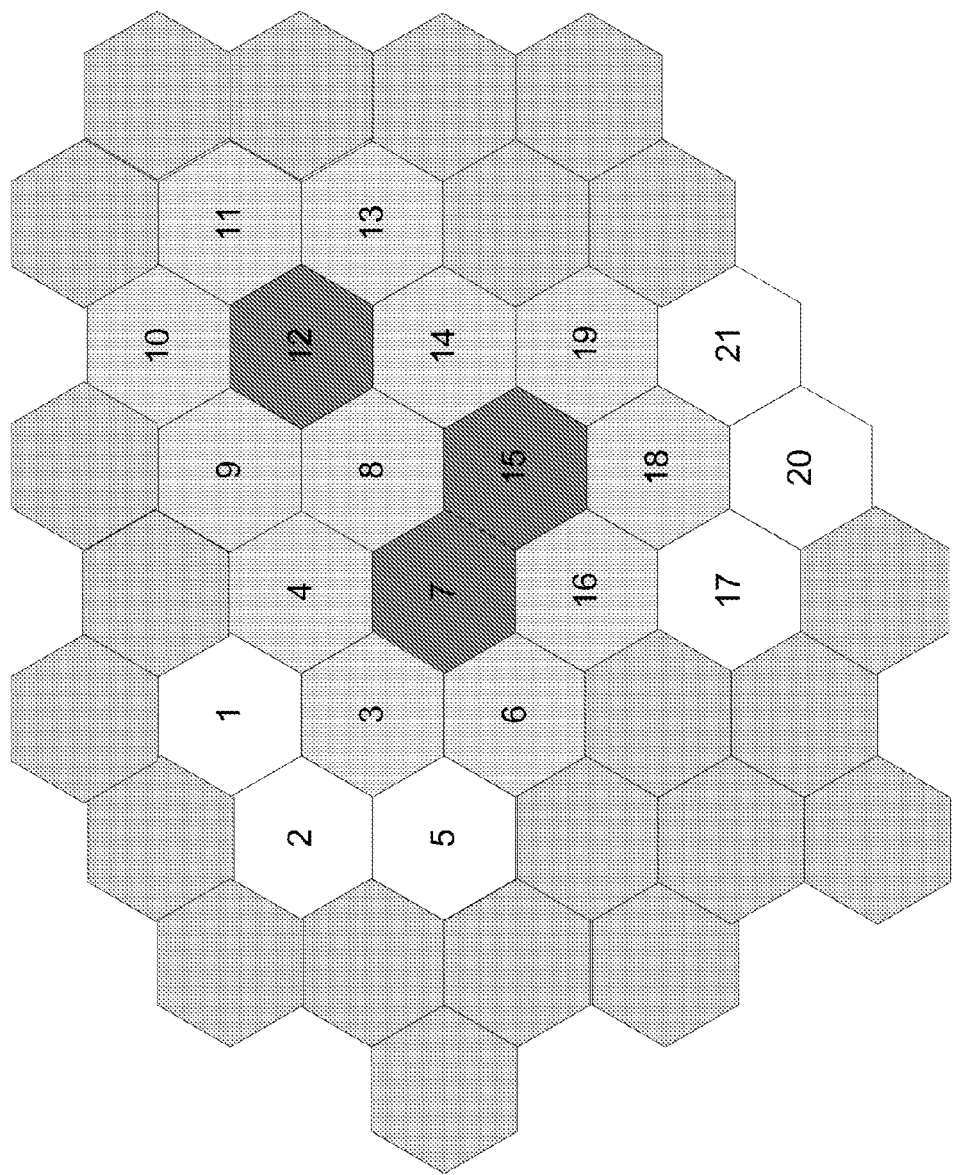
FIG. 8O illustrates another exemplary cell configuration in accordance with the present invention.

As depicted in FIG. 8O, Geo-fencing an arbitrary geographic area, can be combined with a high-accuracy U-TDOA system based on geographically distributed receivers (LMUs), a central processing node (the SMLC), and Link Monitoring System (the LMS) and a Gateway Mobile Location Center (GMLC).

With the LMS (or similar facility built-into the base station controller (BSC) or Radio Network Controller (RNC)), it is possible within the LMS to set triggers for mobile network transactions. These network transactions include Mobile Originations, Mobile Terminations, Location Updates, Short-Message-Service originations, and SMS terminations as well as other control channel procedures such as handover and page response.

By monitoring the links between the base station (BTS) and BSC, the LMS can detect these events. By link selective monitoring, or by filtering the triggers based on cell ID, the LMS can be used to create arbitrary geo-fenced areas based on cell or sector coverage areas. By setting the LAC to be unique to the geo-fenced area, the LMS can be triggered for the Location Update generated by each mobile entering the geo-fenced area. The LMS would then determine a location estimate for any triggering mobile using the information available on the Abis (or Iub) link. Using the information collected by the LMS, the wireless location system (WLS) can compute low-accuracy Cell-ID based locations.

The lowest accuracy, CGI or CI method, is simply the reporting of the latitude and longitude of the serving cell tower or the center of the serving sector. A more accurate location estimate can be computed using both the cell-ID (CGI in GSM or CI in UMTS) and the timing advance (TA) (also used in UMTS as ½ Round-trip-time (RTT) originally used by the wireless system to synchronize the mobile's uplink messaging. Conversion of the Timing Advance to distance (multiplying by the speed-of-light in air) yields a range estimate from the cell tower to the mobile device.

Using the CGI+TA (or CI+RTT) location technique, the reported location is the intersection of the area formed by timing granularity of the timing advance measurement (554 meters in GMS, 39 meters in UMTS) and the bisector of the serving sector. In the case of an omni-directional, single sector cell, the reported location for the CGI+TA or CI+RTT method is the latitude and longitude of the serving cell tower.

The potentially most accurate cell-ID based location technique, called Enhanced Cell ID (ECID), uses LMS collected information on the serving cell, serving sector and timing advance combined with beacon power measurements taken by the mobile station normally used for the determination of handover candidates. By combining the cell-ID, sector information, and timing advance with a power-difference-of-arrival calculation based on the LMS collected power measurements (or path-loss measurements in UMTS) from neighboring cells beacons, the WLS can potentially compute a more accurate location then the use of cell-ID or cell-ID with timing advance alone. Factors such as geometry of the neighboring cells, the RF environment and the number of measured beacons can limit the usefulness of ECID.

The LMS can also determined RF channel information from the monitored messaging and deliver such information to the SMLC. The SMLC will task the local RNMs to collect TDOA information on the signal of interest from the triggering mobile, resulting in a high-accuracy location.

The GMLC can be tasked by the SMLC node to query the HLR for identity information on LMS detected mobiles as well as being tasked to issue Any Time Interrogation (ATI) messages to the Mobile Switching Center (MSC) to cause the mobile to transmit a Page Response message sequence over the radio interface. This page response can in turn trigger an LMS-based, low accuracy [CGI, CGI+TA or ECID] location estimate or a high-accuracy U-TDOA location calculated by the SMLC and specialized receiver (LMU or SCS) network.

FIG. 8O shows cells 7, 12 and 15 have been set to send over the BCCH a locally unique Location Area Code (LAC). Cells 3,4,6,7,8,9,10,11,12,13,14,15,16,18,19 have all been equipped with RNMs. An LMS services all cells 1-21. While the geo-fenced area is defined by the LAC (cells 7, 12, 15) and is able to locate mobiles in the geo-fenced area with high accuracy, a low accuracy location remains possible for all cells 1-21. The addition of a GMLC allows for future location estimates for mobiles that once entered into the geo-fenced area or left the geo-fenced area.

10. Emergency Alerts

The Emergency Alert location-based application allows for geographically targeted messaging to mobile devices in the case of an emergency similar to the United States radio and television Emergency Alert System. A TDOA and AoA system using the RNM or LMS in accordance with the present invention provides for wide area localization and subsequent high volume, accurate location of mobile stations in the selected area. Once mobiles have been located in the area of interest, SMS messaging, MMS, or a recorded voice message can be used to warn and provide instructions to the targeted population.

For extremely large areas where high-accuracy precision location is unnecessary or when extremely high affected populations need to be warned, the Finder wireless location system may use lower-accuracy cell-ID based location estimates to find the affected populations to alert.

11. Calling Number Triggering

The WLS can locate a mobile based on the number calling the mobile. This number can be a mobile, fixed, local, and national or any length international number. The wireless location system can be tasked with any dialled digit trigger at the RNM or LMS. Once the trigger is tasked, the system will automatically locate any mobile in the service area called by the specified number.

Figure 9:
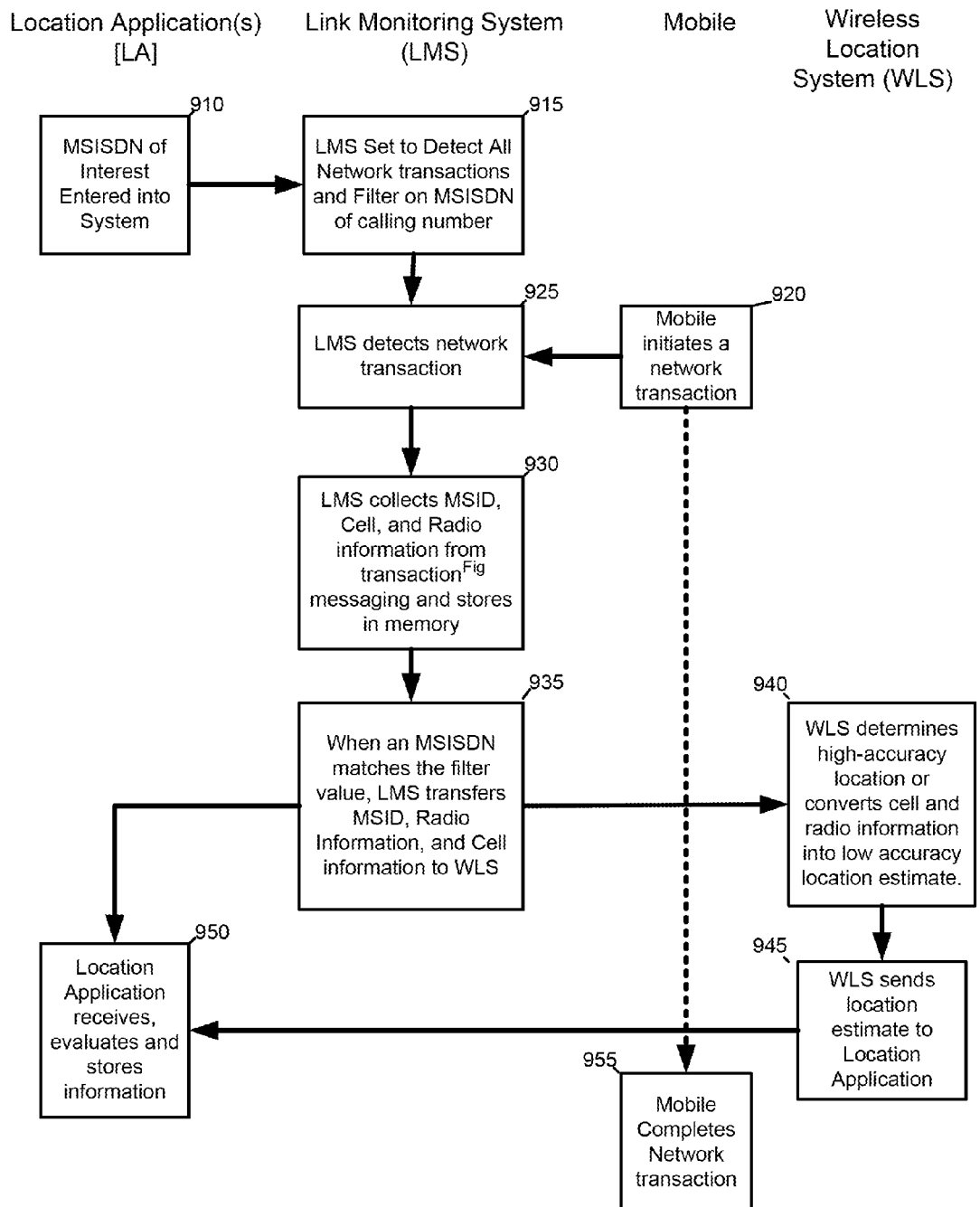
FIG. 9 is a flowchart of an exemplary process for detecting a mobile using calling number triggering in accordance with the present invention.

FIG. 9 is a flowchart of an exemplary process for detecting a mobile using calling number triggering in accordance with the present invention. Initially, at step 910, the MSISDN of interest is entered in the system. The LMS is set to detect all network transactions and filter on MSISDN of calling number at step 915. A mobile can then initiate a network transaction at step 920. The LMS can then detect the transaction at step 925 and collect the MSID, Cell, and radio information from the transaction messaging and store that information into memory at step 930.

If the MSISDN matches the filter value MSISDN, the LMS can transfer the MSID, Cell, and radio information to a WLS at step 935. The WLS can then perform a high or low accuracy location at step 940. The WLS can then send the location to a Location Application at step 945. As some time subsequent to the mobile initiating a network transaction, the mobile will complete the transaction at step 955. The Location Application will receive information from the WLS and the LMS and store for further evaluation at step 950.

E. Conclusion

The true scope the present invention is not limited to the illustrative and presently preferred embodiments disclosed herein. For example, the foregoing disclosure of a Wireless Location System uses explanatory terms, such as LMU, LMS, RNM, BTS, BSC, SMLC, and the like, which should not be construed so as to limit the scope of protection of this application, or to otherwise imply that the inventive aspects of the Wireless Location System are limited to the particular methods and apparatus disclosed. Moreover, as will be understood by those skilled in the art, many of the inventive aspects disclosed herein may be applied in location systems that are not based on TDOA or AoA techniques. In such non-TDOA systems, the SMLC described above would not be required to perform TDOA or AoA calculations. Similarly, the invention is not limited to systems employing LMUs, LMS, or RNM constructed in a particular manner, or to systems employing specific types of receivers, computers, signal processors, etc. The LMUs, SMLC, etc., are essentially programmable data collection and processing devices that could take a variety of forms without departing from the inventive concepts disclosed herein. Given the rapidly declining cost of digital signal processing and other processing functions, it is easily possible, for example, to transfer the processing for a particular function from one of the functional elements (such as the SMLC) described herein to another functional element (such as the LMU) without changing the inventive operation of the system. In many cases, the place of implementation (i.e., the functional element) described herein is merely a designer's preference and not a hard requirement. Accordingly, except as they may be expressly so limited, the scope of protection is not intended to be limited to the specific embodiments described above.

In addition, any reference herein to control channels or voice channels shall refer to all types of control or voice channels, whatever the preferred terminology for a particular air interface. Moreover, there are many more types of air interfaces (e.g., IS-95 CDMA, CDMA 2000, and UMTS WCDMA) used throughout the world, and, unless the contrary is indicated, there is no intent to exclude any air interface from the inventive concepts described within this specification. Indeed, those skilled in the art will recognize other interfaces used elsewhere are derivatives of or similar in class to those described above.

We claim:

1. A method for locating a wireless device operating in a geographic area served by a wireless communications system, comprising:
   monitoring a set of signaling links of the wireless communications system, wherein said signaling links include at least one radio link between the wireless device and a base transceiver station, wherein said monitoring of said radio link comprises receiving messages on at least one of Random Access Channel (RACH), Access Grant Channel (AGCH), and Standalone Dedicated Control Channel (SDCCH) channels, and wherein said monitoring comprises passively monitoring said set of links such that the operation of said wireless communications system is unaffected by said monitoring;
   detecting at least one predefined network transaction involving a predefined trigger occurring on at least one of said signaling links; and
   in response to the detection of said at least one predefined network transaction involving a predefined trigger, initiating at least one predefined location service involving locating said wireless device.

2. The method as recited in claim 1, wherein said signaling links further comprise at least one of:
   an Abis link between a base transceiver station (BTS) and a base station controller (BSC);
   an A link between a base station controller (BSC) and a mobile switching center (MSC);
   a GSM-MAP link;
   an Iub link;
   an Iu-PS link;
   and an Iu-CS link.

3. The method as recited in claim 1, wherein said method is performed by a wireless location system (WLS) overlaid on said wireless communications system.

4. The method as recited in claim 1, wherein said at least one predefined location service is a high accuracy service comprising locating said wireless device with a high accuracy.

5. The method as recited in claim 4, wherein said high accuracy service comprises the use of at least one of the following:
   plural location measuring units (LMUs) and uplink time difference of arrival (TDOA) algorithms;
   at least one location measuring unit (LMU) and uplink angle of arrival (AoA) algorithms; and
   plural LMUs and hybrid uplink TDOA and AoA algorithms.

6. The method as recited in claim 1, wherein said at least one predefined location service is a low accuracy service comprising locating said wireless device with a low accuracy.

7. The method as recited in claim 6, wherein said low accuracy service comprises the use of at least one of the following:
   a radio network monitor (RNM) and a cell global identity (CGI)-based location method for determining the geographic location of said mobile device;
   an RNM and a cell global identity plus Timing Advance (CGI+TA) method to locate the mobile device;
   an RNM and a Network Measurement Report (NMR) in an enhanced cell ID (ECID, or CGI+TA+NMR) method to locate the mobile device; and
   a method employing a mapping of a serving cell-ID, serving sector, or a combination of serving cell, sector and handover candidate measurements (Enhanced Cell ID, or ECID).

8. The method as recited in claim 1, wherein said at least one predefined network transaction comprises at least one of an identity request transaction, a network measurement transaction, a short message service (SMS) transaction, an SMS origination transaction, an SMS termination transaction, a mobile origination transaction, and a mobile termination transaction.

9. The method as recited in claim 1, wherein said predefined trigger comprises at least one of a dialed digit trigger, an MSID trigger, an historical cell trigger, a cell ID trigger, a wide area localization trigger, a smart proximity location trigger, and a calling number trigger.

10. A system for use in or by a wireless communications system, comprising:
   a monitoring subsystem for monitoring a set of signaling links of the wireless communications system, wherein said signaling links include at least one radio link between a wireless device and a base transceiver station, wherein said monitoring of said radio link comprises receiving Random Access Channel (RACH) and Access Grant Channel (AGCH) messages, and wherein said monitoring comprises passively monitoring said set of links such that the operation of said wireless communications system is unaffected by said monitoring; and
   a mechanism for detecting at least one predefined network transaction involving a predefined trigger occurring on at least one of said predefined signaling links.

11. A system as recited in claim 10, further comprising means responsive to the detection of said at least one predefined network transaction for triggering at least one predefined location service, wherein said at least one predefined location service comprises locating said wireless device.

12. The system as recited in claim 11, wherein said signaling links further comprise at least one of: an Abis link between a base transceiver station (BTS) and a base station controller (BSC); an A link between a base station controller (BSC) and a mobile switching center (MSC); a GSM-MAP link; an Iub link; an Iu-PS link; and an Iu-CS link.

13. The system as recited in claim 11, wherein said signaling links further comprise at least one of:
- an Abis link between a base transceiver station (BTS) and a base station controller (BSC);
- an A link between a base station controller (BSC) and a mobile switching center (MSC);
- a GSM-MAP link;
- an Iub link;
- an Iu-PS link; and
- an Iu-CS link.

14. The system as recited in claim 11, wherein said system is part of a wireless location system (WLS), and said WLS is overlaid on said wireless communications system.

15. The system as recited in claim 14, wherein said high accuracy service comprises the use of at least one of the following:
- plural location measuring units (LMUs) and uplink time difference of arrival (TDOA) algorithms;
- at least one location measuring unit (LMU) and uplink angle of arrival (AoA) algorithms; and
- plural location measuring units (LMUs) and hybrid uplink TDOA and AoA algorithms.

16. The system as recited in claim 10, wherein said at least one predefined location service is a low accuracy service comprising locating said wireless device with a low accuracy.

17. The system as recited in claim 16, wherein said low accuracy service comprises the use of the following:
- a radio network monitor (RNM) and a cell global identity (CGI)-based location method for determining the geographic location of said mobile device;
- an RNM and a cell global identity plus Timing Advance (CGI+TA) method to locate the mobile device;
- an RNM and a Network Measurement Report (NMR) in an enhanced cell ID (ECID, or CGI+TA+NMR) method to locate the mobile device; or
- a method employing a mapping of a serving cell-ID, serving sector, or a combination of serving cell, sector and handover candidate measurements (Enhanced Cell ID, or ECID).

18. The system as recited in claim 10, wherein said at least one predefined network transaction comprises at least one of an identity request transaction, a network measurement transaction, and a short message service (SMS) transaction.

19. The system as recited in claim 18, wherein said SMS transaction comprises an SMS origination transaction or an SMS termination transaction.

20. The system as recited in claim 18, wherein said at least one predefined network transaction comprises a mobile origination transaction or a mobile termination transaction.

21. The system as recited in claim 18, wherein said at least one trigger comprises at least one of a dialed digit trigger, an MSID trigger, an historical cell trigger, a cell ID trigger, a wide area localization trigger, a smart proximity location trigger, and a calling number trigger.

\* \* \* \* \*